(12) United States Patent
Miura et al.

(10) Patent No.: US 7,247,414 B2
(45) Date of Patent: Jul. 24, 2007

(54) METHOD FOR PRODUCING RESIN PARTICLES AND TONER USING THE RESIN PARTICLES

(75) Inventors: Satoru Miura, Nagano-ken (JP); Koji Akioka, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 231 days.

(21) Appl. No.: 11/010,723

(22) Filed: Dec. 13, 2004

(65) Prior Publication Data

US 2005/0154088 A1    Jul. 14, 2005

(30) Foreign Application Priority Data

Dec. 11, 2003 (JP) ............................. 2003-413848
Dec. 11, 2003 (JP) ............................. 2003-413849
Jul. 22, 2004 (JP) ............................. 2004-214966

(51) Int. Cl.
*G03G 9/087* (2006.01)

(52) U.S. Cl. .................... 430/137.14; 430/137.15; 23/308 R; 23/313 R; 23/313 P

(58) Field of Classification Search .......... 430/137.14, 430/137.15; 23/308 R, 313 R, 313 P See application file for complete search history.

(56) References Cited

U.S. PATENT DOCUMENTS

| 5,786,413 | A | * | 7/1998 | Weidner et al. | ............. 524/268 |
| 6,884,555 | B2 | * | 4/2005 | Kitani et al. | .................. 430/45 |
| 2003/0180646 | A1 | * | 9/2003 | Asano et al. | ................ 430/126 |
| 2006/0142425 | A1 | * | 6/2006 | Akioka et al. | .............. 523/223 |

FOREIGN PATENT DOCUMENTS

JP          06-332257          12/1994

OTHER PUBLICATIONS

Denshishasin Gakkai (ed.), "Densishashin no Kiso to Ohyo", Corona Publishing Co., Ltd., pp. 482-486, 1988.

* cited by examiner

*Primary Examiner*—Hoa Van Le
(74) *Attorney, Agent, or Firm*—Hogan & Hartson L.L.P.

(57) ABSTRACT

A method for producing resin particles mainly made of a resin material using a dispersion liquid in which a dispersoid containing the resin material is finely dispersed in a dispersion medium, the method comprising a dispersion medium removing step which comprises ejecting the dispersion liquid from a head portion in the form of droplets into a solidifying portion, conveying the droplets in the solidifying portion to remove the dispersion medium, and obtaining agglomerates each of which is composed of two ore more fine particles derived from the dispersoid, and a bonding step for welding and bonding the fine particles which constitute each of the agglomerates, thereby obtaining resin particles. The resin particles can be used for manufacturing a toner.

44 Claims, 9 Drawing Sheets

METHOD FOR PRODUCING RESIN PARTICLES AND TONER USING THE RESIN PARTICLES

BACKGROUND OF THE INVENTION

1. Field of the Invention

The present invention relates to a method for producing resin particles and a toner using the resin particles.

2. Description of the Prior Art

As for electrophotography, there are known various methods. Usually, these methods include the process of forming an electric latent image on a photoreceptor by the use of a photoconductive material and various means (an exposing process), the process of developing the latent image by the use of a toner to form a toner image, the process of transferring the toner image to a transfer material such as paper, and the process of heating or pressurizing the toner image by the use of a fixing roller to fix it onto the transfer material.

A toner for use in such electrophotography is produced by, for example, a grinding method, a polymerization method, or a spray drying method.

In the grinding method, a raw material containing a resin as a main component (hereinafter, simply referred to as a "resin") and a coloring agent are kneaded at a temperature equal to or higher than the softening point of the resin, and then the resulting kneaded material is cooled and ground to obtain a toner (see, for example, Denshishasin Gakkai (ed.), "Densishashin no Kiso to Ohyo", Corona Publishing Co., Ltd., pp. 482–486 (1988)). Such a grinding method is excellent in that a wide variety of materials can be used and therefore a toner can be produced relatively easily. On the other hand, however, the grinding method involves a drawback in that a toner obtained by this method tends to have great variations in shapes of particles, that is a particle size distribution is wide. As a result, electrification properties and fixing properties also vary greatly among toner particles, thereby lowering the reliability of the toner as a whole.

In the polymerization method, toner particles are produced by polymerizing a monomer that is a constituent of a target resin in a liquid phase or the like (see, for example, Japanese Patent Laid-open No. Hei 6-332257, page 2, lines 28 to 35). Such a polymerization method is excellent in that the obtained toner particles have a shape with a relatively high degree of sphericity (that is, a shape close to a geometrically perfect sphere). On the other hand, however, in the polymerization method there is a case where it is impossible to sufficiently reduce variations in particle diameter. Further, in the polymerization method, a range of choices of resin materials is narrow, and therefore there is a case where it is difficult to produce a toner having desired properties.

In the spray drying method, a material for use in producing a toner is dissolved in a solvent, and is then sprayed to obtain fine particles for a toner. Such a spray drying method is advantageous in that the grinding step as described above is not necessary. However, in the spray drying method, since the material is sprayed using high-pressure gas, it is difficult to precisely control conditions at the time of spraying the material. Therefore, it is difficult to produce toner particles having desired shape and size efficiently. Further, in the spray drying method, sprayed particles of the material have large variations in size, and therefore there are differences in their traveling speeds. As a result, there is a case where collision or agglomeration occurs between the sprayed particles before they are solidified, so that particles having various shapes are formed. This results in a case where the finally obtained toner particles have large variations in size and shape. As described above, since a toner obtained by the spray drying method has large variations in size and shape among toner particles, variations in electrification properties and fixing properties among the toner particles also become large, thereby lowering the reliability of the toner as a whole.

Further, such a conventional spray drying method has another problem in that hollow particles are likely to be produced, because a material for use in producing a toner dissolved in a solvent is usually sprayed into an atmosphere with high temperature so that the solvent is Volatilized rapidly.

SUMMARY OF THE INVENTION

It is therefore an object of the present invention to provide a method for producing resin particles having a uniform shape and a narrow particle size distribution, and a toner produced using the resin particles.

In order to achieve the above object, the present invention is directed to a method for producing resin particles mainly made of a resin material using a dispersion liquid in which a dispersoid containing the resin material is finely dispersed in a dispersion medium. This method comprises a dispersion medium removing step which comprises ejecting the dispersion liquid from a head portion in the form of droplets into a solidifying portion, conveying the droplets in the solidifying portion to remove the dispersion medium, and obtaining agglomerates each of which is composed of two ore more fine particles derived from the dispersoid; and a bonding step for welding and bonding the fine particles which constitute each of the agglomerates.

According to the present invention described above, it is possible to provide resin particles (in particular, toner particles) having a uniform shape and a narrow particle size distribution.

In the method of producing resin particles according to the present invention, it is preferred that the dispersion medium removing step is carried out at a processing temperature which is equal to or lower than a glass transition point of the resin material constituting the dispersoid, and the bonding step is carried out at a processing temperature which is equal to or higher than the glass transition point of the resin material.

This makes it possible to effectively prevent the formation of defective resin particles, especially hollow particles, thereby enabling to obtain resin particles having small variations in size and shape. As a result, resin particles having a high degree of sphericity (that is, resin particles having a shape close to a geometrically perfect sphere) are produced relatively easily. Further, it is also possible to obtain toner particles having excellent mechanical strength (durability).

In the method of producing resin particles according to the present invention, it is preferred that the temperature of the dispersion liquid to be ejected from the head portion is substantially equal to or lower than the processing temperature of the dispersion medium removing step.

By setting the temperature of the dispersion liquid to be ejected from the head portions to a value within the above range, it is possible to effectively prevent the composition (concentration) of the dispersion liquid from changing with the lapse of time due to volatilization of the dispersion medium in the head portions. In addition, it is also possible to effectively prevent the clogging of the ejecting portions caused by the volatilization of the dispersion medium from the dispersion liquid in the vicinity of the ejecting portions prior to ejection of the dispersion liquid (prior to cutting of the dispersion liquid).

Further, it is preferred that the bonding step is carried out at a temperature which is equal to or higher than the glass transition point of the resin material and equal to or lower than a melting point of the resin material.

This makes it possible to allow two or more fine particles constituting each of the agglomerates 9 to bond together more reliably. As a result, the finally obtained toner particles have especially excellent mechanical strength (mechanical stability). In addition, by carrying out the bonding step (bonding treatment) at a temperature equal to or higher than the glass transition point of the resin material constituting the resin particles (the resin material constituting the dispersoid 61), it is possible to allow the finally obtained toner particles to have a relatively high degree of roundness (sphericity) easily and reliably.

Further, in the method of producing resin particles according to the present invention, it is also preferred that the dispersion liquid is intermittently ejected from the head portion by means of a piezoelectric pulse.

This makes it possible to eject the dispersion liquid intermittently drop by drop with the shape of the ejected dispersion liquid being stable, thereby enabling to obtain resin particles having small variations in size and shape. In addition, toner particles having a high degree of sphericity (that is, toner particles having a shape close to a geometrically perfect sphere) can be produced relatively easily.

Further, in the method of producing resin particles according to the present invention, it is also preferred that the head portion includes a dispersion liquid storage portion for storing the dispersion liquid, a piezoelectric device for applying a piezoelectric pulse to the dispersion liquid stored in the dispersion liquid storage portion, and an ejecting portion for ejecting the dispersion liquid by the piezoelectric pulse.

Use of such a head portion makes it possible to improve shape stability of the dispersion liquid ejected (discharged) in the form of droplets. As a result, it is possible to obtain resin particles having small variations in shape and size. In addition, it is possible to allow the obtained resin particles to have a relatively high degree of sphericity (that is, resin particles having a shape close to a geometrically perfect sphere) relatively easily.

In this case, it is preferred that the ejecting portion is formed into a substantially circular opening having a diameter of 5 to 500 μm.

This makes it possible to stably eject the dispersion in the form of droplets having small variations in shape and size while preventing clogging from occurring at the ejecting portion.

Further, in the method of producing resin particles according to the present invention, it is also preferred that the frequency of the piezoelectric pulse is in the range of 1 kHz to 500 kHz.

This makes it possible to improve the productivity of the resin particles with the variations in shape and size of the droplets of the ejected dispersion liquid being made small.

Further, in the method of producing resin particles according to the present invention, it is also preferred that a processing temperature in the bonding step is higher than a processing temperature in the dispersion medium removing step.

This makes it possible to more smoothly promote welding of the fine particles derived from the dispersoid. Further, even in a case where the agglomerates contain a relatively large amount of the dispersion medium or the like, it is also possible to effectively reduce the amount of the dispersion medium or the like contained (remaining) in the agglomerates, thereby enabling the finally obtained toner particles to have substantially no dispersion medium or the like.

Further, in the method of producing resin particles according to the present invention, it is also preferred that when the processing temperature of the dispersion medium removing step is defined as $T_1$ (° C.) and the processing temperature of the bonding step is defined as $T_2$ (° C.), $T_1$ and $T_2$ satisfy the relation of $0 \leq T_2 - T_1 \leq 200$. By allowing $T_1$ and $T_2$ to satisfy the above relation, it is possible to allow the obtained toner particles to have sufficiently high degree of uniformity and stability in shape and a relatively high degree of roundness while properly preventing the deterioration or degeneration of the components thereof.

Further, in the method of producing resin particles according to the present invention, it is also preferred that when the processing temperature of the dispersion medium removing step is defined as $T_1$ (° C.), and the glass transition point of the resin material constituting the dispersoid 61 is defined as Tg (° C.), $T_1$ and Tg satisfy the relation of $0 \leq Tg - T_1 \leq 70$.

By allowing $T_1$ and $T_g$ to satisfy the above relation, it is possible to effectively remove the dispersion medium contained in the dispersion liquid 6 while allowing the obtained agglomerates 90 to have sufficiently high uniformity and stability in shape. As a result, productivity of a toner becomes especially excellent.

Further, in the method of producing resin particles according to the present invention, it is also preferred that when the processing temperature of the bonding step is defined as $T_2$ (° C.) and the melting point of the resin material constituting the resin particles is defined as $T_m$ (° C.), $T_2$ and $T_m$ satisfy the relation of $-100 \leq T_2 - T_m \leq 110$.

By allowing $T_2$ and $T_m$ to satisfy the above relation, it is possible to allow the obtained toner particles to have sufficiently high degree of uniformity and stability in shape and a relatively high degree of roundness while properly preventing the deterioration or degeneration of the components thereof.

Further, in the method of producing resin particles according to the present invention, it is also preferred that the bonding step comprises a first bonding step for welding and preliminarily bonding two or more fine particles constituting each of the agglomerates to obtain a preliminarily bonded body; and a second bonding step for subjecting the preliminarily boded body to heat treatment to promote the welding and bonding of the fine particles.

This makes it possible to provide resin particles (in particular, toner particles) having a uniform shape and a narrow particle size distribution.

Further, in the method of producing resin particles according to the present invention, it is also preferred that when the processing temperature of the dispersion medium removing step is defined as $T_1$ (° C.) and the processing temperature of the first bonding step is defined as $T_2'$ (° C.), $T_1$ and $T_2'$ satisfy the relation of $0 \leq T_2' - T_1 \leq 70$.

When $T_{1\ and\ T2}'$ satisfy the above relation, it is possible for the finally obtained toner particles to have sufficiently high degree of uniformity and stability in shape while properly preventing the deterioration or degeneration of the component thereof. In addition, it is also possible for the toner particles to have a relatively high degree of roundness.

Further, in the method of producing resin particles according to the present invention, it is also preferred that a processing temperature of the second bonding step is higher than a processing temperature of the first bonding step.

By carrying out the second bonding step in such a manner, it is possible to more effectively promote the welding and bonding of the two or more fine particles constituting each of the preliminarily bonded bodies with ease and reliability. Further, even in a case where the preliminarily bonded bodies contain the dispersion medium or the like, it is possible to effectively reduce the amount of the dispersion medium or the like contained (remaining) in the preliminarily bonded bodies, thereby enabling the finally obtained toner particles to have substantially no dispersion medium or the like.

Further, in the method of producing resin particles according to the present invention, it is also preferred that when the processing temperature of the first bonding step is defined as $T_2'$ (° C.) and the processing temperature of the second bonding step is defied as $T_2''$ (° C.), $T_2'$ and $T_2''$ satisfy the relation of $0 \leq T_2'' - T_2' \leq 150$.

When $T_2'$ and $T_2''$, satisfy the above relation, it is possible to obtain toner particles having sufficiently high degree of uniformity and stability in shape and a relatively high degree of roundness while properly preventing the deterioration or degeneration of the component thereof.

Further, in the method of producing resin particles according to the present invention, it is also preferred that when a processing temperature of the second bonding step is defined as $T_2''$ (° C.) and a melting point of the resin material constituting the resin particles is defined as $T_m$ (° C.), $T_2''$ and $T_m$ satisfy the relation of $-100 \leq T_2'' - T_m \leq 110$.

When $T_2''$ and $T_m$ satisfy the above relation, it is possible to obtain toner particles having sufficiently high degree of uniformity and stability in shape and a relatively high degree of roundness while properly preventing the deterioration or degeneration of the component thereof.

Further, in the method of producing resin particles according to the present invention, it is also preferred that the dispersion liquid used in the dispersion medium removing step has been subjected to deaeration treatment.

By subjecting the dispersion liquid to deaeration treatment, it is possible to reduce the amount of gas dissolved in the dispersion liquid, thereby effectively preventing resin particles having non-uniform shape from being formed.

Further, in the method of producing resin particles according to the present invention, it is also preferred that the deaeration treatment is carried out by placing the dispersion liquid in an atmosphere of 80 kPa or less.

By setting the ambient pressure during deaeration treatment to a value within the above range, it is possible to efficiently remove gas dissolved in the dispersion liquid while properly maintaining the shape of the dispersoid contained in the dispersion liquid.

Further, in the method of producing resin particles according to the present invention, it is also preferred that the dispersion medium is mainly composed of water and/or a liquid having good compatibility with water.

By using such a dispersion medium, it is possible to, improve the dispersibility of the dispersoid in the dispersion medium and to allow the dispersoid contained in the dispersion liquid 6 to have a relatively small particle diameter and small variations in particle size. As a result, the finally obtained toner (toner particles) can have small variations in particle size and shape and a high degree of roundness.

Further, in the method of producing resin particles according to the present invention, it is also preferred that the dispersion liquid is in the form of suspension.

In a case where the dispersoid is in a suspension, it is possible to more effectively prevent undesired components such as a solvent from remaining in the finally obtained toner. As a result, the obtained toner can have especially excellent reliability.

Further, in the method of producing resin particles according to the present invention, it is also preferred that the dispersion liquid is prepared by adding a material containing the resin material into a liquid containing at least water.

This makes it possible to prepare the dispersion liquid relatively easily. In addition, the use of an aqueous liquid as the dispersion medium makes it possible to volatilize substantially no organic solvent in the solidifying portion of the toner production apparatus, and therefore, it is possible to produce a toner in a manner which has almost no adverse effects on the environment.

Further, in the method of producing resin particles according to the present invention, it is also preferred that the dispersion liquid is prepared through a mixing process in which a resin liquid which contains at least the resin material and a solvent which dissolves at least a part of the resin material is mixed with an aqueous solution containing at least water.

According to such a method, it is possible to relatively easily adjust the size of the fine particles of the dispersoid contained in the dispersion liquid so as to have an appropriate particle diameter and make variations in size and shape of the dispersoid particularly small.

Further, in the method of producing resin particles according to the present invention, it is also preferred that the mixture of the resin liquid and the aqueous solution is carried out by adding the resin liquid into the aqueous solution drop by drop.

According to such a method, it is possible to reliably adjust the size of the fine particles of the dispersoid contained in the dispersion liquid so as to have an appropriate particle diameter and make variations in size and shape of the dispersoid particularly small.

Further, in the method of producing resin particles according to the present invention, it is also preferred that the dispersion liquid is prepared by removing at least a part of the solvent after the mixing process.

This makes it possible to obtain a dispersion liquid (suspension) containing a solid dispersoid and having particularly small variations in size and shape of the dispersoid.

Further, in the method of producing resin particles according to the present invention, it is also preferred that the solvent is removed by heating the dispersion liquid.

This makes it possible to efficiently solidify the dispersoid (that is, to obtain suspension) while making variations in size and shape of the dispersoid sufficiently small.

Further, in the method of producing resin particles according to the present invention, it is also preferred that the average particle diameter of the dispersoid in the dispersion liquid is in the range of 0.05 to 1.0 μm.

By setting the average particle diameter of the dispersoid to a value within the above range, it is possible to allow the finally obtained toner particles to have a sufficiently high degree of roundness and excellent uniformity in properties and shape among particles. Further, this also makes it possible to have the ejecting conditions of the dispersion liquid more stable.

Further, in the method of producing resin particles according to the present invention, it is also preferred that when the average particle diameter of the dispersoid contained in the dispersion liquid is defined as Dm (μm) and the average particle diameter of the toner particles is defined as Dt (μm), Dm and Dt satisfy the relation of $0.005 \leq Dm/Dt \leq 0.5$.

By allowing Dm and Dt to satisfy the above relation, it is possible to obtain a toner having especially small variations in particle size and shape.

Further, in the method of producing resin particles according to the present invention, it is also preferred that an amount of the dispersoid contained in the dispersion liquid is in the range of 1 to 99 wt %.

This makes it possible to efficiently obtain resin particles have an appropriate degree of roundness and having particularly small variations in size and shape among particles.

Further, in the method of producing resin particles according to the present invention, it is also preferred that an ejected amount of one droplet of the dispersion liquid which is ejected from the head portion is in the range of 0.05 to 500 pl.

This makes it possible to obtain resin particles having an appropriate particle diameter more reliably.

Further, in the method of producing resin particles according to the present invention, it is also preferred that when the average diameter of the ejected droplets of the dispersion liquid is defined as Dd (μm), and the average particle diameter of the dispersoid contained in each droplet of the dispersion liquid is defined as Dm (μm), Dd and Dm satisfy the relation of Dm/Dd<0.5.

This makes it possible to make variations in size and shape of the resin particles smaller while sufficiently exhibiting the feature of the dispersion liquid in production of the resin particles (e.g. uniform cutting of the ejected dispersion liquid).

Further, in the method of producing resin particles according to the present invention, it is also preferred that when the average diameter of the ejected droplets of the dispersion liquid is defined as Dd (μm), and the average particle diameter of toner particles to be produced from the resin particles is defined as Dt (μm), Dd and Dt satisfy the relation of 0.05≦Dt/Dd≦1.0.

By allowing Dd and Dt to satisfy the above relation, it is possible to relatively easily obtain a toner composed of very fine particles having a high degree of roundness and a sharp particle size distribution.

Further, in the method of producing resin particles according to the present invention, it is also preferred that the dispersion liquid ejected from the head portion is directed into a gas stream flowing in substantially one direction.

Such a gas stream makes it possible to efficiently solidify the droplets of the dispersion liquid in the solidifying portion while efficiently convey the droplets of the dispersion liquid (the resin particles).

Further, in the method of producing resin particles according to the present invention, it is also preferred that the head portion includes a plurality of head portions, and the dispersion liquid is ejected from the plurality of head portions.

This makes it possible to efficiently produce the resin particles.

Further, in the method of producing resin particles according to the present invention, it is also preferred that the dispersion liquid is ejected from the head portions while the gas is injected from a portion between the adjacent head portions.

This makes it possible to convey the droplets of the dispersion liquid ejected from the head portions with maintaining the interval of the adjacent droplets to thereby solidifying them. As a result, it is possible to effectively prevent collision and agglomeration between the ejected droplets of the dispersion liquid.

Further, in the method of producing resin particles according to the present invention, it is also preferred that the humidity of gas injected from the adjacent head portions is 50% RH or less.

This makes it possible to efficiently remove the dispersion medium contained in the dispersion liquid in the solidifying portion to thereby further improve the productivity of the resin particles.

Further, in the method of producing resin particles according to the present invention, it is also preferred that the timing of ejection of the dispersion liquid is different in the at least two adjacent head portions.

This makes it possible to effectively prevent collision and agglomeration between the droplets of the dispersion liquid ejected from the adjacent head portions before the droplets of the dispersion liquid are solidified (before the agglomerates are formed).

Further, in the method of producing resin particles according to the present invention, it is also preferred that the dispersion liquid is ejected in a state that a voltage having a polarity which is the same as that of the dispersion liquid is applied to the solidifying portion.

This makes it possible to effectively prevent the dispersion liquid (the agglomerates) from being adhered to the inner surface of the housing. As a result, it is also possible to effectively prevent the formation of defective toner particles as well as to improve the collection efficiency of the resin particles.

Further, in the method of producing resin particles according to the present invention, it is also preferred that the initial velocity of the dispersion liquid ejected from the head portion is in the range of 0.1 to 10 m/sec.

This makes it possible to obtain resin particles having a higher degree of sphericity while maintaining the productivity of the resin particles at a sufficiently high level.

Further, in the method of producing resin particles according to the present invention, it is also preferred that the viscosity of the dispersion liquid inside the head portion is in the range of 0.5 to 200 (mPa·s).

This makes it possible to reliably eject the dispersion liquid in the form of droplets having small variations in shape and size even if the ejection interval of the dispersion liquid is made relatively short. With this result, it is possible to produce resin particles having small variations in size and shape among the particles with excellent productivity.

Further, in the method of producing resin particles according to the present invention, it is also preferred that the pressure inside the solidifying portion is 150 kPa or less.

This makes it possible to remove the dispersion medium from the droplets of the dispersion liquid more easily while reliably preventing defective resin particles from being formed.

Further, in the method of producing resin particles according to the present invention, it is also preferred that the dispersion liquid is ejected with being heated.

By heating the dispersion liquid in such a manner, it is possible that agglomeration (bonding) of the dispersoid in the form of particles contained in the dispersion liquid smoothly occurs in the solidifying portion, so that the obtained resin particles have an especially high degree of roundness. As a result, the finally obtained toner particles also have a high degree of roundness.

Further, in the method of producing resin particles according to the present invention, it is also preferred that the dispersion liquid ejected from the head portion is heated in the solidifying portion.

By heating the dispersion liquid in such a manner, it is also possible that agglomeration (bonding) of the dispersoid in the form of particles contained in the dispersion liquid smoothly occurs in the solidifying portion, so that the obtained resin particles have an especially high degree of roundness. As a result, the finally obtained toner particles can also have a high degree of roundness.

Further, in the method of producing resin particles according to the present invention, it is also preferred that the resin particles are toner particles or are used for producing toner particles.

This makes it possible to provide a toner (toner particles) having a uniform shape and a sharp particle diameter distribution.

Another aspect of the present invention is directed to a toner manufactured using the method as described above.

This also makes it possible to provide a toner (toner particles) having a uniform shape and a sharp particle diameter distribution.

Further, in the toner according to the present invention, it is preferred that the average diameter of the toner particles is in the range of 2 to 20 μm.

This makes it possible to make variations in fixing properties and electrification properties among the toner particles particularly small, thereby enabling to sufficiently improve the resolution of an image formed by the finally obtained toner while the reliability of the toner is particularly raised as a whole.

Further, in the toner according to the present invention, it is preferred that a standard deviation of the particle diameters of the toner particles is 1.5 μm or less.

This makes it possible to make variations in fixing properties and electrification properties among the toner particles particularly small, thereby enabling to sufficiently improve the reliability of the finally obtained toner as a whole.

Further, in the toner according to the present invention, it is preferred that an average roundness R of the toner particles which is represented by the following formula (I) is 0.95 or higher:

$$R = L_0/L_1 \qquad (I)$$

whrein $L_1$ (μm) represents the circumference of projected image of a toner particle that is a subject of measurement, and $L_0$ (μm) represents the circumference of a perfect circle having the same area as that of the projected image of the toner particle that is a subject of measurement.

This makes it possible to further improve the transfer efficiency of the toner and the mechanical strength of the toner while keeping the size of the toner particle to be sufficiently small. In addition, the fluidity of the toner is also improved.

Further, in the toner according to the present invention, it is preferred that a standard deviation of average roundness among the toner particles of the toner is 0.02 or less.

This makes it possible to make variations in fixing properties and electrification properties among the toner particles particularly small, thereby enabling to sufficiently improve the reliability of the finally obtained toner as a whole.

These and other objects, structures and results of the present invention will be more apparent when the following detailed description is considered taken in conjunction with the appended drawings.

DETAILED DESCRIPTION OF THE INVENTION

Hereinbelow, preferred embodiments of a method for producing resin particles (a method for producing toner particles) and a toner using the resin particles according to the present invention will be described in detail with reference to the accompanying drawings.

Resin particles to be produced by the resin particle production method according to the present invention are not particularly limited as long as they are mainly composed of a resin material, but they are preferably toner particles or particles for use in producing toner particles (e.g., toner mother particles). Among various resin particles, toner particles are strictly required to have uniformity in size and shape, and therefore an effect obtained by application of the present invention is particularly conspicuous. For this reason, toner particles will be described below as an example of various resin particles. In this connection, it is to be noted that the term "resin particles" used in this specification means particles (powders) mainly composed of a resin material, and such resin particles may contain other components in addition to the resin material.

Embodiment 1

First, a first embodiment of the present invention will be described.

Figure 1:
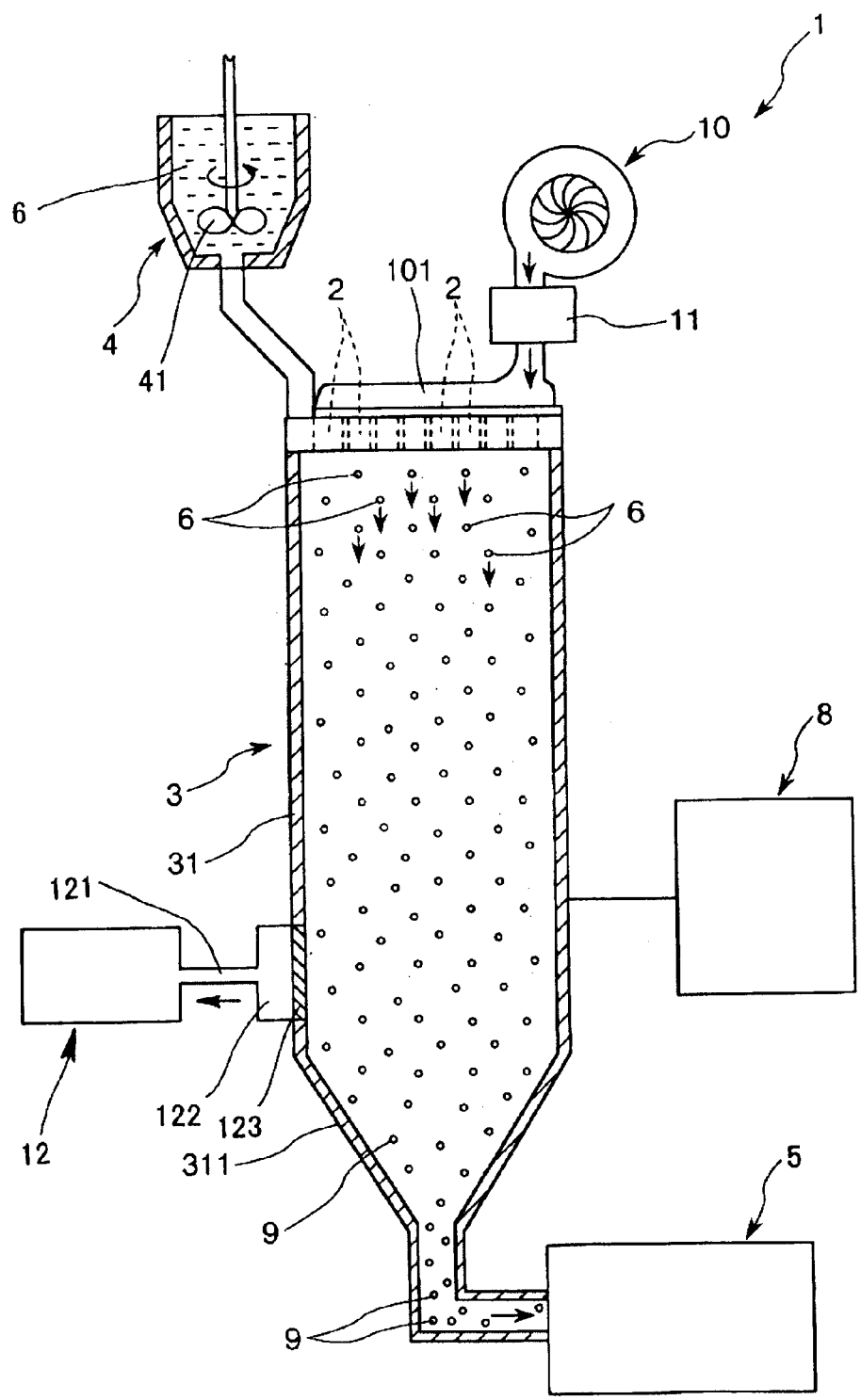
FIG. 1 is a cross-sectional view which schematically shows a first embodiment of an apparatus for use in producing a toner of the present invention.
Figure 2:
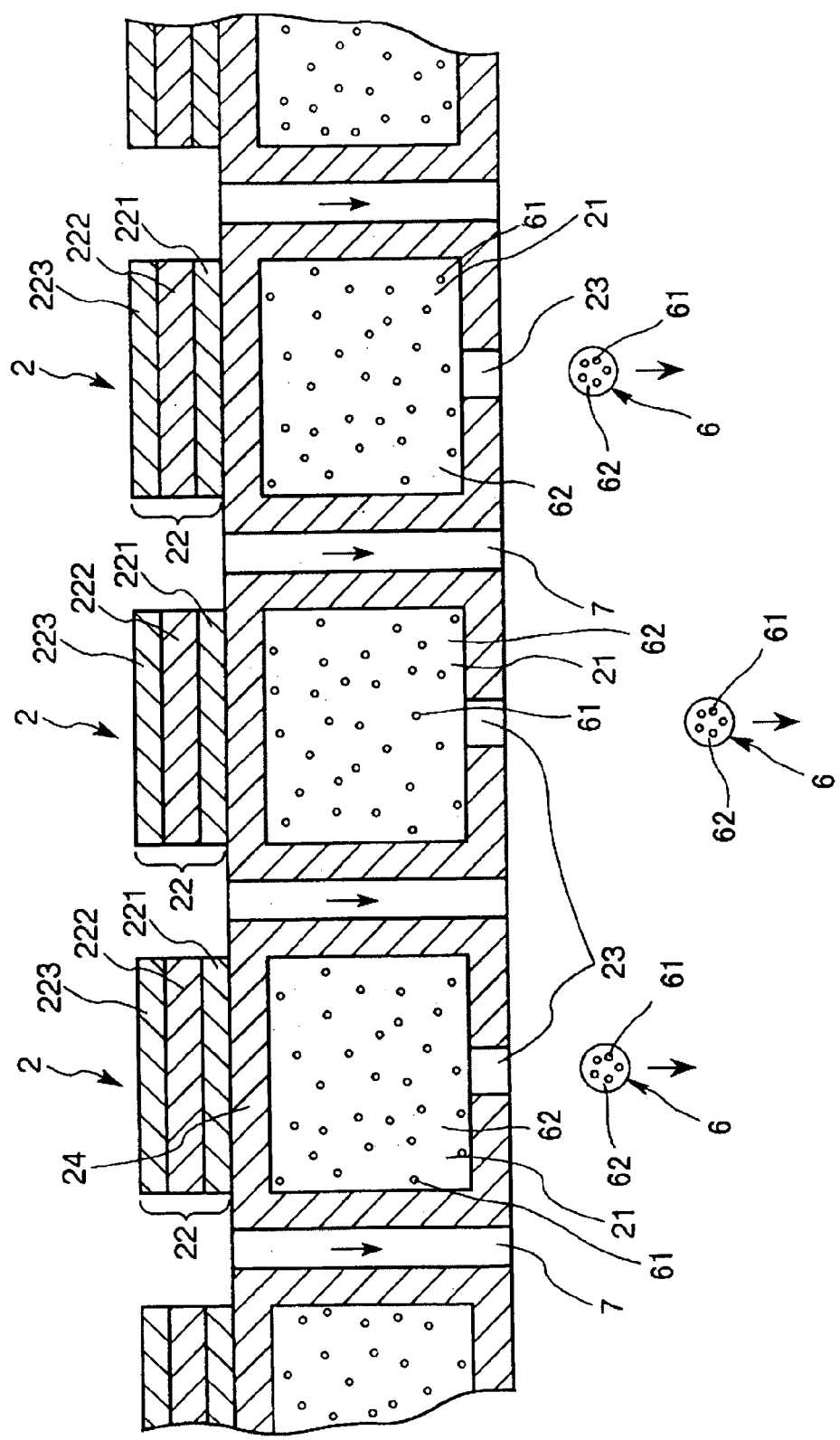
FIG. 2 is an enlarged sectional view of the vicinity of head portions of the toner production apparatus shown in FIG. 1.

FIG. 1 is a cross-sectional view which schematically shows a first embodiment of an apparatus for use in producing a toner of the present invention, and FIG. 2 is an enlarged sectional view of the vicinity of head portions of the toner production apparatus shown in FIG. 1.

<Dispersion Liquid>

First, a dispersion liquid 6 to be used in the present invention will be described. The toner of the present invention is produced using the dispersion liquid 6. Examples of the dispersion liquid include suspensions and emulsions. In this regard, it is to be noted that the term "suspension" used in this specification means a dispersion liquid in which a solid dispersoid (suspended particles) is dispersed in a liquid dispersion medium (colloidal suspensions are also included). The term "emulsion" used in this specification means a dispersion liquid in which a liquid dispersoid (dispersed particles) is dispersed in a liquid dispersion medium. Further, such a dispersion liquid as described above may contain both a solid dispersoid and a liquid dispersoid. In this case, a dispersion liquid in which a ratio of a solid dispersoid is larger than that of a liquid dispersoid is defined as a suspension, and a dispersion liquid in which a ratio of a liquid dispersoid is larger than that of a solid dispersoid is defined as an emulsion. Particularly, the dispersion liquid to be used in the present invention is preferably subjected to deaeration treatment. Deaeration treatment will be described later in detail.

The dispersion liquid 6 is in a state where a dispersoid (a dispersed phase) 61 is finely dispersed in a dispersion medium 62.

(Dispersion Medium)

The dispersion medium 62 is not particularly limited as long as it can disperse the dispersoid 61 which will be described later, but is preferably one mainly composed of a material generally used as a solvent (hereinafter, also referred to as a "solvent material").

Examples of such a material include inorganic solvents such as water, carbon disulfide, and carbon tetrachloride, and organic solvents such as ketone-based solvents (e.g., methyl ethyl ketone (MEK), acetone, diethyl ketone, methyl isobutyl ketone (MIBK), methyl isopropyl ketone (MIPK), cyclohexanone, 3-heptanone, and 4-heptanone), alcohol-based solvents (e.g., methanol, ethanol, n-propanol, isopropanol, n-butanol, i-butanol, t-butanol, 3-methyl-1-butanol, 1-pentanol, 2-pentanol, n-hexanol, cyclohexanol, 1-heptanol, 1-octanol, 2-octanol, 2-methoxyethanol, allyl alcohol, furfuryl alcohol, and phenol), ether-based solvents (e.g., diethyl ether, dipropyl ether, diisopropyl ether, dibutyl ether, 1,2-dimethoxy ethane (DME), 1,4-dioxane, tetrahydrofuran (THF), tetrahydropyran (THP), anisole, diethylene glycol dimethyl ether (diglyme), and 2-methoxyethanol), cellosolve-based solvents (e.g., methyl cellosolve, ethyl cellosolve, and phenyl cellosolve), aliphatic hydrocarbon-based solvents (e.g., hexane, pentane, heptane, cyclohexane, methylcyclohexane, octane, didecane, methylcyclohexene, and isoprene), aromatic hydrocarbon-based solvents (e.g., toluene, xylene, benzene, ethyl benzene, and naphthalene), aromatic heterocyclic compound-based solvents (e.g., pyridine, pyrazine, furan, pyrrole, thiophene, 2-methylpyridine, 3-methylpyridine, 4-methylpyridine, and furfuryl alcohol), amide-based solvents (e.g., N,N-dimethylformamide (DMF) and N,N-dimethylacetamide (DMA)), halide-based solvents (e.g., dichloromethane, chloroform, 1,2-dichloroethane, trichloroethylene, and chlorobenzene), ester-based solvents (e.g., acetylacetone, ethyl acetate, methyl acetate, isopropyl acetate, isobutyl acetate, isopentyl acetate, ethyl chloroacetate, butyl chloroacetate, isobutyl chloroacetate, ethyl formate, isobutyl formate, ethyl acrylate, methyl methacrylate, and ethyl benzoate), amine-based solvents (e.g., trimethylamine, hexylamine, triethylamine, and aniline), nitrile-based solvents (e.g., acrylonitrile and acetonitrile), nitro-based solvents (e.g., nitromethane and nitroethane), and aldehyde-based solvents (e.g., acetaldehyde, propionaldehyde, butyraldehyde, pentanal, and acrylaldehyde). These materials can be used singly or in combination of two or more of them.

Among these materials, it is preferred that the dispersion medium 62 is one mainly composed of water and/or a liquid having good compatibility with water (e.g., a liquid having a solubility of 30 g or more per 100 g of water at 25° C.). By using such a dispersion medium 62, it is possible to improve the dispersibility of the dispersoid 61 in the dispersion medium 62 and to allow the dispersoid 61 contained in the dispersion liquid 6 to have a relatively small particle diameter and small variations in particle size. As a result, the finally obtained toner (toner particles) has small variations in particle size and shape and a high degree of roundness. Particularly, in a case where the dispersion medium 62 is composed of water, substantially no organic solvent is volatilized in a toner production process. Therefore, it is possible to produce a toner in a manner which has almost no adverse effect on the environment, that is, in a manner harmless to the environment.

In a case where the dispersion medium 62 is composed of a mixture of two or more components, it is preferred that at least two components of the mixture form an azeotrope (a minimum boiling point azeotrope) together. This makes it possible to efficiently remove the dispersion medium 62 in a solidifying portion of the toner production apparatus which will be described later. In addition to that, it is also possible to remove the dispersion medium 62 at a relatively low temperature in the solidifying portion of the toner production apparatus, thereby preventing the deterioration of properties of the finally obtained toner (toner particles) more effectively.

Examples of a liquid which can form an azeotrope with water include carbon disulfide, carbon tetrachloride, methyl ethyl ketone (MEK), acetone, cyclohexanone, 3-heptanone, 4-heptanone, ethanol, n-propanol, isopropanol, n-butanol, i-butanol, t-butanol, 3-methyl-1-butanol, 1-pentanol, 2-pentanol, n-hexanol, cyclohexanol, 1-heptanol, 1-octanol, 2-octanol, 2-methoxyethanol, allyl alcohol, furfuryl alcohol, phenol, dipropyl ether, dibutyl ether, 1,4-dioxane, anisole, 2-methoxyethanol, hexane, heptane, cyclohexane, methylcyclohexane, octane, didecane, methylcyclohexene, isoprene, toluene, benzene, ethyl benzene, naphthalene, pyridine, 2-methylpyridine, 3-methylpyridine, 4-methylpyridine, furfuryl alcohol, chloroform, 1,2-dichloroethane, trichloroethylene, chlorobenzene, acetylacetone, ethyl acetate, methyl acetate, isopropyl acetate, isobutyl acetate, isopentyl acetate, ethyl chloroacetate, butyl chloroacetate, isobutyl chloroacetate, ethyl formate, isobutyl formate, ethyl acrylate, methyl methacrylate, ethyl benzoate, trimethylamine, hexylamine, triethylamine, aniline, acrylonitrile, acetonitrile, nitromethane, nitroethane, and acrylaldehyde.

The boiling point of the dispersion medium 62 is not limited to any specific value, but is preferably 180° C. or less, more preferably 150° C. or less, even more preferably in the range of 35 to 130° C. Such a relatively low boiling point of the dispersion medium 62 makes it possible to relatively easily remove the dispersion medium 62 in the solidifying portion of the toner production apparatus which will be described later. In addition to that, it is also possible to significantly reduce the amount of the dispersion medium 62 remaining in the finally obtained toner particles, thereby further improving the reliability of the toner.

It is to be noted that the dispersion medium 62 may contain other components in addition to the above-described material. For example, the dispersion medium 62 may contain various additives such as materials which will be exemplified later as constituent materials of the dispersoid

61, inorganic powders (e.g., silica, titanium oxide, and iron oxide), and organic powders (e.g., fatty acid and fatty acid metal salts).

(Dispersoid)

The dispersoid 61 is usually composed of a material containing at least a resin as a main component or a precursor thereof (hereinafter, they are collectively referred to as a "resin material"). Examples of a precursor of a resin include a monomer, a dimer, and an oligomer of the resin.

Hereinbelow, constituent materials of the dispersoid 61 will be described.

1. Resin (Binder Resin)

Examples of resins (binder resins) include (meth)acrylic resins, polycarbonate resins, styrene-based resins (homopolymers or copolymers containing styrene or a styrene substituent) such as polystyrene, poly-α-methylstyrene, chloropolystyrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylic ester copolymer, styrene-methacrylic ester copolymer, styrene-acrylic ester-methacrylic ester copolymer, styrene-α-methyl chloroacrylate copolymer, styrene-acrylonitrile-acrylic ester copolymer, and styrene-vinyl methyl ether copolymer, polyester resins, epoxy resins, urethane-modified epoxy resins, silicone-modified epoxy resins, vinyl chloride resins, rosin-modified maleic acid resins, phenyl resins, polyethylene, polypropylene, ionomer resins, polyurethane resins, silicone resins, ketone resins, ethylene-ethylacrylate copolymer, xylene reins, polyvinyl butyral resins, terpene reins, phenol resins, and aliphatic or alicyclic hydrocarbon resins. These binder resins can be used singly or in combination of two or more of them. In a case where a toner is produced by polymerizing a raw material contained in the dispersoid 61 in the solidifying portion of the toner production apparatus, a monomer, a dimer, an oligomer, or the like of the above-mentioned resin material is usually used.

The amount of the resin contained in the dispersoid 61 is not limited to any specific value, but is preferably in the range of 2 to 98 wt %, more preferably in the range of 5 to 95 wt %.

Further, the glass transition point of the resin constituting the dispersoid 61 is preferably in the range of 50 to 70° C. By setting the glass transition point of the resin constituting the dispersoid 61 to a value within the above range, it is possible to efficiently obtain appropriate agglomerates 9 in a dispersion medium removing step which will be described later. In this regard, it is to be noted that in a case where the resin material constituting the dispersoid 61 is comprised of two or more kinds of the resin materials (resin components), the weighted average (weight basis) of glass transition point of each of the components is defined as the glass transition point of the resin.

Furthermore, the melting point of the resin constituting the dispersoid 61 is preferably in the range of 90 to 150° C. By setting the melting point of the resin constituting the dispersoid 61 to a value within the above range, it is possible to efficiently carry out a bonding step which will be described later. It is to be noted that in a case where the resin material constituting the dispersoid 61 is composed of two or more kinds of the resin materials (resin components), the weighted average (weight basis) of melting point of each of the components is defined as the melting point of the resin.

2. Solvent

The dispersoid 61 may contain a solvent capable of dissolving at least a part of the component of the dispersoid 61. This makes it possible to improve the fluidity of the dispersoid 61 in the dispersion liquid 6 and to allow the dispersoid 61 contained in the dispersion liquid 6 to have a relatively small particle diameter and small variations in particle size. As a result, the finally obtained toner (toner particles) has small variations in particle size and shape and a high degree of roundness.

The solvent to be contained in the dispersoid 61 is not particularly limited as long as it can dissolve at least a part of the component constituting the dispersoid 61, but is preferably one which can be easily removed in the solidifying portion of the toner production apparatus.

Further, the solvent preferably has low compatibility with the above-described dispersion medium 62 (e.g., a solvent having a solubility of 30 g or less per 100 g of the dispersion medium at 25° C.). The use of such a solvent makes it possible to finely disperse the dispersoid 61 in the dispersion liquid 6 with stability.

The composition of the solvent can be appropriately selected according to the kind of the resin described above, the composition of a coloring agent, or the composition of the dispersion medium.

Examples of the solvent include inorganic solvents such as water, carbon disulfide, and carbon tetrachloride, and organic solvents such as ketone-based solvents (e.g., methyl ethyl ketone (MEK), acetone, diethyl ketone, methyl isobutyl ketone (MIBK), methyl isopropyl ketone (MIPK), cyclohexanone, 3-heptanone, and 4-heptanone), alcohol-based solvents (e.g., methanol, ethanol, n-propanol, isopropanol, n-butanol, i-butanol, t-butanol, 3-methyl-1-butanol, 1-pentanol, 2-pentanol, n-hexanol, cyclohexanol, 1-heptanol, 1-octanol, 2-octanol, 2-methoxyethanol, allyl alcohol, furfuryl alcohol, and phenol), ether-based solvents (e.g., diethyl ether, dipropyl ether, diisopropyl ether, dibutyl ether, 1,2-dimethoxy ethane (DME), 1,4-dioxane, tetrahydrofuran (THF), tetrahydropyran (THP), anisole, diethylene glycol dimethyl ether (diglyme), and 2-methoxyethanol), cellosolve-based solvents (e.g., methyl cellosolve, ethyl cellosolve, and phenyl cellosolve), aliphatic hydrocarbon-based solvents (e.g., hexane, pentane, heptane, cyclohexane, methylcyclohexane, octane, didecane, methylcyclohexene, and isoprene), aromatic hydrocarbon-based solvents (e.g., toluene, xylene, benzene, ethyl benzene, and naphthalene), aromatic heterocyclic compound-based solvents (e.g., pyridine, pyrazine, furan, pyrrole, thiophene, 2-methylpyridine, 3-methylpyridine, 4-methylpyridine, and furfuryl alcohol), amide-based solvents (e.g., N,N-dimethylformamide (DMF) and N,N-dimethylacetamide (DMA)), halide-based solvents (e.g., dichloromethane, chloroform, 1,2-dichloroethane, trichloroethylene, and chlorobenzene), ester-based solvents (e.g., acetylacetone, ethyl acetate, methyl acetate, isopropylacetate, isobutyl acetate, isopentyl acetate, ethyl chloroacetate, butyl chloroacetate, isobutyl chloroacetate, ethyl formate, isobutyl formate, ethyl acrylate, methyl methacrylate, and ethyl benzoate), amine-based solvents (e.g., trimethylamine, hexylamine, triethylamine, and aniline), nitrile-based solvents (e.g., acrylonitrile and acetonitrile), nitro-based solvents (e.g., nitromethane and nitroethane), and aldehyde-based solvents (e.g., acetaldehyde, propionaldehyde, butyraldehyde, pentanal, and acrylaldehyde). These solvents can be used singly or in combination of two or more of them. Among these solvents, one containing the organic solvent is particularly preferable, and one containing one or more of the ether-based solvents, cellosolve-based solvents, aliphatic hydrocarbon-based solvents, aromatic hydrocarbon-based solvents, aromatic heterocyclic compound-based solvents, amide-based solvents, halide-based solvents, ester-based solvents, nitrile-based solvents, nitro-based solvents, and aldehyde-based solvents is more preferable. By using such a solvent, it is possible to relatively easily disperse each of the components as described above in the dispersoid 61 sufficiently homogeneously.

Further, the dispersion liquid 6 usually contains a coloring agent. As a coloring agent, pigments, dyes, and the like can be used, for example. Examples of such pigments and dyes include Carbon Black, Spirit Black, Lamp Black (C. I. No. 77266), Magnetite, Titanium Black, Chrome Yellow, Cadmium Yellow, Mineral Fast Yellow, Naples Yellow, Naphthol Yellow S, Hansa Yellow G, Permanent Yellow NCG, Chrome Yellow, Benzidine Yellow, Quinoline Yellow, Tartrazine Lake, Chrome Orange, Molybdate Orange, Permanent Orange GTR, Pyrazolone Orange, Benzidine Orange G, Cadmium Red, Permanent Red 4R, Watching Red calcium salt, Eosine Lake, Brilliant Carmine 3B, Manganese Violet, Fast Violet B, Methyl Violet Lake, Prussian Blue, Cobalt Blue, Alkali Blue Lake, Victoria Blue Lake, Fast Sky Blue, Indanthrene Blue BC, Ultramarine Blue, Spirit Blue, Phthalocyanine Blue, Chalco Oil Blue, Chrome Green, Chromium Oxide, Pigment Green B, Malachite Green Lake, Phthalocyanine Green, Final Yellow Green G, Rhodamine 6G, Quinacridone, Rose Bengal (C. I. No. 45432), C. I. Direct Red 1, C. I. Direct Red 4, C. I. Acid Red 1, C. I. Basic Red 1, C. I. Mordant Red 30, C. I. Pigment Red 48:1, C. I. Pigment Red 57:1, C. I. Pigment Red 122, C. I. Pigment Red 184, C. I. Direct Blue 1, C. I. Direct Blue 2, C. I. Acid Blue 9, C. I. Acid Blue 15, C. I. Basic Blue 3, C. I. Basic Blue 5, C. I. Mordant Blue 7, C. I. Pigment Blue 15:1, C. I. Pigment Blue 15:3, C. I. Pigment Blue 5:1, C. I. Direct Green 6, C. I. Basic Green 4, C. I. Basic Green 6, C. I. Pigment Yellow 17, C. I. Pigment Yellow 93, C. I. Pigment Yellow 97, C. I. Pigment Yellow 12, C. I. Pigment Yellow 180, C. I. Pigment Yellow 162, nigrosine dye (C. I. No. 50415B), metal complex salt dyes, silica, metal oxides (e.g., aluminum oxide, magnetite, maghemite, various ferrites, cupric oxide, nickel oxide, zinc oxide, zirconium oxide, titanium oxide, and magnesium oxide), and magnetic materials containing magnetic metals such as Fe, Co, and Ni. These coloring agents can be used singly or in combination of two or more of them. Such a coloring agent is usually contained in the dispersoid 61 of the dispersion liquid 6.

The amount of the coloring agent contained in the dispersion liquid 6 is not limited to any specific value, but is preferably in the range of 0.1 to 10 wt %, more preferably in the range of 0.3 to 3.0 wt %. If the amount of the coloring agent contained in the dispersion liquid 6 is less than the above lower limit value, there is a possibility that it is difficult to form a visible image having a sufficient density depending on the kind of coloring agent. On the other hand, if the amount of the coloring agent contained in the dispersion liquid 6 exceeds the above upper limit value, there is a possibility that fixing properties and electrification properties of the finally obtained toner are lowered.

Furthermore, the dispersion liquid 6 may contain wax. Usually, wax is used to improve releasability. Examples of such wax include natural waxes such as vegetable waxes (e.g., candelilla wax, carnauba wax, rice wax, cotton wax, and Japan wax), animal waxes (e.g., beeswax and lanolin), mineral waxes (e.g., montan wax, ozokerite, and ceresin), oil waxes (e.g., paraffin wax, micro wax, microcrystalline wax, and petrolatum), and synthetic waxes such as synthetic hydrocarbon waxes (e.g., Fischer-Tropsch wax, polyethylene wax (polyethylene resin), polypropylene wax (polypropylene resin), oxidized polyethylene wax, and oxidized polypropylene wax), fatty acid amides (e.g., 12-hydroxystearic acid amide, stearic acid amide, phthalic anhydride imide, and chlorinated hydrocarbons), esters, ketones, and ethers. These waxes can be used singly or in combination of two or more of them. Further, crystalline polymeric resins having a low molecular weight can also be used as wax. For example, crystalline polymers having long alkyl side chains, such as homopolymers of acrylate (e.g., poly n-stearyl methacrylate and poly n-lauryl methacrylate) and copolymers of acrylate (e.g., n-stearyl acrylate-ethyl methacrylate copolymers) can also be used.

The amount of the wax contained in the dispersion liquid 6 is not limited to any specific value, but is preferably 1.0 wt % or less, more preferably 0.5 wt % or less. If the amount of the wax contained in the dispersion liquid 6 is too large, a phenomenon in which the wax exudes to the surface of the finally obtained toner particles conspicuously occurs due to liberation and aggregation of the wax, so that the transfer efficiency of the toner tends to be lowered.

The softening point of the wax is not limited to any specific value, but is preferably in the range of 50 to 180° C., more preferably in the range of 60 to 160° C.

The dispersion liquid 6 may further contain other components such as emulsifying/dispersing agents, charge controlling agents, and magnetic powders. Among them, an emulsifying/dispersing agent makes it possible to, for example, improve the dispersibility of the dispersoid 61 in the dispersion liquid 6. Examples of such an emulsifying/dispersing agent include emulsifiers, dispersants, and dispersing aids.

Examples of the dispersants include: inorganic dispersants such as tricalcium phosphate; nonionic organic dispersants such as polyvinyl alcohol, carboxymethyl cellulose, and polyethylene glycol; anionic organic dispersants such as tristearic acid metal salts (e.g., aluminum salts), distearic acid metal salts (e.g., aluminum salts and barium salts), stearic acid metal salts (e.g., calcium salts, lead salts, and zinc salts), linolenic acid metal salts (e.g., cobalt salts, manganese salts, lead salts, and zinc salts), octanoic acid metal salts (e.g., aluminum salts, calcium salts, and cobalt salts), oleic acid metal salts (e.g., calcium salts and cobalt salts), palmitic acid metal salts (e.g., zinc salts), naphthenic acid metal salts (e.g., calcium salts, cobalt salts, manganese salts, lead salts, and zinc salts), resin acid metal salts (e.g., calcium salts, cobalt salts, manganese salts, lead salts, and zinc salts), polyacrylic acid metal salts (e.g., sodium salts), polymethacrylic acid metal salts (e.g., sodium salts), polymaleic acid metal salts (e.g., sodium salts), metal salts of acrylic acid-maleic acid copolymers (e.g., sodium salts), polystyrenesulfonic acid metal salts (e.g., sodium salts); and cationic organic dispersants such as quaternary ammonium salts. Among these dispersants, nonionic organic dispersants or anionic organic dispersants are particularly preferable.

The amount of the dispersant contained in the dispersion liquid 6 is not limited to any specific value, but is preferably 3.0 wt % or less, more preferably in the range of 0.01 to 1.0 wt %.

Examples of the dispersing aids include anionic surfactants, cationic surfactants, and nonionic surfactants.

The dispersing aid is preferably used together with the dispersant. In a case where the dispersion liquid 6 contains the dispersant, the amount of the dispersing aid contained in the dispersion liquid 6 is not limited to any specific value, but is preferably 2.0 wt % or less, more preferably in the range of 0.005 to 0.5 wt %.

Examples of the charge controlling agent include metal salts of benzoic acid, metal salts of salicylic acid, metal salts of alkyl salicylic acid, metal salts of catechol, metal-containing bisazo dyes, nigrosine dyes, tetraphenylborate derivatives, quaternary ammonium salts, alkyl pyridinium salts, chlorinated polyesters, and nitrohumic acid.

Examples of the magnetic powders include powders of metal oxides such as magnetite, maghemite, various ferrites, cupric oxide, nickel oxide, zinc oxide, zirconium oxide, titanium oxide, and magnesium oxide, and powders of magnetic materials containing magnetic metals such as Fe, Co, and Ni.

The dispersion liquid 6 may further contain, for example, zinc stearate, zinc oxide, or cerium oxide, in addition to the above-mentioned materials.

In the dispersion liquid 6, a component other than the dispersoid 61 may also be dispersed as an insoluble matter. For example, inorganic powders of silica, titanium oxide, or iron oxide, or organic powders of fatty acid or fatty acid metal salts may be dispersed in the dispersion liquid 6.

As described above, the dispersion liquid 6 is in a state where the dispersoid 61 is finely dispersed in the dispersion medium 62.

The average particle diameter of the dispersoid 61 contained in the dispersion liquid 6 is not limited to any specific value, but is preferably in the range of 0.05 to 1.0 μm, more preferably in the range of 0.1 to 0.8 μm. By setting the average particle diameter of the dispersoid 61 to a value within the above range, it is possible to allow the finally obtained toner particles to have a sufficiently high degree of roundness and excellent uniformity in properties and shape among particles.

The amount of the dispersoid 61 contained in the dispersion liquid 6 is not limited to any specific value, but is preferably in the range of 1 to 99 wt %, more preferably in the range of 5 to 95 wt %. If the amount of the dispersoid 61 contained in the dispersion liquid 6 is less than the above lower limit value, the degree of roundness of the finally obtained toner particles tends to be lowered. On the other hand, if the amount of the dispersoid 61 contained in the dispersion liquid 6 exceeds the above upper limit value, the viscosity of the dispersion liquid 6 becomes high depending on the composition of the dispersion medium 62, so that the finally obtained toner (toner particles) tends to have large variations in size and shape among the particles.

In the dispersion liquid 6, the dispersoid 61 may be in the form of solid, liquid, or a mixture of both. That is, the dispersion liquid 6 may be a suspension or an emulsion.

In a case where the dispersoid 61 is in a liquid state (e.g., a solution state or a molten state), it is possible to relatively easily set the average particle diameter of the dispersoid 61 finely dispersed in the dispersion medium 62 to a value within the above-described range. In addition, in a case where the dispersoid 61 is in a liquid state, it is also possible to allow the dispersoid 61 to have especially small variations in particle size and shape. As a result, the finally obtained toner has especially small variations in particle size and shape.

On the other hand, in a case where the dispersoid 61 is in a solid state, it is possible to more effectively prevent undesired components such as a solvent from remaining in the finally obtained toner. As a result, the obtained toner has especially excellent reliability. Further, in a case where the dispersoid 61 is in a solid state, that is, in a case where the dispersion liquid 6 is a suspension, the suspension as the dispersion liquid 6 may be prepared by way of an emulsion, for example. By doing so, the advantages obtained in a case where the dispersoid 61 is in a liquid state are also exhibited effectively while the advantages obtained in a case where the dispersoid 61 is in a solid state are properly exhibited.

The dispersoid 61 dispersed in the dispersion medium 62 may have substantially the same composition or different composition among particles thereof. For example, the dispersion liquid 6 may contain both the dispersoid 61 mainly composed of the resin material and the dispersoid 61 mainly composed of the wax.

In a case where the dispersion liquid 6 is an emulsion, the dispersion liquid 6 is preferably an O/W type emulsion, that is, an emulsion in which an oily dispersoid 61 (here, the term "oily dispersoid" means a liquid having a low degree of solubility in water) is dispersed in an aqueous dispersion medium 62. By using such an emulsion as the dispersion liquid 6, it is possible to produce a toner having small variations in particle size and shape with stability. In addition, the use of an aqueous liquid as the dispersion medium 62 makes it possible to reduce the amount of an organic solvent to be volatilized in the solidifying portion of the toner production apparatus (which will be described later) or to volatilize substantially no organic solvent. Therefore, it is possible to produce a toner in a manner which has almost no adverse effects on the environment.

When the average particle diameter of the dispersoid 61 contained in the dispersion liquid 6 is defined as Dm (μm) and the average particle diameter of the toner particles is defined as Dt (μm), Dm and Dt preferably satisfy the relation: $0.005 \leq Dm/Dt \leq 0.5$, more preferably satisfy the relation: $0.01 \leq Dm/Dt \leq 0.2$. By allowing Dm and Dt to satisfy the above relation, it is possible to obtain a toner having especially small variations in particle size and shape.

Such a dispersion liquid 6 as described above can be prepared by a method (a first method) described below.

First, an aqueous solution is prepared by adding a dispersant and/or a dispersion medium when necessary to water or a liquid having good compatibility with water (that is, an aqueous liquid).

At the same time, a resin liquid containing a resin that is a main component of a toner or a precursor thereof (hereinafter, collectively referred to as a "resin material") is prepared. At this time, the above-described solvent may be used in addition to the resin material. Alternatively, a resin liquid may be prepared by melting a resin material by heating.

Next, the thus obtained resin liquid is added drop by drop to the aqueous solution under stirring to obtain a dispersion liquid 6 in which a dispersoid 61 containing the resin material is dispersed in an aqueous dispersion medium 62. By preparing a dispersion liquid 6 according to such a method, it is possible to further increase the degree of roundness of a dispersoid 61 contained in the dispersion liquid 6. As a result, the finally obtained toner particles have an especially high degree of roundness and especially small variations in shape. In this connection, it is to be noted that the aqueous solution and/or the resin liquid may be heated during the dropping of the resin liquid. Further, in a case where the resin liquid is prepared using a solvent, at least a part of the solvent contained in the dispersoid 61 may be removed after the dropping of the resin liquid by heating the obtained dispersion liquid 6 or placing the obtained dispersion liquid 6 in a reduced-pressure atmosphere. For example, by removing most of the solvent contained in the dispersoid 61, it is possible to allow the dispersion liquid 6 to be a suspension.

Although one method for preparing a dispersion liquid 6 has been described above by way of example, a dispersion liquid to be used in the present invention is not limited to one prepared by such a method, and may also be prepared by a different method (a second method) as described below.

First, an aqueous solution is prepared by adding a dispersant and/or a dispersion medium when necessary to water or a liquid having good compatibility with water.

At the same time, a powdery or particulate material containing a resin material is prepared.

Next, the powdery or particulate material is added little by little to the aqueous solution under stirring to obtain a dispersion liquid 6 in which a dispersoid 61 containing the resin material is dispersed in an aqueous dispersion medium 62. According to such a method, substantially no organic solvent is volatilized in the solidifying portion of the toner production apparatus. Therefore, it is possible to produce a toner in a manner that has almost no adverse effects on the environment. In this connection, it is to be noted that the aqueous solution may be heated when the powdery or particulate material is added to the aqueous solution.

Further, a dispersion liquid 6 to be used in the present invention may also be prepared by a method (a third method) as described below.

First, a resin dispersion liquid, in which at least a resin material is dispersed, and a coloring agent dispersion liquid, in which at least a coloring agent is dispersed, are prepared.

Next, the resin dispersion liquid and the coloring agent dispersion liquid are mixed and stirred. At this time, a flocculating agent such as an inorganic metal salt or the like may be added when necessary under stirring.

By stirring them for a predetermined time, agglomerates of the resin material and the coloring agent are formed, so that a dispersion liquid 6 in which the agglomerates as a dispersoid 61 are dispersed is obtained.

In the dispersion liquid preparation methods as described above, a kneaded material containing a resin material (a binder resin) may also be used. Specifically, in the first and third methods, a kneaded material containing a resin material may be used as the "resin material", and in the second method, a kneaded material containing a resin material may be used as the "powdery or particulate material". By using such a kneaded material containing a resin material, it is possible to obtain toner particles in which the components thereof are more homogeneously mixed. In particular, even in a case where a toner is produced using two or more components having poor dispersibility and compatibility, the above-described effect can be obtained. It is to be noted that the kneaded material may contain other components in addition to the resin component (e.g., coloring agents, waxes, and charge controlling agents). When the kneaded material contains such components in addition to the resin component, the above-described effect becomes more conspicuous.

Further, a dispersion liquid 6 to be used in the present invention may also be prepared according to a method disclosed in, for example, Japanese Patent Application No. 2003-113428. Specifically, a liquid containing a powdery or particulate resin material (kneaded material) is injected through two or more nozzles to collide the liquids injected through each of the nozzles with each other, so that the resin material (the kneaded material) is formed into fine particles. In this way, a dispersion liquid 6 containing the fine particles as a dispersoid 61 is obtained. According to such a method, it is possible to easily allow the fine particles of the dispersoid 61 contained in the dispersion liquid 6 to have a relatively small size (a particle diameter within the above-described range) and small variations in size.

The dispersion liquid 6 obtained by the above-described method is preferably subjected to deaeration treatment (a deaeration process) before the dispersion liquid 6 is ejected from the toner production apparatus which will be described later. By subjecting the dispersion liquid 6 to deaeration treatment, it is possible to reduce the amount of gas dissolved in the dispersion liquid 6, thereby effectively preventing the generation of bubbles or the like in the dispersion liquid 6 when the dispersion medium 62 is removed from the droplets of the ejected dispersion liquid 6 in the solidifying portion of the toner production apparatus. Therefore, it is possible to effectively prevent defective toner particles (e.g., hollow particles and chipped particles) from mixing in the finally obtained toner. As a result, it is possible to easily and reliably obtain a toner having a uniform particle shape and a narrow particle size distribution. The thus finally obtained toner has especially excellent transfer properties, fluidity and cleaning properties and the like. Further, by subjecting the dispersion liquid 6 to deaeration treatment, it is also possible to reduce the ratio of pore (void) in the finally obtained toner particles, thereby further improving the reliability of the toner.

Examples of a method of deaeration treatment include, but not limited thereto, a method in which ultrasonic vibration is applied to the dispersion liquid (that is, an ultrasonic vibration method) and a method in which the dispersion liquid is placed in a reduced-pressure atmosphere (that is, an evacuation method).

In a case where the evacuation method is used for the deaeration treatment, the pressure of an atmosphere where the dispersion liquid is placed is preferably 80 kPa or less, more preferably in the range of 0.1 to 40 kPa, even more preferably in the range of 1 to 27 kPa. By setting the ambient pressure during deaeration treatment to a value within the above range, it is possible to efficiently remove gas dissolved in the dispersion liquid 6 while properly maintaining the shape of the dispersoid 61 contained in the dispersion liquid 6.

The method for producing resin particles (toner particles) according to the present invention comprises the steps of removing a dispersion medium constituting a dispersion liquid by ejecting the dispersion liquid from head portions in the form of droplets while conveying the droplets of the dispersion liquid in a solidifying portion to obtain agglomerates each of which is composed of two or more fine particles derived from a dispersoid, and bonding the two or more fine particles constituting each of the agglomerates together by welding them. The dispersion medium removing step can be carried out using, for example, a toner production apparatus 1 shown in FIG. 1. Hereinbelow, the toner production apparatus 1 and a method for producing agglomerates and toner particle obtained using the toner production apparatus 1 will be described in detail.

<Toner Production Apparatus>

The toner production apparatus 1 includes head portions 2 for ejecting the dispersion liquid 6 as described above (especially, the dispersion liquid 6 which has been subjected to deaeration treatment), a dispersion liquid supply portion 4 for supplying the dispersion liquid 6 to the head portions 2, a solidifying portion 3 in which the dispersion liquid 6 ejected from the head portions 2 in the form of droplets is conveyed, and a collecting portion 5 for collecting produced agglomerates 9. In the solidifying portion 3, the dispersion medium 62 is removed from the dispersion liquid 6 ejected from the head portions 2, thereby enabling to obtain agglomerates 9 each of which is composed of two or more fine particles derived from the dispersoid 61 contained in each droplet (the dispersion medium removing step).

The dispersion medium removing step is preferably carried out under conditions milder than those for the bonding step which will be described later. This makes it possible to remove the dispersion medium 62 while maintaining the shapes (that is, a substantially spherical shape) of the droplets of the dispersion liquid 6 ejected from the head portions 2, thereby allowing the obtained agglomerates 9 to have a relatively high degree of roundness.

In the dispersion liquid supply portion 4, the dispersion liquid 6 as described above is stored. The dispersion liquid 6 is fed to the head portions 2 from the dispersion liquid supply portion 4.

The dispersion liquid supply portion 4 is not particularly limited as long as it has the function of supplying the dispersion liquid 6 to the head portions 2. As shown in FIG. 1, the dispersion liquid supply portion 4 may have stirring means 41 for stirring the dispersion liquid 6. By providing the stirring means 41, it is possible to supply the dispersion liquid 6 to the head portions 2 while dispersing the dispersoid 61 sufficiently homogeneously in the dispersion liquid 6, even when the dispersoid 61 is hard to be dispersed in the dispersion medium.

Each of the head portions 2 has a dispersion liquid storage portion 21, a piezoelectric device (element) 22, and an ejecting portion 23. In the dispersion liquid storage portion 21, the dispersion liquid 6 as described above is stored. The dispersion liquid 6 stored in the dispersion liquid storage portion 21 is ejected through the ejecting portion 23 into the solidifying portion 3 by the use of a pressure pulse (a piezoelectric pulse) of the piezoelectric device 22.

The feature of the present invention resides in the use of the dispersion liquid as an ejecting liquid. By using the dispersion liquid as an ejecting liquid, it is possible to obtain the following effects.

Specifically, at the time when the ejecting liquid (the dispersion liquid) is ejected through the ejecting portions, the dispersion liquid is selectively cut somewhere in the dispersion medium having a low viscosity from a microscopic standpoint, so that the dispersion liquid is ejected in the form of droplets. Therefore, the ejected droplets of the dispersion liquid have small variations in size. As a result, the finally obtained toner (toner particles) also has small variations in particle size.

Then, the droplets ejected through the ejecting portions are quickly formed into a spherical shape due to the surface tension of the dispersion medium. Further, since the droplets of the dispersion liquid has excellent shape stability, they are conveyed and then solidified in the solidifying portion while maintaining a substantially spherical shape. Therefore, the finally obtained toner (toner particles) has a high degree of roundness and small variations in particle shape.

On the other hand, in a case where a solution or a molten liquid is used as an ejecting liquid, such effects as described above cannot be obtained. Specifically, such an ejecting liquid has a uniform viscosity when microscopically observed, and therefore the ejecting portion tends to have difficulty in cutting the ejecting liquid when ejecting the ejecting liquid. As a result, each droplet of the ejecting liquid tends to have an elongated tail. Also, while the droplet of the ejecting liquid is conveyed in the solidifying portion, an elongated tail is likely to be formed in the droplet. For this reason, in a case where a solution or a molten liquid is used as an ejecting liquid, the finally obtained toner (toner particles) tends to have large variations in particle size and shape and a low degree of roundness.

The shape of the ejecting portion 23 is not particularly limited, but it is preferred that each of the ejecting portions 23 has a substantially circular shape. By making the shape of the ejecting portion substantially circular, it is possible to increase sphericity of each droplet of the ejected dispersion liquid 6, the agglomerates 9 formed in the solidifying portion, and the finally obtained toner particles.

In a case where the ejecting portion 23 is substantially circular, the diameter thereof (the diameter of a nozzle) is preferably in the range of 5 to 500 µm, more preferably in the range of 10 to 200 µm. If the diameter of the ejecting portion 23 is less than the above lower limit value, clogging is likely to occur, thus resulting in a case where the ejected dispersion liquid 6 has large variations in size. On the other hand, if the diameter of the ejecting portion 23 exceeds the above upper limit value, there is a possibility that the ejected dispersion liquid 6 contains bubbles depending on the power balance between the negative pressure of the dispersion liquid storage portion 21 and the surface tension at the nozzle.

In the toner production apparatus 1, it is preferred that the vicinity of the ejecting portion 23 of each of the head portions 2 (especially, the inner surface of an opening of each of the ejecting portions 23, and the surface of each of the head portions 2 on the side where the ejecting portion 23 is provided (that is, the surface of each of the head portions 2 on the lower side in FIG. 2)) has repellency against the dispersion liquid 6. This makes it possible to effectively prevent the dispersion liquid 6 from being adhered to the vicinity of the ejecting portions. As a result, it is possible to effectively prevent the ejecting portions 23 from having difficulty in ejecting and cutting the dispersion liquid 6. As described above, when the dispersion liquid 6 is effectively prevented from being adhered to the vicinity of the ejecting portions, the shape stability of the ejected droplets of the dispersion liquid 6 is improved (that is, the droplets have small variations in size and shape), thereby allowing the finally obtained toner particles to have small variations in size and shape.

Examples of a material having such a liquid repellency include fluorine-based resins such as polytetrafluoroethylene (PTFE) and silicone-based materials.

Further, in the toner production apparatus 1, it is also preferred that the vicinity of the ejecting portion 23 of each of the head portions 2 (especially, the inner surface of an opening of each of the ejecting portions 23, and the surface of each of the head portions 2 on the side where the ejecting portion 23 is provided (that is, the surface of each of the head portions 2 on the lower side in FIG. 2) is treated so as to have hydrophobicity. By allowing the vicinity of the ejecting portion 23 of each of the head portions 2 to have hydrophobicity, the liquid repellency as described above is more properly exhibited so that the above-described effects become more conspicuous, in a case where the dispersion medium 62 of the dispersion liquid 6 is mainly composed of water. As a method for treating the vicinity of the ejecting portion 23 of each of the head portions 2 so as to have hydrophobicity, formation of a coating film constituted of a hydrophobic material (e.g., the above-mentioned material having liquid repellency) can be mentioned, for example. In the meantime, although water has relatively high viscosity among various liquids, by allowing the vicinity of the ejecting portion of each of the head portions 2 to have hydrophobicity, it is possible to effectively prevent the occurrence of negative effects caused by the adhesion of the dispersion liquid 6 to the vicinity of the ejecting portions even when water is used as the constituent material of the dispersion medium 62. For this reason, when the vicinity of the ejecting portion 23 of each of the head portions 2 has hydrophobicity, the dispersion liquid 6 containing substantially no organic solvent or the dispersion liquid 6 containing almost no organic solvent can be used, thereby enabling a toner to be produced in a manner that has almost no adverse effects on the environment.

As shown in FIG. 2, each of the piezoelectric devices 22 is formed by laminating a lower electrode (a first electrode) 221, a piezoelectric element 222, and an upper electrode (a second electrode) 223 in this order from the bottom side. In other words, each of the piezoelectric devices 22 has a structure in which the piezoelectric element 222 is provided between the upper electrode 223 and the lower electrode 221.

The piezoelectric device 22 functions as a source of vibration. A diaphragm 24 vibrates due to the vibration of the piezoelectric device (a source of vibration) 22 to instantaneously increase the internal pressure of the ejection liquid storage portion 21.

In each of the head portions 2, the piezoelectric element 222 keeps its original shape in a state where a predetermined eject signal from a piezoelectric device driving circuit (not shown in the drawings) is not inputted, that is, in a state where a voltage is not applied across the lower electrode 221 and the upper electrode 223 of the piezoelectric device 22. At this time, since the diaphragm 24 also keeps its original shape, the volume of the dispersion liquid storage portion 21 is not changed. That is, the dispersion liquid 6 is not ejected through the ejecting portion 23.

On the other hand, the piezoelectric element 222 changes its shape when a predetermined ejecting signal from the piezoelectric device driving circuit is inputted, that is, when a predetermined voltage is applied across the lower electrode 221 and the upper electrode 223 of the piezoelectric device 22. As a result, the diaphragm 24 is significantly bent (toward the lower side in FIG. 2), so that the volume of the dispersion liquid storage portion 21 is reduced (changed). At this time, the pressure in the dispersion liquid storage portion 21 is instantaneously increased, so that the dispersion liquid 6 is ejected in the form of a droplet through the ejecting portion 23.

When single ejection of the dispersion liquid 6 is finished, the piezoelectric device driving circuit stops a voltage from being applied across the lower electrode 221 and the upper electrode 223. As a result, the piezoelectric device 22 is returned to its almost original shape so that the volume of the ejection liquid storage portion 21 is increased. At this time, since pressure is exerted on the dispersion liquid 6 in the direction from the dispersion liquid supply portion 4 to the ejecting portion 23 (that is, in the positive direction), it is possible to prevent air from entering the dispersion liquid storage portion 21 through the ejecting portion 23. Then, the dispersion liquid 6 in an amount equal to the ejected amount thereof is supplied to the dispersion liquid storage portion 21 from the dispersion liquid supply portion 4.

By carrying out predetermined periodic application of a voltage in such a manner as described above, the dispersion liquid 6 is repeatedly ejected in the form of droplets due to vibration of the piezoelectric device 22.

As described above, by carrying out ejection (discharge) of the dispersion liquid 6 by the use of a pressure pulse due to vibration of the piezoelectric element 222, it is possible to eject the dispersion liquid 6 intermittently drop by drop with the shape of the ejected dispersion liquid 6 being stable, thereby enabling to obtain resin particles (a toner) having small variations in size and shape. In addition, toner particles having a high degree of sphericity (that is, toner particles having a shape close to a geometrically perfect sphere) are produced relatively easily.

Further, since ejection (discharge) of the dispersion liquid is carried out in a manner as described above, it is possible to relatively precisely control the frequency of the piezoelectric element, the area of an opening of the ejecting portion (the diameter of a nozzle), the temperature and viscosity of the dispersion liquid, the ejected amount of one droplet of the dispersion liquid, the ratio of the dispersoid in the dispersion liquid, or the particle diameter of the dispersoid contained in the dispersion liquid, and therefore it is possible to easily produce a toner having a desired shape and size. In addition, by controlling such conditions, it is possible to control the production amount of a toner easily and reliably.

By ejecting the dispersion liquid by the use of vibration of the piezoelectric element, it is possible to more reliably eject the dispersion liquid at predetermined intervals. This makes it possible to effectively prevent collision or agglomeration between the ejected droplets of the dispersion liquid, thus resulting in effectively preventing defective particles from being formed.

The initial velocity of the dispersion liquid 6 at the time when the dispersion liquid 6 is ejected from the head portions 2 into the solidifying portion 3 is preferably in the range of, for example, 0.1 to 10 m/sec, more preferably in the range of 2 to 8 m/sec. If the initial velocity of the dispersion liquid 6 is less than the above lower limit value, productivity of agglomerates 9 and a toner is lowered. On the other hand, the initial velocity of the dispersion liquid 6 exceeds the above upper limit value, the finally obtained toner particles tend to have a lower degree of sphericity.

The viscosity of the dispersion liquid 6 ejected from the head portions 2 is not limited to any specific value, but is preferably in the range of, for example, 0.5 to 200 (mPa·s), more preferably in the range of 1 to 25 (mPa·s). If the viscosity of the dispersion liquid 6 is less than the above lower limit value, it is difficult to properly control the size of each droplet of the dispersion liquid 6, thus resulting in a case where the finally obtained toner particles have large variations in size. On the other hand, if the viscosity of the dispersion liquid 6 exceeds the above upper limit value, there is a tendency that formed particles have a larger diameter, the ejecting velocity of the dispersion liquid 6 becomes low, and the amount of energy required to eject the dispersion liquid 6 becomes large. In a case where the viscosity of the dispersion liquid 6 is especially high, it is impossible to eject the dispersion liquid 6 in the form of droplets.

The temperature of the dispersion liquid 6 to be ejected from the head portions 2 (the dispersion liquid 6 in the head portions 2) is not limited to any specific value, but is preferably substantially equal to or lower than the temperature in the solidifying portion 3 which will be described later in detail (the processing temperature of the dispersion medium removing step). By setting the temperature of the dispersion liquid 6 to be ejected from the head portions 2 to a value within the above range, it is possible to effectively prevent the composition (concentration) of the dispersion liquid 6 from changing with the lapse of time due to volatilization of the dispersion medium 62 in the head portions 2. In addition, it is also possible to effectively prevent the clogging of the ejecting portions 23 caused by the volatilization of the dispersion medium 62 from the dispersion liquid 6 in the vicinity of the ejecting portions 23 prior to ejection of the dispersion liquid 6 (prior to cutting of the dispersion liquid 6). Particularly, when the temperature of the dispersion liquid 6 to be ejected from the head portions 2 (the dispersion liquid 6 in the head portions 2) is defined as $T_0$ (° C.), and the temperature in the solidifying portion 3 which will be described later in detail (the processing temperature of the dispersion medium removing step) is defined as $T_1$ (° C.), $T_0$ and $T_1$ preferably satisfy the relation: $-5 \leq T_1-T_0 \leq 60$, more preferably satisfy the relation: $-5 \leq T_1-T_0 \leq 50$, even more preferably satisfy the relation: $5 \leq T_1-T_0 \leq 40$. By allowing $T_0$ and $T_1$ to satisfy the above relation, it is possible to make the effects described above more conspicuous.

The dispersion liquid 6 to be ejected from the head portions 2 may be heated in advance (particularly, may be heated to a temperature equal to or lower than the temperature in the solidifying portion 3 which will be described later in detail). By heating the dispersion liquid 6 in such a manner, it is possible to make the dispersoid 61 be in a molten state (or in a softened state where viscosity is relatively low) when the dispersion liquid 6 is ejected, even if the dispersoid 61 is in a solid state (or in a state where viscosity is relatively high) at room temperature. Therefore, agglomeration of the dispersoid 61 in the form of fine particles contained in the dispersion liquid 6 smoothly occurs in the solidifying portion 3 which will be described later, so that the obtained agglomerates 9 have an especially high degree of roundness. As a result, the finally obtained toner particles also have a high degree of roundness.

The ejected amount of one droplet of the dispersion liquid 6 slightly varies depending on the content of the dispersoid 61 in the dispersion liquid 6, but is preferably in the range of 0.05 to 500 pl, more preferably in the range of 0.5 to 5 pl. By setting the ejected amount of one droplet of the dispersion liquid 6 to a value within the above range, it is possible to allow the agglomerates 9 to have an appropriate particle diameter. As a result, the finally obtained toner particles also have an appropriate particle diameter.

In the meantime, in general, each droplet of the dispersion liquid 6 ejected from the head portions 2 is enough large as compared to each fine particle of the dispersoid 61 contained in the dispersion liquid 6. That is, in each droplet of the dispersion liquid 6, a plurality of fine particles of the dispersoid 61 are dispersed. Therefore, even when the fine particles of the dispersoid 61 contained in each droplet have relatively large variations in their particle diameters, the ratio of the dispersoid 61 contained in the ejected droplet of the dispersion liquid 6 is substantially uniform among the droplets of the dispersion liquid 6. For this reason, by allowing the ejected amount of the dispersion liquid 6 to be substantially uniform, it is possible to obtain agglomerates 9 having small variations in particle diameter in this step, even when the fine particles of the dispersoid 61 contained in each droplet have relatively large variations in particle diameter. When the average diameter of the ejected droplets of the dispersion liquid 6 is defined as Dd (μm), and the average particle diameter of the fine particles of the dispersoid 61 contained in the dispersion liquid 6 is defined as Dm (μm), Dd and Dm preferably satisfy the relation: Dm/Dd<0.5, more preferably satisfy the relation: Dm/Dd<0.2. By allowing Dd and Dm to satisfy the above relation, the tendency described above becomes more conspicuous.

Further, when the average diameter of the ejected droplets of the dispersion liquid 6 is defined as Dd (μm), and the average particle diameter of the produced toner particles is defined as Dt (μm), Dd and Dt preferably satisfy the relation: $0.05 \leq Dt/Dd \leq 1.0$, more preferably satisfy the relation: $0.1 \leq Dt/Dd \leq 0.8$. By allowing Dd and Dt to satisfy the above relation, it is possible to relatively easily obtain a toner composed of very fine particles having a high degree of roundness and a sharp particle size distribution.

The frequency of the piezoelectric device 22 (the frequency of an piezoelectric pulse) is not limited to any specific value, but is preferably in the range of 1 kHz to 500 MHz, more preferably in the range of 5 kHz to 200 MHz. If the frequency of the piezoelectric device 22 is less than the above lower limit value, productivity of a toner is lowered. On the other hand, if the frequency of the piezoelectric device 22 exceeds the above upper limit value, there is a possibility that the ejection of the dispersion liquid 6 cannot follow the frequency of the piezoelectric device 22 so that the sizes of the droplets of the dispersion liquid 6 become different from each other.

The toner production apparatus 1 shown in FIG. 1 has two or more head portions 2. From each of the head portions 2, the droplets of the dispersion liquid 6 are ejected into the solidifying portion 3.

The dispersion liquid 6 may be ejected at substantially the same time from all the head portions 2, but it is preferred that the dispersion liquid 6 be ejected in such a manner that the timing of ejection is different in at least two adjacent head portions 2. This makes it possible to effectively prevent collision and agglomeration between the droplets of the dispersion liquid 6 ejected from the adjacent head portions before the droplets of the dispersion liquid 6 are solidified (before the agglomerates 9 are formed).

As shown in FIG. 1, the toner production apparatus 1 has gas stream supply means 10. From the gas stream supply means 10, gas is supplied through a duct 101 and is injected from each gas injection opening 7 provided between the head portions 2 at a substantially even pressure. This makes it possible to convey the droplets of the dispersion liquid 6 intermittently ejected from the ejecting portions 23 with the distance between the droplets of the dispersion liquid 6 being maintained, thereby enabling to obtain (solidify) agglomerates. As a result, it is possible to effectively prevent collision and agglomeration between the ejected droplets of the dispersion liquid 6.

Further, by injecting gas, supplied from the gas stream supply means 10, through the gas injection openings 7, it is possible to form a gas stream flowing in substantially one direction (that is, in a downward direction in FIG. 1) in the solidifying portion 3. Such a gas stream makes it possible to efficiently convey the droplets of the dispersion liquid 6 (the agglomerates 9) in the solidifying portion 3.

Furthermore, gas injected through the gas injection openings 7 forms an air curtain between the droplets ejected from each of the head portions 2, thereby effectively preventing collision and agglomeration between the droplets ejected from the adjacent head portions.

The gas stream supply means 10 is equipped with a heat exchanger 11. By providing such a heat exchanger 11, it is possible to set the temperature of gas to be injected from the gas injection openings 7 to an appropriate value, thereby enabling to efficiently solidify the droplets of the dispersion liquid 6 ejected into the solidifying portion 3.

Further, by providing such gas stream supply means 10, it is possible to easily control the solidification rate of the dispersion liquid 6 ejected from the ejecting portions 23 by adjusting the amount of a gas stream to be supplied.

The temperature of gas to be injected from the gas injection openings 7 varies depending on the compositions of the dispersoid 61 and the dispersion medium 62 contained in the dispersion liquid 6, but is preferably in the range of 0 to 70° C., more preferably in the range of 15 to 60° C. By setting the temperature of gas to be injected from the gas injection openings 7 to a value within the above range, it is possible to effectively remove the dispersion medium 62 contained in the dispersion liquid 6 while the obtained agglomerates 9 are allowed to have a uniform shape and sufficiently high shape stability. As a result, productivity of a toner becomes especially high.

The humidity of gas to be injected from the gas injection openings 7 is preferably 50% RH or less, more preferably 30% RH or less. By setting the humidity of gas to be injected from the gas injection openings 7 to 50% RH or less, it is possible to efficiently remove the dispersion medium 62 contained in the dispersion liquid 6 in the solidifying portion 3, thereby further improving the productivity of agglomerates 9 (a toner).

The temperature in the solidifying portion 3 into which the droplets of the dispersion liquid 6 are to be ejected (the processing temperature (the ambient temperature) of the dispersion medium removing step) varies depending on the compositions of the dispersoid 61 and the dispersion medium 62 contained in the dispersion liquid 6, but is preferably in the range of 0 to 50° C., more preferably in the range of 15 to 40° C. By setting the temperature in the solidifying portion 3 to a value within the above range, it is possible to efficiently remove the dispersion medium 62 contained in the dispersion liquid 6 while the obtained agglomerates 9 are allowed to have a uniform shape and sufficiently high shape stability. As a result, productivity of a toner becomes especially excellent. Further, it is also possible to smoothly carry out the formation of agglomerates 9, which contributes to the reduction in size of the toner production apparatus 1.

Further, the temperature in the solidifying portion 3 into which the droplets of the dispersion liquid 6 are to be ejected (the processing temperature of the dispersion medium removing step) is preferably equal to or lower than the glass transition point of the resin material constituting the dispersoid 61. This makes it possible to remove the dispersion medium 62 while more effectively preventing two or more fine particles derived from the dispersoid 61 from being softened and bonded with each other, thereby allowing the obtained agglomerates 9 to have a uniform shape and sufficiently high shape stability. In addition, it is also possible to effectively prevent the formation of defective resin particles, especially hollow particles, thereby enabling to obtain resin particles having small variations in size and shape. As a result, resin particles having a high degree of sphericity (that is, resin particles having a shape close to a geometrically perfect sphere) are produced relatively easily. In a case where the dispersoid 61 is composed of two or more kinds of the resin materials (resin components), the weighted average (weight basis) of glass transition point of each of the components is defined as Tg.

In particular, the temperature in the solidifying portion 3 into which the droplets of the dispersion liquid 6 are to be ejected (the processing temperature of the dispersion medium removing step) and the glass transition point of the resin material constituting the dispersoid 61 preferably satisfy the following relation. Specifically, when the temperature in the solidifying portion 3 into which the droplets of the dispersion liquid 6 are to be ejected (the processing temperature of the dispersion medium removing step) is defined as $T_1$ (° C.), and the glass transition point of the resin material constituting the dispersoid 61 is defined as Tg (° C.), $T_1$ and Tg preferably satisfy the relation: $0 \leq Tg-T_1 \leq 70$, more preferably satisfy the relation: $0 \leq Tg-T_1 \leq 60$, even more preferably satisfy the relation: $0 \leq Tg-T_1 \leq 30$, most preferably satisfy the relation: $5 \leq Tg-T_1 \leq 26$. By allowing $T_1$ and Tg to satisfy the above relation, it is possible to efficiently remove the dispersion medium 62 contained in the dispersion liquid 6 while the obtained agglomerates 9 are allowed to have a uniform shape and sufficiently high shape stability. As a result, productivity of a toner becomes especially excellent. In a case where the dispersoid 61 is composed of two or more kinds of the resin materials (resin components), the weighted average (weight basis) of glass transition point of each of the components is defined as Tg.

The droplets of the dispersion liquid 6 ejected from the head portions 2 are solidified while being conveyed in the solidifying portion 3, to thereby obtain agglomerates 9 each of which is composed of two or more fine particles derived from the dispersoid 61. Specifically, as the dispersion medium 62 contained in the ejected dispersion liquid 6 is removed, the dispersoid 61 contained in the dispersion liquid 6 is agglomerated, to thereby obtain agglomerates 9. In a case where the dispersoid 61 contains the solvent described above, such a solvent is also usually removed in the solidifying portion 3. The agglomerates 9 obtained in this step should have stability to the extent that their shapes are kept until they are subjected to the bonding step which will be described later. For example, the agglomerates 9 may still contain a part of the dispersion medium 62. Even in such a case, the remaining dispersion medium is properly removed by carrying out the bonding step which will be described later.

Generally, the diameter of each of the fine particles of the dispersoid 61 contained in the dispersion liquid 6 is very small as compared to that of each of the obtained agglomerates 9 (each of the droplets of the dispersion liquid 6 ejected). For this reason, the obtained agglomerates 9 can have a sufficiently high degree of roundness.

Further, since the dispersion medium 62 is removed in the solidifying portion 3, each of the obtained agglomerates 9 generally becomes small as compared to each of the droplets of the dispersion liquid 6 ejected from the ejecting portions 23. For this reason, even when the area (the area of an opening) of the ejecting portion 23 is relatively large, the obtained agglomerates 9 can have a relatively small size. Therefore, in the present invention, even in a case where the head portions 2 have been manufactured without particularly carrying out precise machining (that is, even in a case where the head portions 2 have been manufactured relatively easily), it is possible to obtain sufficiently fine agglomerates 9, that is toner particles.

As described above, in the present invention, it is not necessary to make the area of the ejecting portion 23 extremely small. Therefore, it is possible to relatively easily make the particle size distribution of the dispersion liquid 6 ejected from the head portions 2 sufficiently sharp. As a result, the finally obtained toner has small variations in particle diameter, that is, the finally obtained toner has a sharp particle size distribution.

The solidifying portion 3 is constructed from a tubular housing 31. During the production of a toner, the inside of the housing 31 is preferably maintained at a temperature within a predetermined range. This makes it possible to reduce variations in properties among toner particles (agglomerates 9) which are likely to be caused by the difference in production conditions, thereby improving the reliability of a toner as a whole. For example, the housing 31 may include two or more regions having different temperatures in the longitudinal direction thereof (that is, in the direction that the dispersion liquid 6 and the agglomerates are to be conveyed). This makes it possible to more smoothly remove the dispersion medium 62 while preventing the formation of defective agglomerates 9 (toner particles), thereby improving the productivity of agglomerates 9 (toner particles).

In order to maintain the inside of the solidifying portion 3 at a temperature within a predetermined range, a heat source or a cooling source may be provided inside or outside the housing 31, or the housing 31 may be formed as a jacket having a passage of a heat medium or a cooling medium.

In the toner production apparatus shown in FIG. 1, the pressure in the housing 31 is adjusted by pressure controlling means 12. By adjusting the pressure in the housing 31 in such a manner, it is possible to efficiently remove the dispersion medium 62 contained in the ejected dispersion liquid 6, thereby improving the productivity of a toner. Further, in the toner production apparatus shown in FIG. 1, the pressure controlling means 12 is connected to the housing 31 via a connecting tube 121. Furthermore, in the vicinity of the end portion of the connecting tube 121 connected to the housing 31, there is provided an enlarged-diameter portion 122 having an enlarged inner diameter and a filter 123 for preventing the suction of the agglomerates 9 and the like.

The pressure in the housing 31 is not limited to any specific value, but is preferably 150 kPa or less, more preferably in the range of 100 to 120 kPa, even more preferably in the range of 100 to 105 kPa. By setting the pressure in the housing 31 to a value within the above range, it is possible to more smoothly remove the dispersion medium 62 (that is, the solvent constituting the dispersion medium 62) from the droplets of the dispersion liquid 6 while properly preventing the formation of defective agglomerates 9.

As described above, agglomerates 9 are obtained by agglomeration of the dispersoid 61 contained in each of the droplets of the dispersion liquid 6 due to the removal of the dispersion medium 62 from the dispersion liquid 6 in the solidifying portion 3, but the agglomerates 9 are not limited to those obtained in such a manner. For example, in a case where the dispersoid 61 contains a precursor of the resin material (e.g., a monomer, a dimer or an oligomer of the resin material described above), agglomerates 9 may be obtained by allowing polymerization reaction to proceed while the dispersion medium 62 is removed in the solidifying portion 3. In other words, the constituent material of the agglomerates 9 may be substantially the same as or different from the constituent material of the dispersoid 61.

Further, voltage application means 8 for applying a voltage is connected to the housing 31. By applying a voltage of the same polarity as the droplets of the dispersion liquid 6 (the agglomerates 9) to the side of the inner surface of the housing 31 by the use of the voltage application means 8, it is possible to obtain such effects as described below.

Generally, the toner particles or the agglomerates 9 as intermediates of the toner particles are positively or negatively charged. Therefore, when there is any charged matter of polarity opposite to that of the agglomerates 9 (the dispersion liquid 6), the phenomenon in which the agglomerates 9 are electrostatically attracted and adhered to the charged matter occurs. On the other hand, when there is any charged matter of the same polarity as that of the agglomerates 9, the charged matter and the agglomerates 9 repel each another, thereby effectively preventing the phenomenon in which the agglomerates 9 are adhered to the surface of the charged matter. For this reason, by applying a voltage of the same polarity as that of the particles of the dispersion liquid 6 (the agglomerates 9) to the side of the inner surface of the housing 31, it is possible to effectively prevent the dispersion liquid 6 (the agglomerates 9) from being adhered to the inner surface of the housing 31. As a result, it is also possible to effectively prevent the formation of defective toner particles as well as to improve the collection efficiency of the agglomerates 9.

The housing 31 further includes a reduced-diameter portion 311 in the vicinity of the collection portion 5. In the reduced-diameter portion 311, the inner diameter thereof is reduced toward the lower side in FIG. 1. By providing such a reduced-diameter portion 311, it is possible to efficiently collect the agglomerates 9. As described above, although the dispersion liquid 6 ejected from the ejecting portions 23 is solidified in the solidifying portion 3 (agglomerates 9 are formed), solidification of the dispersion liquid 6 (formation of the agglomerates 9) has been substantially completed in the vicinity of the collection portion 5. Therefore, even if the particles (agglomerates) come in contact with each other in the vicinity of the reduced-diameter portion 311, the problem of agglomeration among the individual agglomerates 9 hardly arises.

The agglomerates 9 obtained by solidifying the droplets of the dispersion liquid 6 are collected in the collection portion 5.

The processing time of the dispersion medium removing step described above (that is, the time between the injection of the droplets of the dispersion liquid 6 and the collection of the agglomerates 9 in the collection portion 5) is preferably in the range of 5 to 120 seconds, more preferably in the range of 5 to 60 seconds, even more preferably in the range of 5 to 20 seconds. By setting the processing time of the dispersion medium removing step to a value within the above range, it is possible to sufficiently improve the productivity of a toner while allowing the obtained agglomerates 9 to have adequate strength (that is, while properly preventing the agglomerates 9 from being decomposed or disintegrated in the collection portion 5 until the agglomerates 9 are subjected to the bonding step which will be described later).

The thus obtained agglomerates 9 may be subjected to various treatments such as aeration, vacuum deaeration (reduced-pressure deaeration), and heating before subjected to the bonding step which will be described later. By subjecting the agglomerates 9 to aeration, it is possible to reduce the amount of the dispersion medium remaining in the agglomerates 9 (e.g., the amount of water contained in the agglomerates 9), thereby enabling to carry out the bonding step (bonding treatment) more properly. That is, the reduction of amount of the dispersion medium remaining in the agglomerates 9 makes it possible to efficiently carry out the bonding step (bonding treatment) in a short period of time while more effectively preventing the deterioration or degeneration of the constituent material of the agglomerates 9.

The amount of water contained in the agglomerates 9 (that is, the water content of the agglomerates 9) is not limited to any specific value, but is preferably 15 wt % or less, more preferably in the range of 0.1 to 12 wt %, even more preferably in the range of 0.2 to 10 wt %. If the amount of water contained in the agglomerates 9 is too much, there is a possibility that it becomes difficult to efficiently carry out the bonding. In addition to that, there is also a possibility that it becomes difficult to sufficiently reduce the amount of water contained in the finally obtained toner particles. If the toner particles contain a relatively large amount of water, there is a possibility that the problem of instability in electrification will arise. In this step (that is, in the dispersion medium removing step), it is not necessary to reduce the amount of water contained in the agglomerates 9 (the water content of the agglomerates 9) more than necessary. This is because it is possible to remove the remaining dispersion medium in the bonding step (which will be described later), even in a case where the agglomerates 9 contain a relatively large amount of the dispersion medium (water). If the amount of water contained in the agglomerates 9 is reduced more than necessary in this step, deterioration or degeneration of the constituent material of the agglomerates 9 is likely to occur.

Thereafter, the thus obtained agglomerates 9 are subjected to bonding treatment to weld and bond two or more fine particles constituting each of the agglomerates 9 together (this is a bonding step).

The present invention has a feature in that the bonding step is carried out after the formation of agglomerates in order to weld and bond fine particles constituting each of the agglomerates together. Therefore, it is possible to reliably obtain resin particles (toner particles) having a uniform shape (especially, a substantially spherical shape with a high degree of roundness) and excellent mechanical stability. Specifically, by carrying out the bonding step (bonding treatment) after the agglomerates having a certain degree of shape stability and a relatively high degree of roundness (a substantially spherical shape) have been obtained in the dispersion medium removing step described above, it is possible to reduce surface irregularities of the agglomerates while the shape, size, etc of the agglomerates are basically maintained and thereby to improve the bonding strength between fine particles derived from the dispersoid constituting the agglomerates. As a result, it is possible to obtain resin particles (toner particles) having a substantially spherical shape with a high degree of roundness and excellent mechanical stability.

If the agglomerates are not subjected to the bonding treatment (the bonding step), the obtained resin particles (toner particles) have poor mechanical strength. Such resin particles (toner particles) are likely to be decomposed (disintegrated) when external force is applied thereto. Further, if the agglomerates are not subjected to bonding treatment (the bonding step), the obtained resin particles (toner particles) have a relatively low degree of roundness and large variations in shape because the agglomerates are usually formed with a number of relatively large surface irregularities.

In order to solve such a problem, there is an approach that the dispersion medium removing step be carried out at a high temperature. However, such a method arises another problem as described below. Specifically, although a sufficiently high temperature is required to allow the fine particles described above to bond firmly together, if the processing temperature of the dispersion medium removing step is excessively high, it is difficult to properly maintain the shape of the ejected dispersion liquid (that is, the droplets of the dispersion liquid) when the dispersion medium is removed. In other words, when the dispersion medium removing step is carried out under mild conditions, the dispersion medium is removed while the shape of the ejected dispersion liquid (the droplets of the dispersion liquid) is properly maintained. On the other hand, when the dispersion medium removing step is carried out under severe conditions such as a sufficiently high temperature, removal of the dispersion medium is likely to occur not only in the vicinity of the surface of the dispersion liquid but also in the inner portion of the dispersion liquid (that is, boiling of the dispersion medium is likely to occur), so that the shape of the dispersion liquid just after ejection cannot be properly maintained due to bubbles or the like generated by the removal of the dispersion medium. In this case, the obtained agglomerates (resin particles) tend to be defective particles (e.g., hollow particles having a relatively large cavity or particles in which a part of the dispersoid (the fine particles described above) constituting each of the droplets is blown away by the bubbles or the like).

Alternatively, a method in which the dispersion medium removing step is carried out for a relatively long period of time at a temperature not so high but the bonding step is omitted may also be used. However, in such a method, the time required for the dispersion medium removing step is extremely prolonged, thus resulting in significantly low productivity of resin particles (toner particles). In addition, the prolonged dispersion medium removing step usually requires that a path for conveying the dispersion liquid (the agglomerates) is significantly extended, causing the problem of increasing the size of an apparatus for producing resin particles (agglomerates). Further, although the processing temperature is relatively low, the prolonged dispersion medium removing step causes conspicuous deterioration or degeneration of the constituent material of the dispersoid (the resin particles), and therefore it is difficult for the finally obtained resin particles to properly exhibit properties thereof.

Bonding treatment (the bonding step) can be carried out according to any method under any condition, but is preferably carried out by subjecting the agglomerates 9 to heat treatment at a temperature higher than the processing temperature of the dispersion medium removing step. By subjecting the agglomerates 9 to heat treatment in such a manner, it is possible to promote welding of two or more fine particles constituting each of the agglomerates 9 easily and reliably.

The processing temperature of the bonding step (bonding treatment) is preferably higher than the processing temperature of the dispersion medium removing step. This makes it possible to more smoothly promote welding of the fine particles. Further, even in a case where the agglomerates 9 contain a relatively large amount of the dispersion medium 62 or the like, it is also possible to effectively reduce the amount of the dispersion medium or the like contained (remaining) in the agglomerates 9, thereby enabling the finally obtained toner particles to have substantially no dispersion medium or the like.

More specifically, when the processing temperature of the dispersion medium removing step is defined as $T_1$ (° C.) and the processing temperature of the bonding step is defined as $T_2$ (° C.), $T_1$ and $T_2$ preferably satisfy the relation: $0 \leq T_2 - T_1 \leq 200$, more preferably satisfy the relation: $10 \leq T_2 - T_1 \leq 200$, even more preferably satisfy the relation: $20 \leq T_2 - T_1 \leq 100$, most preferably satisfy the relation: $25 \leq T_2 - T_1 \leq 80$. By allowing $T_1$ and $T_2$ to satisfy the above relation, it is possible to allow the obtained toner particles to have sufficiently high degree of uniformity and stability in shape and a relatively high degree of roundness while properly preventing the deterioration or degeneration of the components thereof.

Further, the processing temperature of the bonding step (bonding treatment) is preferably equal to or higher than the glass transition point of the resin material constituting the resin particles described above (the resin material constituting the dispersoid 61). This makes it possible to allow two or more fine particles constituting each of the agglomerates 9 to bond together more reliably. As a result, the finally obtained toner particles have especially excellent mechanical strength (mechanical stability). In addition, by carrying out the bonding step (bonding treatment) at a temperature equal to or higher than the glass transition point of the resin material constituting the resin particles (the resin material constituting the dispersoid 61), it is possible to allow the finally obtained toner particles to have a relatively high degree of roundness (sphericity) easily and reliably.

Furthermore, when the processing temperature of the bonding step (bonding treatment) is defined as $T_2$ (° C.) and the melting point of the resin material constituting the resin particles (the resin material constituting the dispersoid 61) is defined as $T_m$ (° C.), $T_2$ and $T_m$ preferably satisfy the relation: $-100 \leq T_2-T_m \leq 110$, more preferably satisfy the relation: $-80 \leq T_2-T_m \leq 80$, even more preferably satisfy the relation: $-50 \leq T_2-T_m \leq 70$, most preferably satisfy the relation: $-40 \leq T_2-T_m \leq 30$. By allowing $T_2$ and $T_m$ to satisfy the above relation, it is possible to allow the obtained toner particles to have sufficiently high degree of uniformity and stability in shape and a relatively high degree of roundness while properly preventing the deterioration or degeneration of the components thereof. In a case where the resin material constituting the resin particles (the resin material constituting the dispersoid 61) is composed of two or more kinds of the resin materials (resin components), the weighted average (weight basis) of melting point of each of the components is defined as $T_m$.

Moreover, the processing temperature of the bonding step (bonding treatment) is preferably equal to or higher than the glass transition point of the resin material constituting the resin particles (the resin material constituting the dispersoid 61) but equal to or lower than the melting point of the resin material constituting the resin particles (the resin material constituting the dispersoid 61). By setting the processing temperature of the bonding step (bonding treatment) to a value within the above range, the effect as described above is more conspicuously exhibited.

Moreover, the processing temperature of the bonding step (bonding treatment) is not limited to any specific value, but is usually preferably in the range of 50 to 200° C., more preferably in the range of 60 to 150° C., in a case where the processing time of the bonding step (bonding treatment) lies within such a range as described later. By setting the processing temperature of the bonding step (bonding treatment) to a value within the above range when the processing time of the bonding step (bonding treatment) lies within such a range as described later, it is possible to allow the obtained toner particles to have sufficiently high degree of uniformity and stability in shape and a relatively high degree of roundness while properly preventing the deterioration or degeneration of the components thereof.

The processing time of the bonding step (bonding treatment) as described above is not limited to any specific value, but is preferably in the range of 0.01 to 10 seconds, more preferably in the range of 0.05 to 10 seconds, even more preferably in the range of 0.1 to 5 seconds, in a case where the processing temperature of the bonding step (bonding treatment) lies within the range described above. By setting the processing time of the bonding step to a value within the above range, it is possible to allow the obtained toner particles to have a sufficiently high degree of roundness while properly preventing the deterioration or degeneration of the constituent material of the toner.

As described above, in the present invention, since the dispersion liquid is used as an ejection liquid, it is possible to easily produce toner particles having a sufficiently high degree of roundness and a sharp particle size distribution as well as a sufficiently small particle diameter. Therefore, the obtained toner particles are uniformly electrified. In addition, when the thus obtained toner is used for printing, a thin layer of the toner is formed on a developing roller with the thin layer being leveled and having a high density. As a result, a defect such as fog hardly occurs, and therefore a sharper image is formed. Further, since the toner particles have uniform shape and particle diameter, the bulk density of the toner (an aggregate of the toner particles) is increased as a whole. Therefore, the amount of the toner to be charged in a cartridge is increased in a case where the volume of the cartridge is the same as before. Further, such an increased bulk density of the toner is advantageous to the reduction in size of a cartridge.

When necessary, the thus obtained toner may be subjected to various treatments such as aeration, classification, and external addition.

When classification is carried out, for example, a screen or an air classifier can be used.

Examples of an external additive for use in external addition include fine particles composed of inorganic materials such as silica, metal oxides (e.g., aluminum oxide, titanium oxide, strontium titanate, cerium oxide, magnesium oxide, chromium oxide, titania, zinc oxide, alumina, and magnetite), nitrides such as silicon nitride, carbides such as silicon carbide, calcium sulfate, calcium carbonate, and aliphatic metal salts, fine particles composed of organic materials such as acrylic resins, fluorocarbon resins, polystyrene resins, polyester resins, aliphatic metal salts, and fine particles composed of a composite of two or more of them.

In addition, fine particles obtained by subjecting the fine particles mentioned above to surface treatment can also be used as external additives. Surface treatment is carried out using, for example, HMDS, silane-based coupling agents, titanate-based coupling agents, fluorine-containing silane-based coupling agents, or silicone oil.

The toner of the present invention produced in such a manner as described above has a uniform particle shape and a sharp (narrow) particle size distribution. Particularly, according to the present invention, it is possible to obtain toner particles having a shape close to a true sphere.

Specifically, the toner (the toner particles) preferably has an average roundness R represented by the following formula (I) of 0.95 or higher, more preferably 0.96 or higher, even more preferably 0.97 or higher, most preferably 0.98 or higher:

$$R = L_0/L_1 \quad (I)$$

whrein $L_1$ (µm) represents the circumference of projected image of a toner particle that is a subject of measurement, and $L_0$ (µm) represents the circumference of a perfect circle (a geometrically perfect circle) having the same area as that of the projected image of the toner particle that is a subject of measurement. When the average roundness R is 0.95 or higher, the transfer efficiency of the toner is further improved.

Further, the toner preferably has a standard deviation of average roundness among particles of 0.02 or less, more preferably 0.015 or less, even more preferably 0.01 or less. When the standard deviation of average roundness among particles is 0.02 or less, variations in electrification properties, fixing properties, etc are especially small, thereby further improving the reliability of the toner as a whole.

The average particle diameter (volume basis) of the toner is preferably in the range of 2 to 20 µm, more preferably in the range of 4 to 10 µm. If the average particle diameter of the toner is less than the above lower limit value, it is difficult to uniformly electrify the toner, and the adherence of the toner to the surface of an electrostatic latent image holder (e.g., a photoreceptor) is increased, thus resulting in a case where the amount of a remaining toner after transfer is increased. On the other hand, if the average particle diameter of the toner exceeds the above upper limit value, reproducibility of the edge portion in an image formed using the toner, especially character images or light patterns, in development is lowered.

Further, the toner preferably has a standard deviation of particle diameter among particles of 1.5 μm or less, more preferably 1.3 μm or less, even more preferably 1.0 μm or less. When the standard deviation of particle diameter among particles is 1.5 μm or less, variations in electrification properties, fixing properties, etc are especially small, thereby further improving the reliability of the toner as a whole.

The amount of water contained in the toner particles (the water content of the toner particles) is not limited to any specific value, but is preferably 5 wt % or less, more preferably in the range of 0.01 to 4 wt %, even more preferably in the range of 0.02 to 1 wt %. If the amount of water contained in the toner particles is too much, there is a possibility that a problem of instable electrification will arise. In this regard, it is to be noted that it is not necessary to reduce the amount of water contained in the toner particles more than necessary. This is because an attempt to reduce the amount of water contained in the toner particles to an extremely low level tends to cause the deterioration or degeneration of the constituent material of the toner.

Embodiment 2

Next, a second embodiment of the present invention will be described. Hereinbelow, the second embodiment will be described by focusing the difference between the first and second embodiments, and therefore a description of the overlapping points is omitted.

Figure 3:
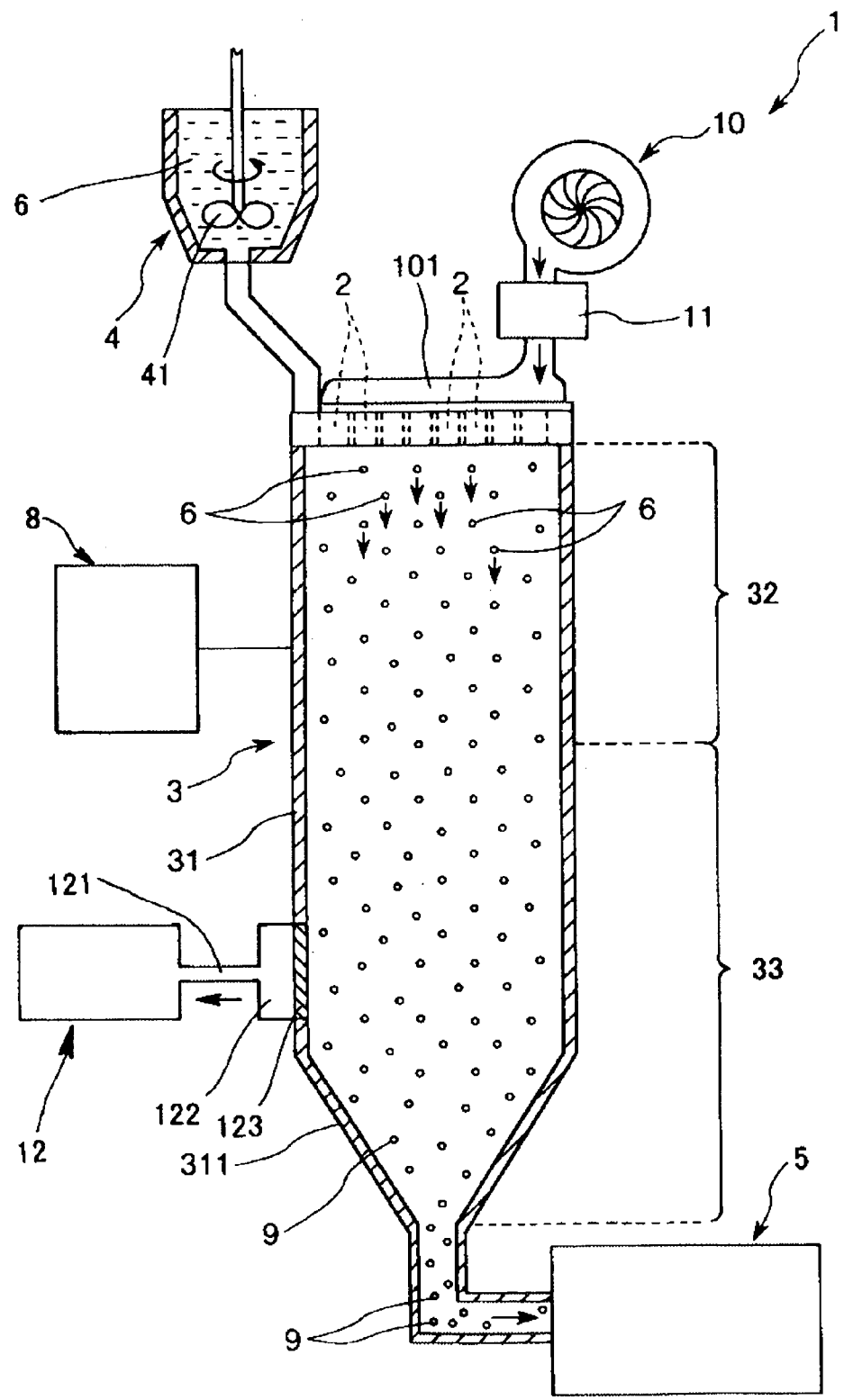
FIG. 3 is a cross-sectional view which schematically shows a second embodiment of the toner production apparatus for use in producing the toner of the present invention.

FIG. 3 is a cross-sectional view which schematically shows a second embodiment of the toner production apparatus for use in producing the toner of the present invention.

In a method for producing resin particles (toner particles) of the second embodiment, the bonding step described above includes a first bonding step (a first uniting step) in which preliminarily bonded bodies are obtained by welding and preliminarily bonding the two or more fine particles constituting each of the agglomerates described above together, and a second bonding step (a second uniting step) in which the preliminarily bonded bodies are subjected to heat treatment to promote welding and bonding of the fine particles.

In this embodiment, the dispersion medium removing step and the first bonding step can be carried out using a toner production apparatus 1' shown in FIG. 3. Hereinbelow, the toner production apparatus 1' and a method for producing agglomerates, preliminarily bonded bodies, and toner particles by the use of the toner production apparatus 1' will be described in detail. Hereinbelow, a description will be made with regard to the case where toner particles are produced by forming preliminarily bonded bodies by way of agglomerates in a solidifying portion of the toner production apparatus 1', collecting the preliminarily bonded bodies, and subjecting the collected preliminarily bonded bodies to the second bonding step.

<Toner Production Apparatus>

The toner production apparatus 1' includes head portions 2 for ejecting the dispersion liquid 6 (especially, the dispersion liquid 6 which has been subjected to deaeration treatment) described above, a dispersion liquid supply portion 4 for supplying the dispersion liquid 6 to the head portions 2, a solidifying portion 3 in which the dispersion liquid 6 ejected from the head portions 2 are to be conveyed, and collection portion 5 for collecting formed particles (preliminarily bonded bodies 9').

The toner production apparatus 1' of the second embodiment is different from the toner production apparatus 1 of the first embodiment in that the solidifying portion 3 has a first region 32 for removing the dispersion medium 62 from the droplets of the dispersion liquid 6 (that is, for carrying out the dispersion medium removing step), and a second region 32 for welding and preliminarily bonding the above-described two or more fine particles constituting each of the agglomerates 90 formed in the first region 32 together (that is, for carrying out the first bonding step).

The solidifying portion 3 is constructed from a tubular housing 31, and has the first region 32 and the second region 33. The second region 33 is located so as to be closer to the collection portion 5 rather than the first region 32. In the first region 32, the dispersion medium removing step (dispersion medium removing treatment) is carried out to remove the dispersion medium 62 from the droplets of the dispersion liquid 6 to thereby obtain agglomerates 90. In the second region 33, the first bonding step (first bonding treatment) is carried out to weld and preliminarily bond the two or more fine particles constituting each of the agglomerates 90 formed in the first region 32 together.

The temperature of the first region 32 (the processing temperature of the dispersion medium removing step) varies depending on, for example, the composition of the dispersoid 61 and the dispersion medium 62 contained in the dispersion liquid 6, but is usually preferably in the range of 0 to 50° C., more preferably in the range of 15 to 40° C. By setting the temperature (the ambient temperature) of the first region 32 to a value within the above range, it is possible to efficiently remove the dispersion medium 62 contained in the dispersion liquid 6 while allowing the obtained agglomerates 90 to have sufficiently high degree of uniformity and stability in shape. As a result, productivity of a toner becomes especially excellent. In addition, it is also possible to more smoothly promote the formation of agglomerates 90, which contributes to the reduction in size of the toner production apparatus 1'.

Further, when the temperature of the first region 32 (the processing temperature of the dispersion medium removing step) is defined as $T_1$ (° C.) and the glass transition point of the resin material constituting the dispersoid 61 is defined as $T_g$ (° C.), $T_1$ and $T_g$ preferably satisfy the relation: $0 \leq T_g - T_1 \leq 70$, more preferably satisfy the relation: $0 \leq T_g - T_1 \leq 50$, even more preferably satisfy the relation: $10 \leq T_g - T_1 \leq 40$. By allowing $T_1$ and $T_g$ to satisfy the above relation, it is possible to effectively remove the dispersion medium 62 contained in the dispersion liquid 6 while allowing the obtained agglomerates 90 to have sufficiently high uniformity and stability in shape. As a result, productivity of a toner becomes especially excellent. It is to be noted that in a case where the dispersoid 61 is composed of two or more kinds of the resin materials (resin components), the weighted average (weight basis) of glass transition point of each of the components is defined as $T_g$.

The processing time of the dispersion medium removing step (that is, the time between the injection of droplets of the dispersion liquid 6 and the formation of agglomerates 90) is preferably in the range of 5 to 120 seconds, more preferably in the range of 10 to 60 seconds, even more preferably in the range of 10 to 20 seconds. By setting the processing time of the dispersion medium removing step to a value within the above range, it is possible to sufficiently improve the productivity of a toner while allowing the obtained agglomerates 90 to have adequate strength (that is, while properly preventing the agglomerates 90 from being decomposed or disintegrated until the agglomerates 90 are subjected to the first bonding step which will be described later).

The particles of the dispersion liquid 6 ejected from the head portions 2 are solidified while being conveyed in the solidifying portion 3 (the first region 32), to thereby obtain agglomerates 90 each of which is composed of two or more fine particles derived from the dispersoid 61. Specifically, as the dispersion medium 62 contained in the ejected dispersion liquid 6 is removed, the dispersoid 61 contained in the dispersion liquid 6 is agglomerated, to thereby obtain agglomerates 90. In a case where the dispersoid 61 contains the solvent described above, such a solvent is also usually removed in the solidifying portion 3 (the first region 32). The agglomerates 90 obtained in this step should have stability to the extent that their shapes are kept until they are subjected to the first bonding step. For example, the agglomerates 90 may still contain a part of the dispersion medium 62. Even in such a case, the remaining dispersion medium or the like is properly removed by carrying out the first and second bonding steps.

The agglomerates 90 formed in the first region 32 are conveyed to the second region 33. In the second region 33, the agglomerates 90 are subjected to the first bonding treatment to weld and preliminarily bond the fine particles (derived from the dispersoid 61) constituting each of the agglomerates 90, to thereby obtain preliminarily bonded bodies 9' (this is a first bonding step). In each of the preliminarily bonded bodies 9' obtained in this step, it is sufficient that the fine particles are at least partially bonded together. For example, adjacent fine particles among the fine particles are not always bonded to each other. Further, since each of the preliminarily bonded bodies 9' is usually in a state where the adjacent fine particles are partially bonded together, the original shape of each of the fine particles (the dispersoid 61) can be relatively clearly observed.

As described above, by forming resin particles (toner particles) by way of such preliminarily bonded bodies, it is possible to obtain resin particles (toner particles) having excellent uniformity in size and shape and a relatively high degree of roundness while properly maintaining the properties of the constituent material thereof. In other words, since second bonding treatment (the second bonding step) which will be described later is carried out after the formation of preliminarily bonded bodies, thermal history in the production process is properly suppressed, thereby enabling to obtain resin particles (toner particles) having excellent uniformity in size and shape and a relatively high degree of roundness. Particularly, like this embodiment, even in a case where the preliminarily bonded bodies as intermediates are once collected in the resin particle (toner particle) production process, it is possible to handle the preliminarily bonded bodies easily when they are subjected to the second bonding step because the preliminarily bonded bodies have relatively high shape stability.

The temperature of the second region 33 (the processing temperature of the first bonding step) varies depending on the composition of the fine particles (the dispersoid 61) constituting the agglomerates, but is usually preferably in the range of 50 to 70° C. By setting the temperature of the second region 33 to a value within the above range, it is possible to obtain preliminarily bonded bodies 9' having sufficient shape stability while properly preventing the deterioration or degeneration of the constituent material thereof. If the temperature of the second region 33 is less than the above lower limit value, there is a case where it is difficult to sufficiently promote bonding of the fine particles constituting the agglomerates 90 depending on the constituent material of the agglomerates 90. On the other hand, if the temperature of the second region 33 exceeds the above upper limit value, the amount of heat (thermal history) applied to the toner particles in the production process is excessively large so that the deterioration or degeneration of the toner particles conspicuously occurs depending on the constituent material of the agglomerates 90, thus resulting in a case where it is difficult for the finally obtained toner particles to properly exhibit the desired properties thereof.

The processing temperature of the first bonding step (the first bonding treatment) (the temperature of the second region 33) is preferably higher than the processing temperature of the dispersion medium removing step (the temperature of the first region 32). This makes it possible to obtain preliminarily bonded bodies 9' having sufficient shape stability. In addition, it is also possible to more smoothly promote the formation of preliminarily bonded bodies 9', which contributes to the reduction in size of the toner production apparatus 1'. Further, even in a case where the agglomerates 90 contain a relatively large amount of the dispersion medium 62 or the like, it is also possible to effectively reduce the amount of the dispersion medium or the like contained (remaining) in the agglomerates 90, thereby enabling the finally obtained toner particles to have substantially no dispersion medium or the like.

More specifically, when the processing temperature of the dispersion medium removing step is defined as $T_1$ (° C.) and the processing temperature of the first bonding step is defined as $T_2'$ (° C.), it is preferred that $T_1$ and $T_2'$ satisfy the relation: $0 \leq T_2' - T_1 \leq 70$, more preferably satisfy the relation: $5 \leq T_2' - T_1 \leq 65$, even more preferably satisfy the relation: $10 \leq T_2' - T_1 \leq 60$. When $T_1$ and $T_2'$ satisfy the above relation, it is possible for the finally obtained toner particles to have sufficiently high degree of uniformity and stability in shape while properly preventing the deterioration or degeneration of the component thereof. In addition, it is also possible for the toner particles to have a relatively high degree of roundness.

The processing time of the first bonding step (the first bonding treatment) is preferably in the range of 5 to 120 seconds, more preferably in the range of 10 to 60 seconds, even more preferably in the range of 10 to 20 seconds. By setting the processing time of the first bonding step to a value within the above range, it is possible to obtain preliminarily bonded bodies 9' having adequate strength while properly preventing the deterioration or degeneration of the constituent material thereof. As a result, the preliminarily bonded bodies 9' are properly prevented from being decomposed or disintegrated until being subjected to the second bonding step which will be described later. In addition, it is also possible for the preliminarily bonded bodies 9' (that is, the finally obtained toner particles) to have a sufficiently high degree of roundness and to sufficiently improve the productivity of preliminarily bonded bodies 9' and a toner.

In order to maintain the first region 32 and the second region 33 at a temperature within a predetermined range, a heat source or a cooling source may be provided inside or outside the housing 31 (the first region 32, the second region 33), or the housing 31 may be formed as a jacket having a passage of a heat medium or a cooling medium.

In the toner production apparatus shown in FIG. 3, the pressure in the housing 31 (the first region 32, the second region 33) is adjusted by pressure controlling means 12. By adjusting the pressure in the housing 31, it is possible to efficiently form agglomerates 90 and preliminarily bonded bodies 9'. As a result, productivity of a toner is improved.

The pressure in the housing 31 is not limited to any specific value, but is preferably 150 kPa or less, more preferably in the range of 100 to 120 kPa, even more preferably in the range of 100 to 110 kPa. By setting the pressure in the housing 31 to a value within the above range, it is possible to efficiently form agglomerates 90 and preliminarily bonded bodies 9' while properly preventing the formation of defective agglomerates 90 and preliminarily bonded bodies 9'. In this regard, it is to be noted that the pressure in the housing 31 may be uniform throughout the housing 31 or different according to the area. For example, the first region 32 and the second region 33 may have different pressures.

As described above, agglomerates 90 are obtained by agglomeration of the dispersoid 61 contained in each of the particles of the dispersion liquid 6 due to the removal of the dispersion medium 62 from the dispersion liquid 6 in the solidifying portion 3, and preliminarily bonded bodies 9' are obtained by welding and preliminarily bonding fine particles (fine particles derived from the dispersoid 61) constituting each of the agglomerates 90, but the agglomerates 90 and the preliminarily bonded bodies 9' are not limited to those formed in such a manner. For example, in a case where the dispersoid 61 contains a precursor of a resin material (e.g., a monomer, a dimer or an oligomer of the resin material described above), agglomerates 90 and preliminarily bonded bodies 9' may be obtained by allowing polymerization reaction to proceed while the dispersion medium 62 is removed and the fine particles are welded and preliminarily bonded. In other words, the constituent material of the agglomerates 90 or the preliminarily bonded bodies 9' may be substantially the same as or different from the constituent material of the dispersoid 61.

The thus obtained preliminarily bonded bodies 9' are collected in the collection portion 5.

The amount of water contained in the preliminarily bonded bodies 9' (that is, the water content of the preliminarily bonded bodies 9') is not limited to any specific value, but is preferably 12 wt % or less, more preferably in the range of 0.08 to 11 wt %, even more preferably in the range of 0.1 to 10 wt %. If the amount of water contained in the preliminarily bonded bodies 9' is too much, there is a possibility that it is difficult to efficiently carry out the second bonding step which will be described later. In addition to that, there is also a possibility that it is difficult to sufficiently reduce the amount of water contained in the finally obtained toner particles. If the toner particles contain a relatively large amount of water, there is a possibility that a problem of instable electrification will arise. In the dispersion medium removing step and the first bonding step, it is not necessary to reduce the amount of water contained in the particles (the agglomerates 90, the preliminarily bonded bodies 9') (the water content of the particles) more than necessary. This is because it is possible to remove the remaining dispersion medium in the second bonding step, even in a case where the preliminarily bonded bodies 9' obtained through the dispersion medium removing step and the first bonding step contain a relatively large amount of the dispersion medium (water). If the amount of water contained in the preliminarily bonded bodies 9' (the water content of the preliminarily bonded bodies 9') is reduced more than necessary in this step, deterioration or degeneration of the constituent material of the preliminarily bonded bodies 9' is likely to occur.

Thereafter, the thus obtained preliminarily bonded bodies 9' are subjected to the second bonding treatment (the second bonding step) to promote the welding and bonding of the two or more fine particles constituting each of the preliminarily bonded bodies 9', thereby enabling to obtain toner particles having excellent mechanical stability. In other words, since the bonding strength among the fine particles constituting each of the preliminarily bonded bodies 9' obtained in the first bonding step is relatively weak, disintegration (decomposition) of the preliminarily bonded bodies 9' is likely to occur due to the application of external force, even if the external force is relatively weak. Further, although the preliminarily bonded bodies 9' have a relatively high degree of roundness, they still have a plurality of surface irregularities corresponding to the shape of the dispersoid 61 contained in the dispersion liquid 6. Therefore, by subjecting the preliminarily bonded bodies 9' to the second bonding treatment, it is possible to reduce such irregularities, thereby allowing the finally obtained toner particles to have a higher degree of roundness.

In the second bonding step, the preliminarily bonded bodies 9' are preferably subjected to heat treatment at a temperature higher than the processing temperatures of the dispersion medium removing step and the first bonding step. By carrying out the second bonding step in such a manner, it is possible to more effectively promote the welding and bonding of the two or more fine particles constituting each of the preliminarily bonded bodies 9' with ease and reliability.

More specifically, when the processing temperature of the first bonding step is defined as $T_2'$ (° C.) and the processing temperature of the second bonding step is defied as $T_2''$ (° C.), it is preferred that $T_2'$ and $T_2''$ satisfy the relation: $0 \leq T_2'' - T_2' \leq 150$, more preferably satisfy the relation: $0 \leq T_2'' - T_2' \leq 100$, even more preferably satisfy the relation: $0 \leq T_2'' - T_2' \leq 50$. When $T_2'$ and $T_2''$ satisfy the above relation, it is possible to obtain toner particles having sufficiently high degree of uniformity and stability in shape and a relatively high degree of roundness while properly preventing the deterioration or degeneration of the component thereof.

Further, when the processing temperature of the second bonding step (the second bonding treatment) is defined as $T_2''$ (° C.) and the melting point of the resin material constituting the resin particles (the resin material constituting the dispersoid 61) is defined as $T_m$ (° C.), it is preferred that $T_2''$ and $T_m$ satisfy the relation: $-100 \leq T_2'' - T_m \leq 110$, more preferably satisfy the relation: $-80 \leq T_2'' - T_m \leq 80$, even more preferably satisfy the relation: $-70 \leq T_2'' - T_m \leq 70$, most preferably satisfy the relation: $-50 \leq T_2'' - T_m \leq 50$. When $T_2''$ and $T_m$ satisfy the above relation, it is possible to obtain toner particles having sufficiently high degree of uniformity and stability in shape and a relatively high degree of roundness while properly preventing the deterioration or degeneration of the component thereof. In this regard, it is to be noted that in a case where the resin material constituting the resin particles (the resin material constituting the dispersoid 61) is composed of two or more kinds of the resin materials (resin components), the weighted average (weight basis) of melting point of each of the components is defined as $T_m$.

The processing time of the second bonding step (the second bonding treatment) is not limited to any specific value, but is preferably in the range of 0.01 to 10 seconds, more preferably in the range of 0.05 to 10 seconds, even more preferably in the range of 0.1 to 5 seconds in the case where the processing temperature of the second bonding step (the second bonding treatment) lies within the above range. By setting the processing time of the second bonding step to a value within the above range, it is possible to obtain toner particles having a sufficiently high degree of roundness while properly preventing the deterioration or degeneration of the component of the toner.

Embodiment 3

Next, a third embodiment of the present invention will be described. Hereinbelow, the third embodiment will be described by focusing the difference from the first and second embodiments, and therefore a description of the overlapping points is omitted.

The third embodiment is the same as the first embodiment except for the structure of head portions of a toner production apparatus for use in producing agglomerates and preliminarily bonded bodies (toner particles).

Figure 4:
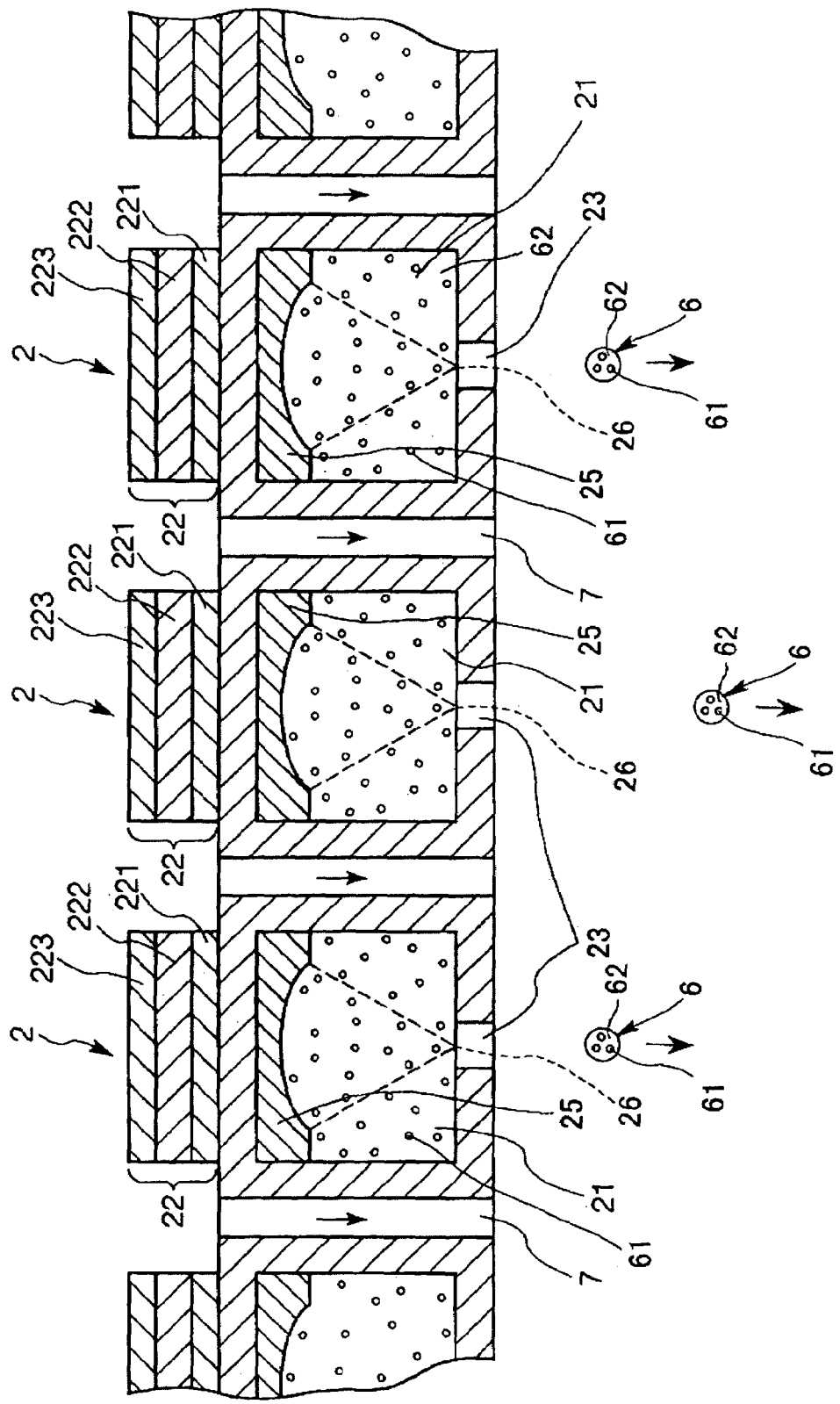
FIG. 4 is a diagram which schematically shows the structure of the vicinity of head portions of a toner production apparatus of the third embodiment.

FIG. 4 is a diagram which schematically shows the structure of the vicinity of head portions of a toner production apparatus of the third embodiment.

As shown in FIG. 4, in the toner production apparatus of the third embodiment, an acoustic lens (a concave lens) 25 is provided in each head portion 2. By providing such an acoustic lens 25, it is possible to converge a pressure pulse (vibration energy) generated by a piezoelectric device 22 at a pressure pulse convergence portion 26 provided in the vicinity of each ejecting portion 23. Therefore, vibration energy generated by the piezoelectric device 22 is efficiently used as energy for ejecting the dispersion liquid 6. Further, even when the dispersion liquid 6 stored in the dispersion liquid storage portion 21 has a relatively high viscosity, the dispersion liquid 6 is reliably ejected from the ejecting portion 23. Furthermore, even when the dispersion liquid 6 stored in the dispersion liquid storage portion 21 has a relatively large cohesive force (surface tension), the dispersion liquid 6 is ejected in the form of fine droplets. As a result, it is possible to easily and reliably obtain agglomerates 9, agglomerates 90, preliminarily bonded bodies 9', and toner particles having a relatively small particle diameter.

As described above, according to the third embodiment, it is possible for the agglomerates 9, agglomerates 90 and preliminarily bonded bodies 9' to have desired shape and size, even when a material having a relatively high density or a material having a relatively large cohesive force is used as the dispersion liquid 6. This particularly extends the range of material choices, thereby enabling to easily produce a toner having desired properties.

Further, in the third embodiment, since the dispersion liquid 6 is ejected using a convergent pressure pulse, the dispersion liquid 6 in the form of droplets each having a relatively small size can be ejected, even in a case where the area (the area of an opening) of the ejecting portion 23 is relatively large. In other words, even in a case where it is desired that the finally obtained toner particles have a relatively small particle diameter, the area of the ejecting portion 23 may be large, thereby more effectively preventing the occurrence of clogging in the ejecting portion 23 even when the dispersion liquid 6 has a relatively high viscosity.

Figure 8:
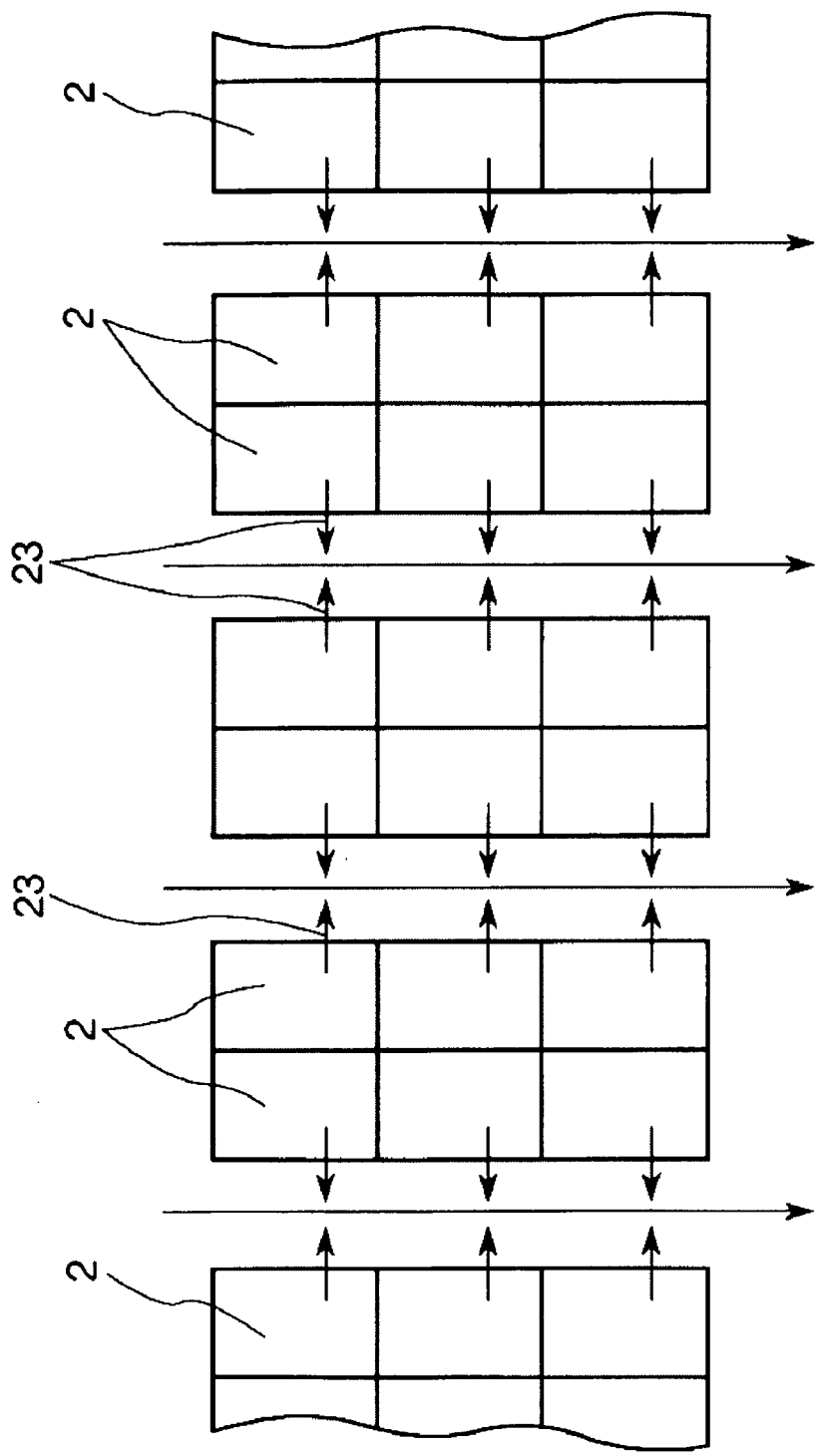
FIG. 8 is a cross-sectional view which schematically shows the structure of the vicinity of head portions of a toner production apparatus of yet other embodiment.

Although the present invention has been described with reference to the preferred embodiments, the present invention is not limited thereto, and it is possible to make various changes and additions to each portion of the toner production apparatus, so long as the same functions are achieved. For example, although each of the embodiments described above has a structure in which the droplets of the dispersion liquid are ejected in a vertically downward direction, the dispersion liquid may be ejected in any direction (e.g., a vertically upward direction or a horizontal direction). Further, as shown in FIG. 8, the dispersion liquid 6 may be ejected in such a manner that the direction of the dispersion liquid 6 becomes substantially vertical to the direction of the gas injected from the gas injection opening 7. In this case, the gas stream changes the traveling direction of the ejected droplets of the dispersion liquid 6 so that they are conveyed in a direction at a substantially right angle to the direction that the ejecting portion 23 ejects the dispersion liquid 6.

Further, although each of the embodiments described above has a structure in which the dispersion liquid is intermittently ejected from the head portions by the use of a piezoelectric pulse, the dispersion liquid may be ejected (discharged) according to other methods. For example, a spray dry method, or the so-called Bubble Jet method ("Bubble Jet" is a trademark) may be employed. A spray dry method is a method in which droplets are obtained by injecting (spraying) a liquid (a dispersion liquid) using high-pressure gas. As a method using the so-called Bubble Jet method ("Bubble Jet" is a trademark), a method disclosed in Japanese Patent Application No. 2002-169348 can be mentioned. In this method, a dispersion liquid is intermittently ejected (discharged) from a head portion by the use of changes in volume of gas. Alternatively, a method disclosed in Japanese Patent Application No. 2002-321889 may also be employed. According to such a method, the dispersion liquid is spread and then formed into a thin layer fluid by pressing the dispersion liquid against a smooth surface by the use of a gas stream, and then the thus obtained thin layer fluid is separated from the smooth surface and injected using a nozzle, so that the dispersion liquid is injected in the form of droplets (fine particles).

Furthermore, although in the first embodiment described above, agglomerates formed by the toner production apparatus are once collected prior to the bonding step, the dispersion medium removing step for forming agglomerates and the bonding step may be carried out continuously. By carrying out the dispersion medium removing step and the bonding step continuously, it is possible to further improve the productivity of toner particles (resin particles). Further, in such a case, the area where the dispersion medium removing step (dispersion medium removing treatment) is carried out and an area where the bonding step (bonding treatment) is carried out may be partially overlapped. For example, two or more fine particles constituting each of the agglomerates may be bonded together in a part of the area where the dispersion medium removing step (dispersion medium removing treatment) is carried out. On the other hand, the dispersion medium remaining in the agglomerates may be removed in a part of the area where the bonding step (bonding treatment) is carried out.

Moreover, although in the second embodiment described above, preliminarily bonded bodies, formed by way of agglomerates obtained by carrying out the dispersion medium removing step and the first bonding step continuously in the toner production apparatus, are once collected prior to the second bonding step, the thus formed preliminarily bonded bodies may be directly subjected to the second bonding step without collecting them. That is, the first bonding step and the second bonding step may be carried out continuously. By doing so, it is possible to further improve the productivity of toner particles (resin particles). Alternatively, the agglomerates may be once collected prior to the first bonding step and the second bonding step.

Moreover, although in the second embodiment described above, the solidifying portion (the housing) has the first region and the second region, a third region having a different temperature from those of the first region and the second region may be provided between the first region and the second region, the ejecting portions and the first region, or the second region and the collecting portion.

In addition, a reduced-diameter portion having a reduced inner diameter may be provided in the vicinity of the boundary between the first region and the second region. By providing such a reduced-diameter portion, it is possible to more easily and precisely adjust the temperature and pressure of each of the first and second regions.

Moreover, although in the third embodiment described above, a concave lens is used as the acoustic lens, the acoustic lens is not limited thereto. For example, a fresnel lens or an electronic scanning lens may also be used as an acoustic lens.

Figure 5:
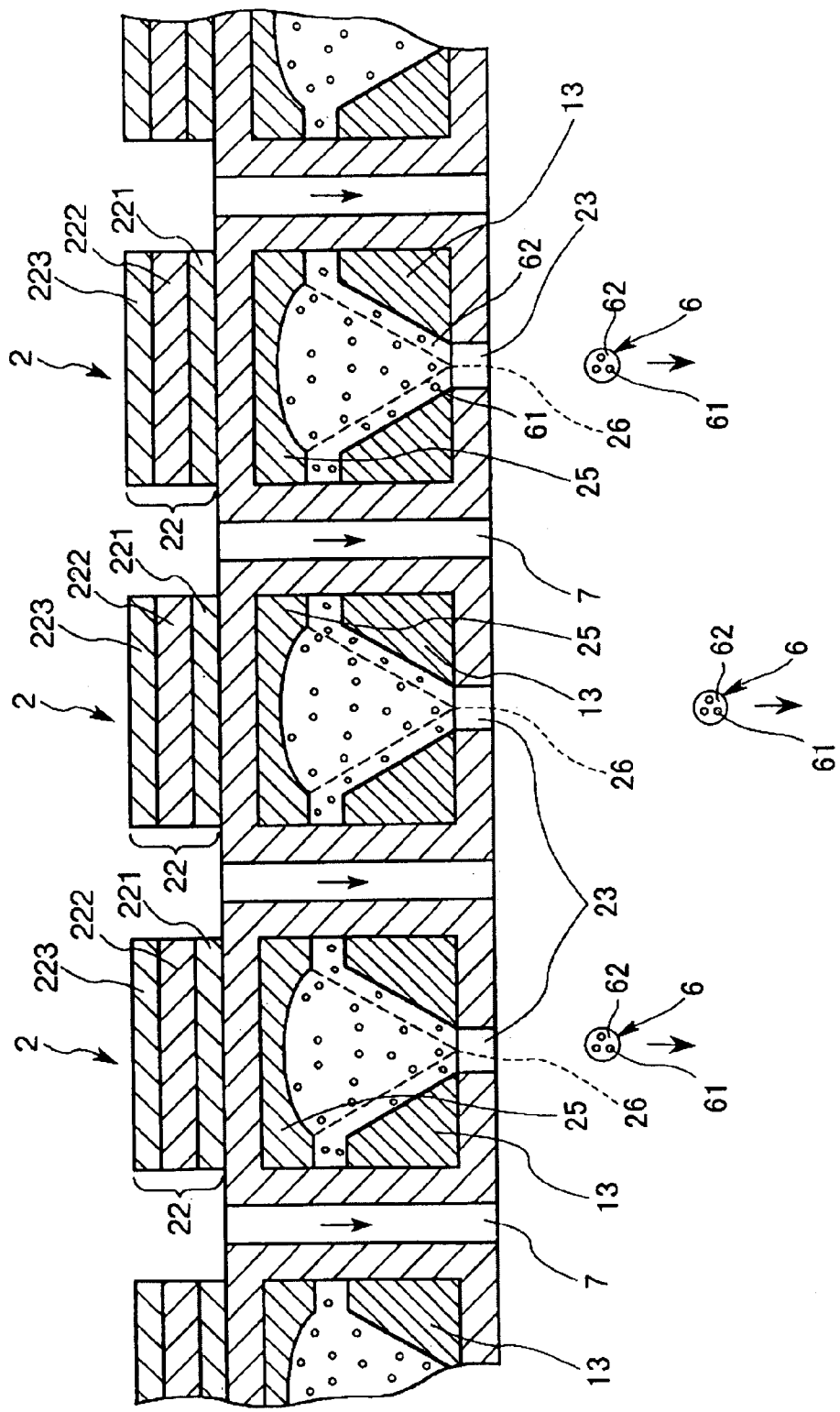
FIG. 5 is a cross-sectional view which schematically shows the structure of the vicinity of head portions of a toner production apparatus of another embodiment.
Figure 6:
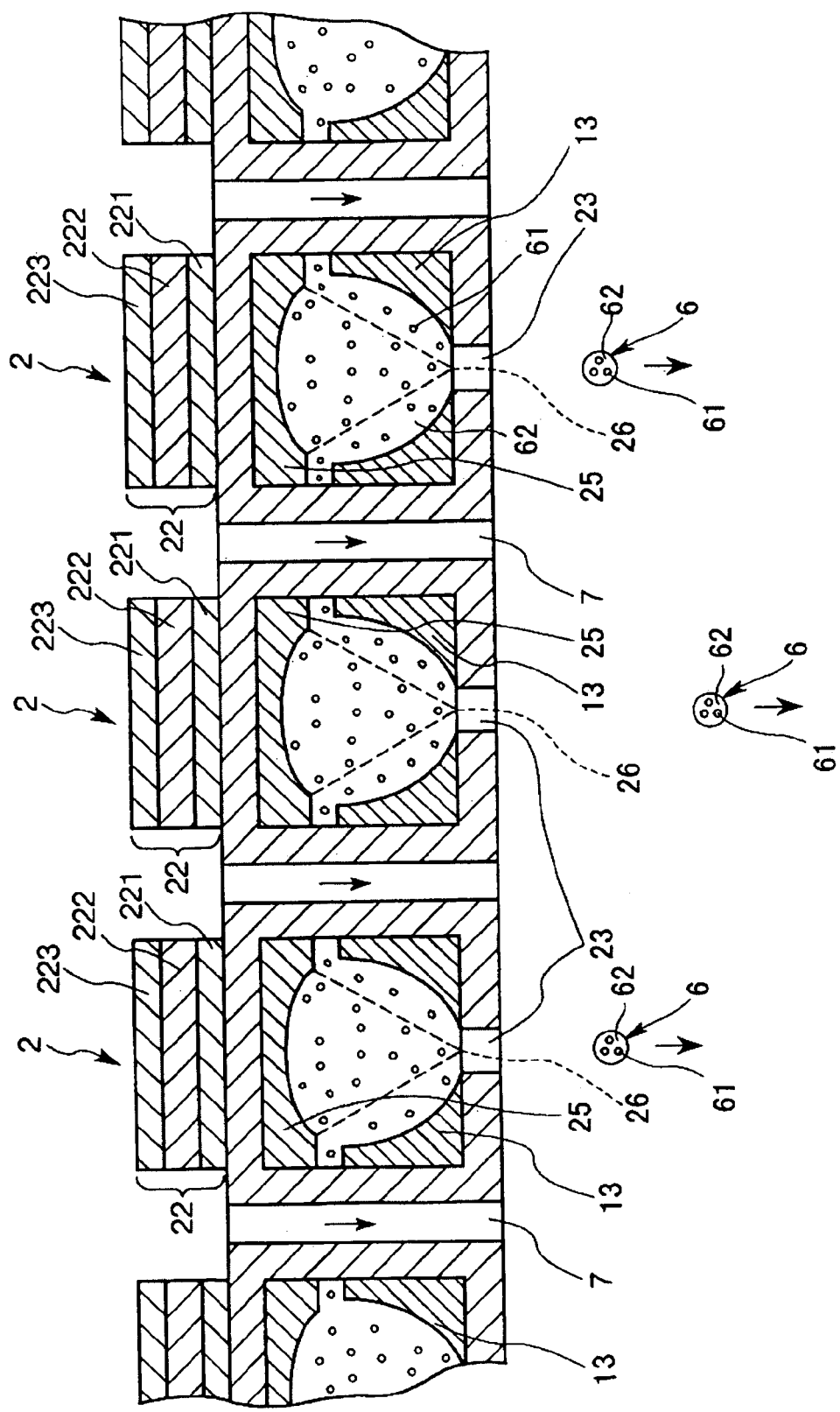
FIG. 6 is a cross-sectional view which schematically shows the structure of the vicinity of head portions of a toner production apparatus of yet another embodiment.
Figure 7:
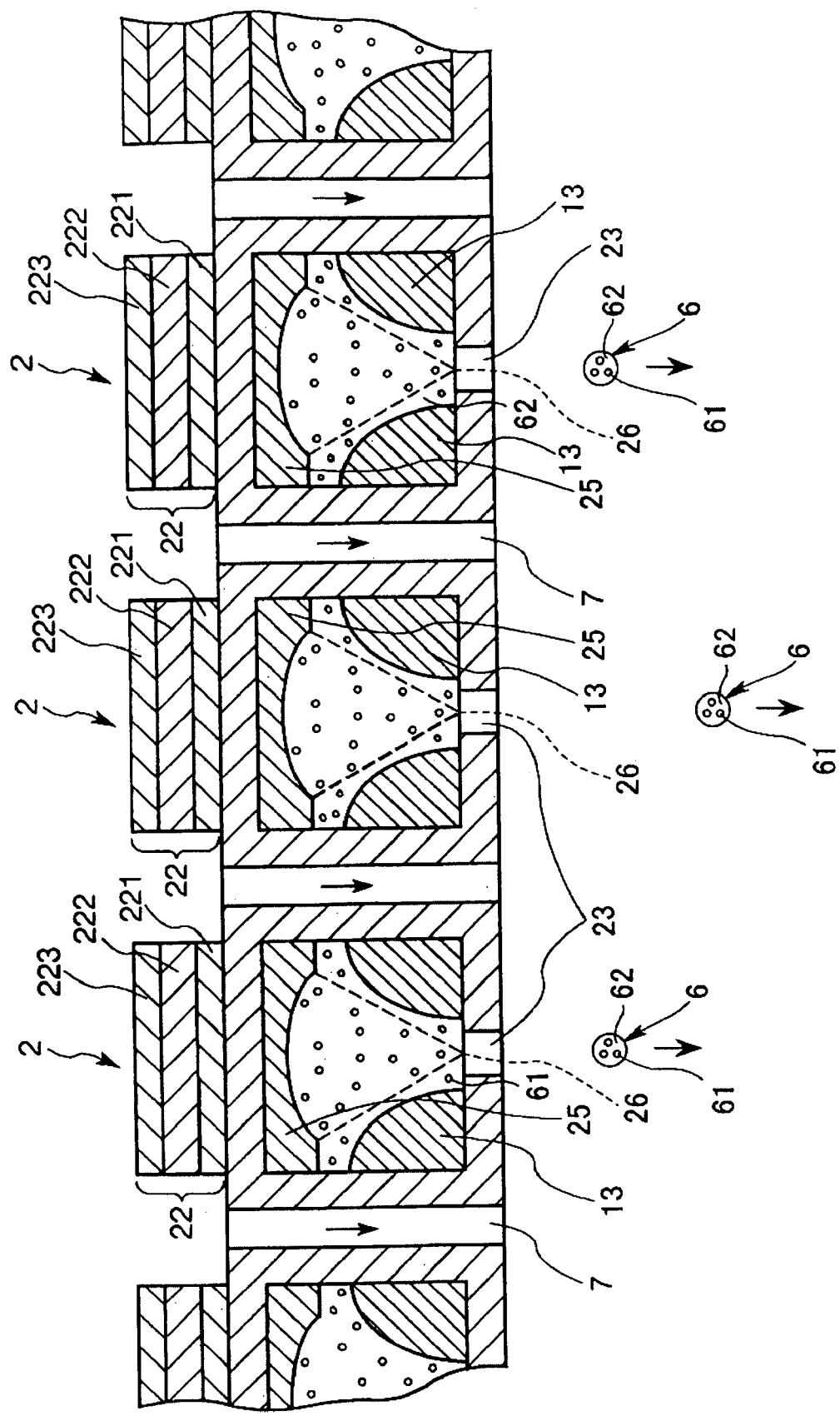
FIG. 7 is a cross-sectional view which schematically shows the structure of the vicinity of head portions of a toner production apparatus of other embodiment.

Moreover, although in the third embodiment described above, there is nothing but the dispersion liquid 6 between the acoustic lens 25 and the ejecting portion 23, a focusing member 13 having a shape convergent toward the ejecting portion 23 may be provided between the acoustic lens 25 and the ejecting portion 23, as shown in FIGS. 5 to 7. Such a focusing member helps the convergence of a pressure pulse (vibration energy) generated by the piezoelectric device 22, and therefore the pressure pulse generated by the piezoelectric device 22 is utilized more efficiently.

Moreover, although in each of the embodiments, the method for producing toner particles has been described by way of example, the method of the present invention can also be applied to resin particles other than toner particles. For example, the method of the present invention can be properly applied to powder coating materials or the like.

EXAMPLES (1) Production of Toner

Example 1

First, 100 parts by weight of an epoxy resin (glass transition point Tg: 60° C., melting point Tm: 110° C.) as a binder resin, 5 parts by weight of a phthalocyanine pigment (phthalocyanine blue, manufactured by Dainichiseika Color & Chemicals Mfg. Co., Ltd.) as a coloring agent, and 300 parts by weight of tetrahydrofuran (manufactured by Wako Pure Chemical Industries, Ltd.) as a solvent were prepared.

These components were mixed and dispersed using a ball mill for 10 hours to prepare a binder resin solution (a resin liquid).

At the same time, 10 parts by weight of sodium polyacrylate (average degree of polymerization n=2,700 to 7,500, manufactured by Wako Pure Chemical Industries, Ltd.) as a dispersant was dissolved in 590 parts by weight of ion-exchange water to prepare an aqueous solution.

Next, 600 parts by weight of the aqueous solution was poured into a 3-liter round-bottom stainless container, and then 409 parts by weight of the binder resin solution was added drop by drop for 10 minutes under stirring at 4,000 rpm with a T.K. Homomixer (manufactured by Tokushu Kika Kogyo Co., Ltd.). At this time, the temperature of the liquid in the stainless container was maintained at 70° C. After the completion of dropping of the binder resin solution, the resulting mixture was further stirred for 10 minutes while the temperature of the mixture was maintained at 70° C., to thereby obtain an emulsion.

Next, tetrahydrofuran contained in the emulsion (the dispersoid) was removed at 45° C. and at an ambient pressure of 10 to 20 kPa. Thereafter, the emulsion was cooled to room temperature, and then ion-exchange water was further added to obtain a binder resin suspension (a dispersion liquid) in which solid fine particles were dispersed.

Then, the obtained binder resin suspension (dispersion liquid) was placed in an atmosphere with a pressure of 14 kPa for 10 minutes under stirring to carry out deaeration treatment. At this time, the ambient temperature was 25° C. The thus obtained binder resin suspension (dispersion liquid) had a solid (dispersoid) concentration of 10 wt %. The viscosity of the binder resin suspension (the dispersion liquid) at 25° C. was 2 mPa·s. The average particle diameter Dm of the dispersoid constituting the binder resin suspension was 0.4 µm. In this connection, it is to be noted that the average particle diameter of the dispersoid was measured using a laser diffraction/scattering type particle size distribution analyzer (LA-920, manufactured by HORIBA, Ltd.)

The deaerated dispersion liquid (binder resin suspension) was fed into a dispersion liquid supply portion of a toner production apparatus as shown in FIG. 1 and FIG. 2. The dispersion liquid in the dispersion liquid supply portion was stirred with stirring means, and was supplied to a dispersion liquid storage portion provided in each head portion by the use of a metering pump. Then, the dispersion liquid stored in the dispersion liquid storage portions was ejected through ejecting portions into a solidifying portion. Each of the ejecting portions was formed into a circular opening having a diameter of 26 µm. It is to be noted that the vicinity of the ejecting portion of each of the head portions had been coated with a fluorocarbon resin (polytetrafluoroethylene) so as to have hydrophobicity.

The dispersion liquid was ejected in the form of droplets under the conditions where the temperature of the dispersion liquid in the head portions was 40° C., the frequency of a piezoelectric element was 10 kHz, the initial velocity of the dispersion liquid at the time when the dispersion liquid was ejected from the ejecting portions was 4 m/sec, and the amount of the dispersion liquid per droplet ejected from the head portions was 3 pl (diameter Dd: 18 µm, weight: about 3 ng). Although the toner production apparatus had two or more head portions, the dispersion liquid was ejected in such a manner that the timing of ejection was different in at least adjacent head portions.

Further, when the dispersion liquid was ejected in the form of droplets, air having a temperature of 40° C. and a humidity of 27% RH was injected from gas injection openings in a vertically downward direction at a flow rate of 4 m/sec. The pressure (the ambient pressure) in a housing was adjusted to 100 to 105 kPa. The temperature (the ambient temperature) in the housing was adjusted to 35 to 40° C. The length of the solidifying portion (the length of the solidifying portion in a direction that the dispersion liquid is conveyed) was 2 m.

In the solidifying portion, the dispersion medium was removed from the ejected dispersion liquid to form agglomerates of the dispersoid (fine particles), and then the formed agglomerates were collected in a collection portion (this is a dispersion medium removing step). Further, the processing time of the dispersion medium removing step (that is, the time required to pass through the solidifying portion) per each particle (each droplet or each agglomerate formed from the droplet) was 12 seconds. The amount of water contained in the obtained agglomerates was 5 to 10 wt %. It is to be noted that the amount of water was measured according to Karl Fischer technique.

Thereafter, the obtained agglomerates were subjected to aeration for 1 hour while being heated to 50° C. to reduce the amount of water contained in the agglomerates to about 0.5 wt %.

Then, the agglomerates were subjected to bonding treatment to thereby obtain toner particles. The bonding treatment was carried out using Surfusing System (SFS-3 model, manufactured by Nippon Pneumatic Mfg. Co., Ltd.) under the conditions where the processing temperature (the temperature of hot-air) was 70° C., the volume of hot-air was 1 m³/min, the volume of distribution air was 0.1 m³/min, the feeding rate of a raw material was 0.5 kg/hr, and the volume of suction air was 10 m³/min. The processing time of the bonding treatment per each agglomerate (each particle) was 3 seconds.

The obtained toner particles had a water content of 0.3 to 0.5 wt %, an average roundness R of 0.981, and a standard deviation of roundness of 0.013, an average particle diameter (volume basis) Dt of 6.5 μm, and a standard deviation of particle diameter (volume basis) was 0.8 μm. In this connection, it is to be noted that the roundness was measured in a water suspension system by the use of a flow system particle image analyzer (FPIA-2000, manufactured by Toa Iyodensi Co.). The roundness R was determined by the following formula (I):

$$R = L_0/L_1 \quad (I)$$

where $L_1$ (μm) represents the circumference of projected image of a particle that is a subject of measurement, and $L_0$ (μm) represents the circumference of a perfect circle having the same area as that of the projected image of the particle that is a subject of measurement.

Example 2

A toner was produced in the same manner as in Example 1 except that the binder resin was changed to an acrylic resin (glass transition point Tg: 52° C., melting point Tm: 105° C.).

Example 3

A toner was produced in the same manner as in Example 1 except that the binder resin was changed to a polycarbonate resin (glass transition point Tg: 55° C., melting point Tm: 95° C.)

Comparative Example 1

A toner was produced in the same manner as in Example 1 except that the temperature of gas (air) injected from the gas injection openings during the ejection of the dispersion liquid was changed to 110° C., the temperature (the ambient temperature) in the housing during the ejection of the dispersion liquid was changed to 70 to 90° C., and the agglomerates collected in the collection portion were directly used as toner particles without carrying out the bonding step.

Comparative Example 2

A toner was produced in the same manner as in Comparative Example 1 except that the binder resin was changed to an acrylic resin (glass transition point Tg: 52° C., melting point Tm: 105° C.).

Comparative Example 3

First, 300 parts by weight of an acrylic resin (glass transition point Tg: 52° C., melting point Tm: 105° C.) as a binder resin, 15 parts by weight of a phthalocyanine pigment (phthalocyanine blue, manufactured by Dainichiseika Color & Chemicals Mfg. Co., Ltd.) as a coloring agent, 3 parts by weight of a chromium complex of salicylic acid (Bontron E-81, manufactured by Orient Chemical Industries, Ltd.) as a charge controlling agent, 9 parts by weight of carnauba wax as a wax, and 300 parts by weight of toluene (manufactured by Wako Pure Chemical Industries, Ltd.) as a solvent were prepared.

These components were mixed and stirred while being maintained at 85° C. to prepare a binder resin solution (a resin liquid). The viscosity of the binder resin solution at 25° C. was 12 mPa·s.

A toner was produced in the same manner as in Comparative Example 1 except that the thus obtained binder resin solution (resin liquid) was used as an ejection liquid.

The surface of each of the toner particles obtained in Examples 1 to 3 and Comparative Examples 1 to 3 was observed using a scanning electron microscope (SEM). As a result, it was confirmed that the toner particles obtained in Examples 1 to 3 had no relatively large surface irregularities and had a substantially spherical shape. On the other hand, it was confirmed that the toner particles obtained in Comparative Examples 1 to 3 had relatively large surface irregularities and large variations in shape.

Figure 9:
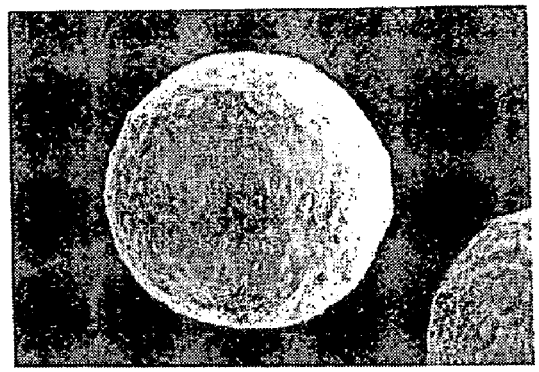
FIG. 9 is an electron micrograph of the toner particles of Example 1.
Figure 10:
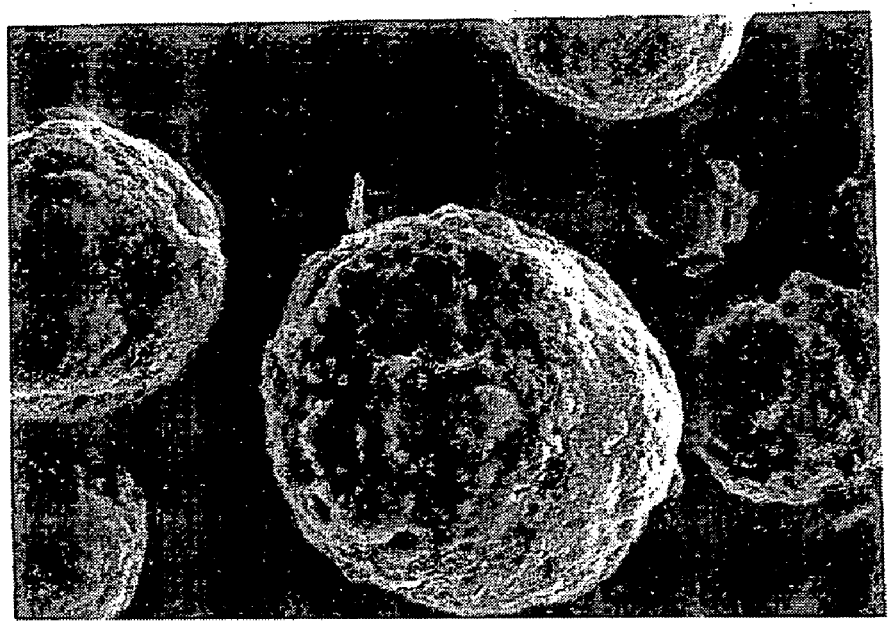
FIG. 10 is an electron micrograph of the toner particles of Comparative Example 1.

The electron micrographs of the toner particles of Example 1 and comparative Example 1 are shown in FIG. 9 and FIG. 10, respectively.

The toner production conditions of each of Examples and Comparative Examples are shown in the following Table 1. It is to be noted that in Table 1, the production conditions of Comparative Example 3 filled in the columns for the conditions of the dispersion medium removing step represent the conditions inside the solidifying portion (the conditions of a solvent removing step).

TABLE 1

| | | Ejecting liquid (Dispersion liquid) | | | Dispersion medium removing step | | Bonding step | |
|---|---|---|---|---|---|---|---|---|
| | Kinds of resin components | Average particle diameter of dispersoid Dm[μm] | Viscosity at 25° C. [mPa·s] | Amount of ejecting liquid [pl] | Processing temperature [° C.] | Processing time [sec.] | Processing temperature [° C.] | Processing time [sec.] |
| Ex. 1 | Epoxy resin | 0.4 | 2 | 3 | 35~40 | 12 | 70 | 3 |
| Ex. 2 | Acrylic resin | 0.5 | 3 | 3 | 35~40 | 12 | 70 | 3 |
| Ex. 3 | Polycarbonate resin | 0.5 | 4 | 3 | 35~40 | 12 | 70 | 3 |
| Com. Ex. 1 | Epoxy resin | 0.4 | 2 | 3 | 70~90 | 12 | — | — |

TABLE 1-continued

|  | Ejecting liquid (Dispersion liquid) | | | Dispersion medium removing step | | Bonding step | |
|---|---|---|---|---|---|---|---|
|  | Kinds of resin components | Average particle diameter of dispersoid Dm[μm] | Viscosity at 25° C. [mPa·s] | Amount of ejecting liquid [pl] | Processing temperature [° C.] | Processing time [sec.] | Processing temperature [° C.] | Processing time [sec.] |
| Com. Ex. 2 | Acrylic resin | 0.5 | 3 | 3 | 70~90 | 12 | — | — |
| Com. Ex. 3 | Acrylic resin | — | 12 | 3 | 35~40 | 12 | — | — |

(2) Evaluation

For each of the toners obtained in Examples and Comparative Examples, durability and transfer efficiency were evaluated.

(2.1) Durability

The toner obtained in each of Examples and Comparative Examples was set in a developing device of a color laser printer (LP-2000C, manufactured by Seiko Epson Corporation). Then, the developing device was continuously rotated with nothing being printed out. After a lapse of 12 hours, the developing device was taken out of the printer to visually observe the evenness of a thin layer of the toner formed on the developing roller, and then the durability of the toner was evaluated according to the following four criteria.

A: No irregularity was observed in the thin layer.
B: Almost no irregularity was observed in the thin layer.
C: Irregularity was observed to some extent in the thin layer.
D: Irregularity was clearly observed as stripes in the thin layer.

(2.2) Transfer Efficiency

For each of the toners obtained in Examples and Comparative Examples, transfer efficiency was evaluated. The transfer efficiency was evaluated using a color laser printer (LP-2000C, manufactured by Seiko Epson Corporation) in a manner described below.

A toner on a photoreceptor was collected using a tape just after the developing step was completed (that is, prior to transfer), and the toner remaining on the photoreceptor was collected using another tape after transfer (that is, after printing). The weight of each of the collected toners was measured. The transfer efficiency was determined using the formula: $(W_b - W_a) \times 100 / W_b$, where $W_b$ (g) represents the weight of a toner on a photoreceptor prior to transfer and $W_a$ (g) represents the weight of the toner remaining on the photoreceptor after transfer.

These evaluation results and the average roundness R, standard deviation of roundness, average particle diameter (volume basis) Dt, and standard deviation of particle diameter (volume basis) of the toner particles of each of the toners obtained in Examples and Comparative Examples are shown in the following Table 2.

TABLE 2

|  | Shape of toner particles | | | | Evaluation | |
|---|---|---|---|---|---|---|
|  | Average roundness R | Standard deviation of roundness | Average particle diameter Dt (volume basis) [μm] | Standard deviation of particle diameter [μm] | Transfer efficiency [%] | Durability |
| Ex. 1 | 0.981 | 0.013 | 6.5 | 0.8 | 98.0 | A |
| Ex. 2 | 0.972 | 0.018 | 6.3 | 0.9 | 97.0 | A |
| Ex. 3 | 0.975 | 0.02 | 6.6 | 0.9 | 97.5 | A |
| Com. Ex. 1 | 0.962 | 0.03 | 6.7 | 1.0 | 92 | D |
| Com. Ex. 2 | 0.951 | 0.03 | 6.5 | 1.1 | 92 | D |
| Com. Ex. 3 | 0.930 | 0.04 | 6.6 | 1.0 | 90 | D |

As is clear from Table 2, all the toners according to the present invention (Examples 1 to 3) had a high degree of roundness, a narrow particle size distribution, and small variations in particle shape (a small standard deviation of roundness).

On the other hand, in each of the toners of Comparative Examples, there were many toner particles having an especially low degree of roundness and a relatively large irregularities (projections). It is supposed that these facts result from the following reasons.

Specifically, according to Examples 1 to 3, since a material to be ejected from the head portions is a dispersion liquid (a suspension), the material is selectively cut somewhere in the dispersion medium having a low viscosity from a microscopic standpoint and is then ejected as a dispersion liquid from the head portions in the form of droplets. Further, since the aqueous dispersion medium has an appropriate surface tension, the dispersion liquid is immediately formed into a spherical shape (droplet) after it is ejected. Furthermore, according to Examples 1 to 3, since the toner particles are obtained by carrying out the dispersion medium removing treatment to form agglomerates and then subjecting the agglomerates to the bonding treatment, agglomeration of the dispersoid uniformly occurs, and therefore the agglomerates and toner particles produced by way of the agglomerates have a high degree of roundness and small variations in shape.

On the other hand, according to Comparative Examples 1 and 2, since the toner particles are not produced by way of agglomerates (that is, the toner particles are produced without carrying out the dispersion medium removing step and the bonding step), that is, since the toner particles are directly produced without the above steps, agglomeration of the dispersoid does not uniformly occur when the dispersion medium is removed from the droplets of the dispersion liquid. Therefore, the obtained toner particles have a number of relatively large surface irregularities and large variations in size and shape. Further, according to Comparative Example 3, since a raw material to be used for producing the toner has a uniform viscosity even when microscopically observed, the droplets of the raw material tend to have an elongated tail when ejected from the head portions. Further, according to Comparative Example 3, since the dispersion liquid is prepared using a solution, the droplets of the dispersion liquid are solidified in such a shape as described above (that is, in a shape having an elongated tail) as the solvent is removed in the solidifying portion. For these reasons, the toner particles according to Comparative Examples have relatively large irregularities (projections).

In addition, as is clear from Table 2, the toners according to the present invention had excellent transfer efficiency. On the other hand, the toners according to Comparative Examples had poor transfer efficiency. It is supposed that these facts result from the following reasons. That is, the toners according to the present invention have sufficiently small variations in size, shape and properties among toner particles, while the toners according to Comparative Examples have large variations in size, shape and properties among toner particles. Further, the toners according to the present invention had excellent durability, while the toners according to Comparative Examples had poor durability.

(3) Production of Toner

Example 4

First, 100 parts by weight of a polyester resin (glass transition point Tg: 59° C., melting point Tm: 155° C.) as a binder resin, 5 parts by weight of a phthalocyanine pigment (phthalocyanine blue, manufactured by Dainichiseika Color & Chemicals Mfg. Co., Ltd.) as a coloring agent, and 300 parts by weight of tetrahydrofuran (manufactured by Wako Pure Chemical Industries, Ltd.) as a solvent were prepared.

These components were mixed and dispersed using a ball mill for 10 hours to prepare a binder resin solution (a resin liquid).

At the same time, 10 parts by weight of sodium polyacrylate (average degree of polymerization n=2,700 to 7,500, manufactured by Wako Pure Chemical Industries, Ltd.) as a dispersant was dissolved in 590 parts by weight of ion-exchange water to prepare an aqueous solution.

Next, 600 parts by weight of the aqueous solution was poured into a 3-liter round-bottom stainless container, and then 409 parts by weight of the binder resin solution was added drop by drop for 10 minutes under stirring at 4,000 rpm with a T.K. Homomixer (manufactured by Tokushu Kika Kogyo Co., Ltd.). At this time, the temperature of the liquid in the stainless container was maintained at 70° C. After the completion of dropping of the binder resin solution, the resulting mixture was further stirred for 10 minutes while the temperature of the mixture was maintained at 70° C., to thereby obtain an emulsion.

Next, tetrahydrofuran contained in the emulsion (the dispersoid) was removed at 45° C. and at an ambient pressure of 10 to 20 kPa. Thereafter, the emulsion was cooled to room temperature, and then ion-exchange water was further added to obtain a binder resin suspension (a dispersion liquid) in which solid fine particles were dispersed.

Then, the obtained binder resin suspension (dispersion liquid) was placed in an atmosphere with a pressure of 14 kPa for 10 minutes under stirring to carry out deaeration treatment. At this time, the ambient temperature was 25° C. The thus obtained binder resin suspension (dispersion liquid) had a solid (dispersoid) concentration of 10 wt %. The viscosity of the binder resin suspension (the dispersion liquid) at 25° C. was 2 mPa·s. The average particle diameter Dm of the dispersoid constituting the binder resin suspension was 0.4 μm. It is to be noted that the average particle diameter of the dispersoid was measured using a laser diffraction/scattering type particle size distribution analyzer (LA-920, manufactured by HORIBA, Ltd.) The deaerated dispersion liquid (binder resin suspension) was fed into a dispersion liquid supply portion of a toner production apparatus as shown in FIG. 1 and FIG. 2. The dispersion liquid in the dispersion liquid supply portion was stirred with stirring means, and was supplied to a dispersion liquid storage portion provided in each head portion by the use of a metering pump. Then, the dispersion liquid stored in the dispersion liquid storage portions was ejected through ejecting portions into a solidifying portion. Each of the ejecting portions was formed into a circular opening having a diameter of 26 μm. It is to be noted that the vicinity of the ejecting portion of each of the head portions had been coated with a fluorocarbon resin (polytetrafluoroethylene) so as to have hydrophobicity.

The dispersion liquid was ejected under the conditions where the temperature of the dispersion liquid in the head portions was 25° C., the frequency of a piezoelectric element was 10 kHz, the initial velocity of the dispersion liquid at the time when the dispersion liquid was ejected from the ejecting portions was 4 m/sec, and the amount of the dispersion liquid per droplet ejected from the head portions was 3 pl (diameter Dd: 18 μm, weight: about 3 ng). Although the toner production apparatus had two or more head portions, the dispersion liquid was ejected in such a manner that the timing of ejection was different in at least adjacent head portions.

Further, when the dispersion liquid was ejected in the form of droplets, air having a temperature of 40° C. and a humidity of 27% RH was injected from gas injection openings in a vertically downward direction at a flow rate of 4 m/sec. The pressure (the ambient pressure) in a housing was adjusted to 100 to 105 kPa. The temperature (the ambient temperature) in the housing was adjusted to 35 to 40° C. The length of the solidifying portion (the length of the solidifying portion in a direction that the dispersion liquid is conveyed) was 2 m.

In the solidifying portion, the dispersion medium was removed from the ejected dispersion liquid to form agglomerates of the dispersoid (fine particles), and then the formed agglomerates were collected in a collection portion (this is a dispersion medium removing step). Further, the processing time of the dispersion medium removing step (that is, the time required to pass through the solidifying portion) per each particle (each droplet or each agglomerate formed from the droplet) was 12 seconds. The amount of water contained in the obtained agglomerates was 5 to 10 wt %. It is to be noted that the amount of water was measured according to Karl Fischer technique.

Thereafter, the obtained agglomerates were subjected to aeration for 1 hour while being heated to 50° C. to reduce the amount of water contained in the agglomerates to about 0.5 wt %.

Then, the agglomerates were subjected to bonding treatment to thereby obtain toner particles. The bonding treatment was carried out using Surfusing System (SFS-3 model, manufactured by Nippon Pneumatic Mfg. Co., Ltd.) under the conditions where the processing temperature (the temperature of hot-air) was 70° C., the volume of hot-air was 1 m³/min, the volume of distribution air was 0.1 m³/min, the feeding rate of a raw material was 0.5 kg/hr, and the volume of suction air was 10 m³/min. The processing time of the bonding treatment per each agglomerate (each particle) was 3 seconds.

The obtained toner particles had a water content of 0.3 to 0.5 wt %, an average roundness R of 0.978, and a standard deviation of roundness of 0.016, an average particle diameter (volume basis) Dt of 6.5 µm, and a standard deviation of particle diameter (volume basis) was 0.8 µm. It is to be noted that the roundness was measured in a water suspension system by the use of a flow system particle image analyzer (FPIA-2000, manufactured by Toa Iyodensi Co.).

Examples 5 to 7

Toners were produced in the same manner as in Example 4 except that the temperature of the dispersion liquid in the head portions and the processing temperature and processing time of each of the steps were changed to those shown in Table 3, respectively.

Example 8

A toner was produced in the same manner as in Example 4 except that the binder resin was changed to a styrene-acrylic ester copolymer (glass transition point Tg: 52° C., melting point Tm: 105° C.).

Examples 9 to 11

Toners were produced in the same manner as in Example 8 except that the temperature of the dispersion liquid in the head portions and the processing temperature and processing time of each of the steps were changed to those shown in Table 3, respectively.

Example 12

A toner was produced in the same manner as in Example 4 except that the binder resin was changed to an epoxy resin (glass transition point Tg: 60° C., melting point Tm: 110° C.).

Examples 13 to 15

Toners were produced in the same manner as in Example 12 except that the temperature of the dispersion liquid in the head portions and the processing temperature and processing time of each of the steps were changed to those shown in Table 3, respectively.

Example 16

A toner was produced in the same manner as in Example 4 except that the binder resin was changed to an acrylic resin (glass transition point Tg: 52° C., melting point Tm: 105° C.).

Examples 17 to 19

Toners were produced in the same manner as in Example 16 except that the temperature of the dispersion liquid in the head portions and the processing temperature and processing time of each of the steps were changed to those shown in Table 4, respectively.

Example 20

A toner was produced in the same manner as in Example 4 except that the binder resin was changed to a mixture of 50 parts by weight of an epoxy resin (glass transition point Tg: 60° C., melting point Tm: 110° C.) and 50 parts by weight of an acrylic resin (glass transition point Tg: 52° C., melting point Tm: 105° C.).

Examples 21 to 23

Toners were produced in the same manner as in Example 20 except that the temperature of the dispersion liquid in the head portions and the processing temperature and processing time of each of the steps were changed to those shown in Table 4, respectively.

Comparative Example 4

A toner was produced in the same manner as in Example 4 except that the temperature of gas (air) injected from the gas injection openings during the ejection of the dispersion liquid was changed to 110° C., the temperature (the ambient temperature) in the housing during the ejection of the dispersion liquid was changed to 70 to 90° C., and the agglomerates collected in the collection portion were directly used as toner particles without carrying out the bonding step.

Comparative Example 5

A toner was produced in the same manner as in Comparative Example 4 except that the binder resin was changed to a styrene-acrylic ester copolymer (glass transition point Tg: 52° C., melting point Tm: 105° C.).

Comparative Example 6

A toner was produced in the same manner as in Comparative Example 4 except that the binder resin was changed to an epoxy resin (glass transition point Tg: 60° C., melting point Tm: 110° C.).

Comparative Example 7

A toner was produced in the same manner as in Comparative Example 4 except that the binder resin was changed to an acrylic resin (glass transition point Tg: 52° C., melting point Tm: 105° C.).

Comparative Example 8

First, 300 parts by weight of an epoxy resin (glass transition point Tg: 60° C., melting point Tm: 110° C.) as a binder resin, 15 parts by weight of a phthalocyanine pigment (phthalocyanine blue, manufactured by Dainichiseika Color & Chemicals Mfg. Co., Ltd.) as a coloring agent, 3 parts by weight of a chromium complex of salicylic acid (Bontron E-81, manufactured by Orient Chemical Industries, Ltd.) as a charge controlling agent, 9 parts by weight of carnauba wax as a wax, and 300 parts by weight of toluene (manufactured by Wako Pure Chemical Industries, Ltd.) as a solvent were prepared.

These components were mixed and stirred while being maintained at 85° C. to prepare a binder resin solution (a resin liquid). The viscosity of the binder resin solution at 25° C. was 12 mPa·s.

Then, a toner was produced in the same manner as in Comparative Example 4 except that the thus obtained binder resin solution (resin liquid) was used as a dispersion liquid.

The surface of each of the toner particles obtained in Examples 4 to 23 and Comparative Examples 4 to 8 was observed using a scanning electron microscope (SEM). As a result, it was confirmed that the toner particles obtained in Examples 4 to 23 had no relatively large surface irregularities and had a substantially spherical shape. On the other hand, it was confirmed that the toner particles obtained in Comparative Examples 4 to 8 had relatively large surface irregularities and large variations in shape.

The toner production conditions of each of Examples 4 to 23 and Comparative Examples 4 to 8 are shown in the following Tables 3 and 4. It is to be noted that in Table 4, the toner production conditions of Comparative Example 8 filled in the columns for the conditions of the dispersion liquid and conditions of the dispersion medium removing step represent the conditions of the solution (the dispersion liquid) and the conditions inside the solidifying portion (the conditions of the solvent removing step), respectively.

TABLE 3

| | Resin components | | | Dispersion liquid | | | | Dispersion medium removing step | | Bonding step | | | | | |
|---|---|---|---|---|---|---|---|---|---|---|---|---|---|---|---|
| | Kind | Tg [°C.] | Tm [°C.] | Ave. PD of dispersoid Dm[μm] | Temp. inside HP $T_0$[°C.] | Visco. [mPa·s] (25°C.) | A of EL [pl] | P-temp. $T_1$[°C.] | P-time [sec.] | P-temp. $T_2$[°C.] | P-time [sec.] | $T_1 - T_0$ [°C.] | $Tg - T_1$ [°C.] | $T_2 - Tm$ [°C.] | $T_2 - T_1$ [°C.] |
| Ex. 4 | Polyester resin | 59 | 155 | 0.4 | 25 | 2 | 3 | 35~40 | 12 | 70 | 3 | 10~15 | 19~24 | −85 | 30~35 |
| Ex. 5 | Polyester resin | 59 | 155 | 0.4 | 20 | 2 | 3 | 35~40 | 12 | 115 | 1 | 15~20 | 19~24 | −40 | 75~80 |
| Ex. 6 | Polyester resin | 59 | 155 | 0.4 | 30 | 2 | 3 | 35~40 | 10 | 115 | 2 | 5~10 | 19~24 | −40 | 75~80 |
| Ex. 7 | Polyester resin | 59 | 155 | 0.4 | 60 | 2 | 3 | 55~60 | 5 | 105 | 3 | −5~0 | −1~4 | −50 | 45~50 |
| Ex. 8 | s-a ester copolymer | 52 | 105 | 0.4 | 25 | 3 | 3 | 35~40 | 12 | 70 | 3 | 10~15 | 12~17 | −35 | 30~35 |
| Ex. 9 | s-a ester copolymer | 52 | 105 | 0.4 | 10 | 3 | 3 | 55~60 | 8 | 70 | 3 | 45~50 | −8~−3 | −35 | 10~15 |
| Ex. 10 | s-a ester copolymer | 52 | 105 | 0.4 | 40 | 3 | 3 | 35~40 | 12 | 140 | 1 | −5~0 | 12~17 | 35 | 100~105 |
| Ex. 11 | s-a ester copolymer | 52 | 105 | 0.4 | 40 | 3 | 3 | 35~40 | 12 | 70 | 3 | −5~0 | 12~17 | −35 | 30~35 |
| Ex. 12 | Epoxy resin | 60 | 110 | 0.4 | 25 | 2 | 3 | 35~40 | 12 | 70 | 3 | 10~15 | 20~25 | −40 | 30~35 |
| Ex. 13 | Epoxy resin | 60 | 110 | 0.4 | 10 | 2 | 3 | 55~60 | 10 | 70 | 3 | 45~50 | −5~0 | −40 | 10~15 |
| Ex. 14 | Epoxy resin | 60 | 110 | 0.4 | 40 | 2 | 3 | 35~40 | 12 | 120 | 1 | −5~0 | 20~25 | 10 | 80~85 |
| Ex. 15 | Epoxy resin | 60 | 110 | 0.4 | 40 | 2 | 3 | 35~40 | 12 | 70 | 3 | −5~0 | 20~25 | −40 | 30~35 |

Ave. PD of dispersoid: average particle diameter of dispersoid
Temp. inside HP: temperature inside head portion
Visco.: viscosity
A of EL: Amount of ejecting liquid
P-temp.: processing temperature
P-time: processing time
s-a ester copolymer: styrene acrylic ester copolymer

TABLE 4

| | Resin components | | | Dispersion liquid | | | | Dispersion medium removing step | | Bonding step | | | | | |
|---|---|---|---|---|---|---|---|---|---|---|---|---|---|---|---|
| | Kind | Tg [°C.] | Tm [°C.] | Ave. PD of dispersoid Dm[μm] | Tem. inside HP $T_0$[°C.] | Visco. [mPa·s] (25[°C.) | A of EL [pl] | P-temp. $T_1$[°C.] | P-time [sec.] | P-Temp. $T_2$[°C.] | P-time [sec.] | $T_1 - T_0$ [°C.] | $Tg - T_1$ [°C.] | $T_2 - Tm$ [°C.] | $T_2 - T_1$ [°C.] |
| Ex. 16 | Acrylic resin | 52 | 105 | 0.5 | 25 | 3 | 3 | 35~40 | 12 | 70 | 3 | 10~15 | 12~17 | −35 | 30~35 |
| Ex. 17 | Acrylic resin | 52 | 105 | 0.5 | 5 | 3 | 3 | 55~60 | 10 | 70 | 3 | 50~55 | −8~−3 | −35 | 10~15 |
| Ex. 18 | Acrylic resin | 52 | 105 | 0.5 | 45 | 3 | 3 | 35~40 | 12 | 130 | 1 | −10~−5 | 12~17 | 25 | 90~95 |

TABLE 4-continued

| | Resin components | | | Dispersion liquid | | | | Dispersion medium removing step | | Bonding step | | | | | |
|---|---|---|---|---|---|---|---|---|---|---|---|---|---|---|---|
| | Kind | Tg [° C.] | Tm [° C.] | Ave. PD of dispersoid Dm[μm] | Tem. inside HP T₀[° C.] | Visco. [mPa·s] (25[° C.]) | A of EL [pl] | P-temp. T₁[° C.] | P-time [sec.] | P-Temp. T₂[° C.] | P-time [sec.] | T₁ – T₀ [° C.] | Tg – T₁ [° C.] | T₂ – Tm [° C.] | T₂ – T₁ [° C.] |
| Ex. 19 | Acrylic resin | 52 | 105 | 0.5 | 45 | 3 | 3 | 35~40 | 12 | 70 | 5 | −10~−5 | 12~17 | −35 | 30~35 |
| Ex. 20 | Epoxy/ Acrylic resin | 56 | 107.5 | 0.4 | 25 | 2 | 3 | 35~40 | 12 | 70 | 3 | 10~15 | 16~21 | −37.5 | 30~35 |
| Ex. 21 | Epoxy/ Acrylic resin | 56 | 107.5 | 0.4 | 5 | 2 | 3 | 55~60 | 5 | 70 | 3 | 50~55 | −4~1 | −37.5 | 10~15 |
| Ex. 22 | Epoxy/ Acrylic resin | 56 | 107.5 | 0.4 | 40 | 2 | 3 | 35~40 | 12 | 130 | 2 | −5~0 | 16~21 | 22.5 | 90~95 |
| Ex. 23 | Epoxy/ Acrylic resin | 56 | 107.5 | 0.4 | 35 | 2 | 3 | 30~35 | 15 | 70 | 5 | −5~0 | 16~21 | −37.5 | 30~35 |
| Com. Ex. 4 | Polyester resin | 59 | 180 | 0.4 | 25 | 2 | 3 | 70~90 | 12 | — | — | 45~65 | −11~−31 | — | — |
| Com. Ex. 5 | s-a ester copolymer | 52 | 105 | 0.4 | 25 | 3 | 3 | 70~90 | 12 | — | — | 45~65 | −18~−38 | — | — |
| Com. Ex. 6 | Epoxy resin | 60 | 110 | 0.4 | 25 | 2 | 3 | 70~90 | 12 | — | — | 45~65 | −10~−30 | — | — |
| Com. Ex. 7 | Acrylic resin | 52 | 105 | 0.5 | 25 | 3 | 3 | 70~90 | 12 | — | — | 45~65 | −18~−38 | — | — |
| Com. Ex. 8 | Epoxy resin | 60 | 110 | — | 25 | 12 | 3 | 35~40 | 12 | — | — | 10~15 | 20~25 | — | — |

Ave. PD of dispersoid: average particle diameter of dispersoid
Temp.inside HP: temperature inside head portion
Visco.: viscosity
A of EL: Amount of ejecting liquid
P-temp.: processing temperature
P-time: processing time
s-a ester copolymer: styrene acrylic ester copolymer (4) Evaluation For each of the toners obtained in Examples 4 to 23 and Comparative Examples 4 to 8, the ratio of hollow particles contained in the toner, durability and transfer efficiency were evaluated.

(4.1) Ratio of Hollow Particles

The internal structure of the toner particles of each of the toners obtained in Examples 4 to 23 and Comparative Examples 4 to 8 was observed using a transmission electron microscope (TEM), and then the ratio of hollow particles contained in the toner was evaluated according to the following four criteria.

A: No hollow particle was observed.
B: Few hollow particles were observed, but the ratio thereof was less than 1%.
C: The ratio of hollow particles was 1% or higher but less than 3%.
D: The ratio of hollow particles was 3% or higher.

(4.2) Durability

The toner obtained in each of Examples 4 to 23 and Comparative Examples 4 to 8 was set in a developing device of a color laser printer (LP-2000C, manufactured by Seiko Epson Corporation). Then, the developing device was continuously rotated with nothing being printed out. After a lapse of 12 hours, the developing device was taken out of the printer to visually observe the evenness of a thin layer of the toner formed on the developing roller, and then the durability of the toner was evaluated according to the following four criteria.

A: No irregularity was observed in the thin layer.
B: Almost no irregularity was observed in the thin layer.
C: Irregularity was observed to some extent in the thin layer.
D: Irregularity was clearly observed as stripes in the thin layer.

(4.3) Transfer Efficiency

For each of the toners obtained in Examples 4 to 23 and Comparative Examples 4 to 8, transfer efficiency was evaluated. The transfer efficiency was evaluated using a color laser printer (LP-2000C, manufactured by Seiko Epson Corporation) in a manner described below.

A toner on a photoreceptor was collected using a tape just after the developing step was completed (that is, prior to transfer), and the toner remaining on the photoreceptor was collected using another tape after transfer (that is, after printing). The weight of each of the collected toners was measured. The transfer efficiency was determined using the formula: $(W_b - W_a) \times 100 / W_b$, where $W_b$ (g) represents the weight of a toner on a photoreceptor prior to transfer and $W_a$ (g) represents the weight of the toner remaining on the photoreceptor after transfer.

These evaluation results and the average roundness R, standard deviation of roundness, average particle diameter (volume basis) Dt, and standard deviation of particle diameter (volume basis) of the toner particles of each of the toners obtained in Examples 4 to 23 and Comparative Examples 4 to 8 are shown in the following Table 5.

low particles. Even in a case where the toner contains such defective toner particles, the ratio thereof in the toner is extremely low.

TABLE 5

|  | Shape of toner particles | | | | Evaluation | | |
|---|---|---|---|---|---|---|---|
|  | Average roundness R | Standard deviation of roundness | Average particle diameter Dt (volume basis) [μm] | Standard deviation of particle diameter [μm] | Ratio of hollow particles | Transfer efficiency [%] | Durability |
| Ex. 4 | 0.978 | 0.016 | 6.5 | 0.8 | A | 97.8 | A |
| Ex. 5 | 0.983 | 0.011 | 6.5 | 0.6 | A | 98.3 | A |
| Ex. 6 | 0.982 | 0.011 | 6.6 | 0.7 | A | 98.2 | A |
| Ex. 7 | 0.972 | 0.021 | 6.5 | 0.9 | B | 96.9 | A |
| Ex. 8 | 0.981 | 0.012 | 6.5 | 0.6 | A | 98.1 | A |
| Ex. 9 | 0.972 | 0.021 | 6.6 | 0.9 | B | 96.8 | A |
| Ex. 10 | 0.973 | 0.017 | 6.5 | 0.8 | A | 97.4 | A |
| Ex. 11 | 0.980 | 0.015 | 6.5 | 0.8 | A | 97.9 | A |
| Ex. 12 | 0.983 | 0.012 | 6.6 | 0.7 | A | 98.1 | A |
| Ex. 13 | 0.971 | 0.022 | 6.5 | 0.9 | B | 96.5 | A |
| Ex. 14 | 0.979 | 0.016 | 6.4 | 0.8 | A | 97.8 | A |
| Ex. 15 | 0.980 | 0.015 | 6.5 | 0.8 | A | 97.9 | A |
| Ex. 16 | 0.982 | 0.012 | 6.6 | 0.7 | A | 98.2 | A |
| Ex. 17 | 0.972 | 0.021 | 6.5 | 0.9 | B | 97.0 | A |
| Ex. 18 | 0.979 | 0.016 | 6.4 | 0.8 | A | 97.7 | A |
| Ex. 19 | 0.980 | 0.015 | 6.5 | 0.8 | A | 97.8 | A |
| Ex. 20 | 0.981 | 0.010 | 6.6 | 0.6 | A | 98.3 | A |
| Ex. 21 | 0.971 | 0.020 | 6.5 | 0.9 | B | 96.6 | A |
| Ex. 22 | 0.979 | 0.016 | 6.6 | 0.8 | A | 97.9 | A |
| Ex. 23 | 0.980 | 0.015 | 6.5 | 0.8 | A | 97.8 | A |
| Com. Ex. 4 | 0.961 | 0.030 | 6.5 | 1.0 | D | 91 | D |
| Com. Ex. 5 | 0.958 | 0.037 | 6.7 | 1.0 | D | 92 | D |
| Com. Ex. 6 | 0.955 | 0.032 | 6.5 | 1.1 | D | 91 | D |
| Com. Ex. 7 | 0.960 | 0.031 | 6.6 | 1.2 | D | 92 | D |
| Com. Ex. 8 | 0.930 | 0.045 | 6.6 | 1.0 | D | 90 | D |

As is clear from Table 5, all the toners according to the present invention (Examples 4 to 23) had a high degree of roundness, a narrow particle size distribution, and small variations in particle shape (a small standard deviation of roundness), and contained substantially no defective toner particles such as hollow particles.

On the other hand, in each of the toners of Comparative Examples 4 to 8, there were many toner particles having an especially low degree of roundness and a relatively large irregularities (projections). It is supposed that these facts result from the following reasons.

Specifically, according to Examples 4 to 23, since a material to be ejected from the head portions is a dispersion liquid (a suspension), the material is selectively cut somewhere in the dispersion medium having a low viscosity from a microscopic standpoint and is then ejected as a dispersion liquid from the head portions in the form of droplets. Further, since the aqueous dispersion medium has an appropriate surface tension, the ejected liquid is immediately formed into a spherical shape (droplet) after it is ejected. Furthermore, according to Examples 4 to 23, since toner particles are obtained by carrying out dispersion medium removing treatment to form agglomerates and then subjecting the agglomerates to bonding treatment, agglomeration of the dispersoid uniformly occurs and rapid removal of the dispersion medium (particularly, rapid removal (bumping) of the dispersion medium in the vicinity of the center of the droplets of the dispersion liquid) is reliably prevented. Therefore the agglomerates and toner particles produced by way of the agglomerates have a high degree of roundness and small variations in shape, and the obtained toner contains substantially no defective toner particles such as hol- On the other hand, according to Comparative Examples 4 to 7, since toner particles are not produced by way of agglomerates (that is, toner particles are produced without carrying out the dispersion medium removing step and the bonding step), that is, since toner particles are directly produced, agglomeration of the dispersoid does not uniformly occur when the dispersion medium is removed from the droplets of the ejected dispersion liquid. Therefore, the obtained toner particles have a plurality of relatively large surface irregularities and large variations in size and shape. Further, since the dispersion medium is rapidly removed, the ratio of defective toner particles such as hollow particles contained in the obtained toner tends to be high. According to Comparative Example 8, since a raw material to be used for producing a toner has a uniform viscosity even when microscopically observed, the droplets of the raw material tend to have an elongated tail when ejected from the head portions. Further, according to Comparative Example 8, since the dispersion liquid is prepared using a solution, the droplets of the dispersion liquid are solidified in such a shape as described above (that is, in a shape having an elongated tail) when the solvent is removed in the solidifying portion. Furthermore, as is the case for Comparative Examples 4 to 7, since the solvent is rapidly removed, the ratio of defective toner particles such as hollow particles contained in the obtained toner tends to be high. For these reasons, the toner particles according to Comparative Examples 9 to 11 have a relatively large irregularities (projections).

In addition, as is clear from Table 5, the toners according to the present invention had excellent transfer efficiency. On the other hand, the toners according to Comparative Examples 4 to 8 had poor transfer efficiency. It is supposed that these facts result from the following reasons. Specifically, the toners according to the present invention contain substantially no defective toner particles such as hollow particles (even in a case where the toners contain defective toner particles, the ratio thereof in the toner is extremely low), and have sufficiently small variations in size, shape and properties among toner particles, while the toners according to Comparative Examples 4 to 8 have large variations in size, shape and properties among toner particles, and contain defective toner particles such as hollow particles in a high ratio. Further, the toners according to the present invention had excellent durability, but the toners according to Comparative Examples 4 to 8 had poor durability. It is supposed that excellent durability of the toners according to the present invention also results from the fact that the toners contain substantially no defective toner particles such as hollow particles and even in a case where the toners contain such defective toner particles, the ratio thereof in the toner is extremely low.

(5) Production of Toner

Example 24

First, 100 parts by weight of an epoxy resin (glass transition point Tg: 60° C., melting point Tm: 110° C.) as a binder resin, 5 parts by weight of a phthalocyanine pigment (phthalocyanine blue, manufactured by Dainichiseika Color & Chemicals Mfg. Co., Ltd.) as a coloring agent, and 300 parts by weight of tetrahydrofuran (manufactured by Wako Pure Chemical Industries, Ltd.) as a solvent were prepared.

These components were mixed and dispersed using a ball mill for 10 hours to prepare a binder resin solution (a resin liquid).

At the same time, 10 parts by weight of sodium polyacrylate (average degree of polymerization n=2,700 to 7,500, manufactured by Wako Pure Chemical Industries, Ltd.) as a dispersant was dissolved in 590 parts by weight of ion-exchange water to prepare an aqueous solution.

Next, 600 parts by weight of the aqueous solution was poured into a 3-liter round-bottom stainless container, and then 409 parts by weight of the binder resin solution was added drop by drop for 10 minutes under stirring at 4,000 rpm with a T.K. Homomixer (manufactured by Tokushu Kika Kokyo Co., Ltd.). At this time, the temperature of the liquid in the stainless container was maintained at 70° C. After the completion of dropping of the binder resin solution, the resulting mixture was further stirred for 10 minutes while the temperature of the mixture was maintained at 70° C., to thereby obtain an emulsion.

Next, tetrahydrofuran contained in the emulsion (the dispersoid) was removed at 45° C. and at an ambient pressure of 10 to 20 kPa. Thereafter, the emulsion was cooled to room temperature, and then ion-exchange water was further added to obtain a binder resin suspension (a dispersion liquid) in which solid fine particles were dispersed.

Then, the obtained binder resin suspension (dispersion liquid) was placed in an atmosphere with a pressure of 14 kPa for 10 minutes under stirring to carry out deaeration treatment. At this time, the ambient temperature was 25° C. The thus obtained binder resin suspension (dispersion liquid) had a solid (dispersoid) concentration of 10 wt %. The viscosity of the binder resin suspension (the dispersion liquid) at 25° C. was 2 mPa·s. The average particle diameter Dm of the dispersoid constituting the binder resin suspension was 0.4 μm. It is to be noted that the average particle diameter of the dispersoid was measured using a laser diffraction/scattering type particle size distribution analyzer (LA-920, manufactured by HORIBA, Ltd.)

The deaerated dispersion liquid (binder resin suspension) was fed into a dispersion liquid supply portion of a toner production apparatus as shown in FIG. 3. The dispersion liquid in the dispersion liquid supply portion was stirred with stirring means, and was supplied to a dispersion liquid storage portion provided in each head portion by the use of a metering pump. Then, the dispersion liquid stored in the dispersion liquid storage portions was ejected through ejecting portions in the form of droplets into a solidifying portion. Each of the ejecting portions was formed into a circular opening having a diameter of 26 μm. It is to be noted that the vicinity of the engaging portion of each of the head portions was coated with a fluorocarbon resin (polytetrafluoroethylene) so as to have hydrophobicity.

The dispersion liquid was ejected under the conditions where the temperature of the dispersion liquid in the head portions was 40° C., the frequency of a piezoelectric element was 10 kHz, the initial velocity of the dispersion liquid at the time when the dispersion liquid was ejected from the ejecting portions was 4 m/sec, and the amount of the dispersion liquid per droplet ejected from the head portions was 3 pl (particle diameter Dd: 18 μm, weight: about 3 ng). Although the toner production apparatus had two or more head portions, the dispersion liquid was ejected in such a manner that the timing of ejection was different in at least adjacent head portions.

Further, when the dispersion liquid was ejected, air having a temperature of 40° C. and a humidity of 27% RH was injected from gas injection openings in a vertically downward direction at a flow rate of 4 m/sec. The pressure (the ambient pressure) in a housing was adjusted to 100 to 105 kPa. The temperature (the ambient temperature) of a first region provided near the ejecting portions was adjusted to 35 to 40° C., and the temperature (the ambient temperature) of a second region provided near a collecting portion was adjusted to 60 to 65° C. The length of the first region (the length of the first region in a direction that the dispersion liquid is conveyed) was 2 m, and the length of the second region (the length of the second region in a direction that the dispersion liquid is conveyed) was 1 m.

In the first region, the dispersion medium was removed from the droplets of the dispersion liquid ejected into the solidifying portion to form agglomerates of the dispersoid (fine particles) (this is a dispersion medium removing step). Then, the agglomerates were conveyed to the second region. In the second region, the fine particles constituting each of the agglomerates were partially welded and preliminarily bonded together to form preliminarily bonded bodies, and the thus formed preliminarily bonded bodies were collected in the collection portion (this is a first bonding step). The processing time of the dispersion medium removing step (that is, the time required to pass through the first region) per each particle (each droplet or each agglomerate formed from the droplet) was 12 seconds, and the processing time of the first bonding step (that is, the time required to pass through the second region) was 3 seconds. The amount of water contained in the obtained preliminarily bonded bodies was 5 to 10 wt %. It is to be noted that the amount of water was measured according to Karl Fischer technique.

Thereafter, the obtained preliminarily bonded bodies were subjected to aeration for 1 hour at 50° C. to reduce the amount of water contained in the preliminarily bonded bodies to about 0.5 wt %.

Then, the preliminarily bonded bodies were subjected to the second bonding treatment to thereby obtain toner particles. The second bonding treatment was carried out using Surfusing System (SFS-3 model, manufactured by Nippon Pneumatic Mfg. Co., Ltd.) under the conditions where the processing temperature (the temperature of hot-air) was 70° C., the volume of hot-air was 1 m³/min, the volume of distribution air was 0.1 m³/min, the feeding rate of a raw material was 0.5 kg/hr, and the volume of suction air was 10 m³/min. The processing time per each preliminarily bonded body (each particle) was 3 seconds.

The obtained toner particles had a water content of 0.3 to 0.5 wt %, an average roundness R of 0.983, and a standard deviation of roundness of 0.015. An average particle diameter (volume basis) Dt of the toner particles was 6.3 µm, and a standard deviation of particle diameter (volume basis) was 0.7 am. It is to be noted that the roundness was measured in a water suspension system by the use of a flow system particle image analyzer (FPIA-2000, manufactured by Toa Iyodensi Co.). The roundness R was determined by the following formula (I):

$$R = L_0/L_1 \qquad (I)$$

where $L_1$ (µm) represents the circumference of projected image of a particle that is a subject of measurement, and $L_0$ (µm) represents the circumference of a perfect circle having the same area as that of the projected image of the particle that is a subject of measurement.

Example 25

In the same manner as in Example 24 except that the temperature in the housing (the solidifying portion) was adjusted to 35 to 40° C. throughout the entire length of the housing, droplets of a dispersion liquid were intermittently ejected into the solidifying portion of the toner production apparatus. In the solidifying portion, a dispersion medium was removed from the ejected droplets to form agglomerates of a dispersoid (fine particles), and then the agglomerates were collected in the collection portion (this is a dispersion medium removing step). The obtained agglomerates were observed using a scanning electron microscope (SEM). As a result, it was confirmed that the two or more fine particles constituting each of the agglomerates were substantially unwelded though they are in contact with each other.

Thereafter, the obtained agglomerates were subjected to aeration for 1 hour at 50° C. to reduce the amount of water contained in the agglomerates to about 0.5 wt %. Here, a part of the aerated agglomerates were placed in water, and were then stirred using a ball mill for 2 minutes. As a result, the agglomerates were disintegrated (decomposed) into the fine particles which had constituted the agglomerates.

Then, the agglomerates were further subjected to aeration for 30 minutes at a temperature around the glass transition point of the binder resin (58±2° C.) to partially allow the two or more fine particles constituting each of the agglomerates to be welded and partially bonded together. As a result, preliminarily bonded bodies were obtained. The water content of the obtained preliminarily bonded bodies was 0.3 to 0.5 wt %. Here, a part of the obtained preliminarily bonded bodies were placed in water, and were then stirred using a ball mill for 5 minutes. As a result, the preliminarily bonded bodies were not disintegrated (decomposed) into the fine particles and kept their shapes.

Then, the preliminarily bonded bodies were subjected to the second bonding treatment to obtain toner particles. The second bonding treatment was carried out using Surfusing System (SFS-3 model, manufactured by Nippon Pneumatic Mfg. Co., Ltd.) under the conditions where the processing temperature (the temperature of hot-air) was 70° C., the volume of hot-air was 1 m³/min, the volume of distribution air was 0.1 m³/min, the feeding rate of a raw material was 0.5 kg/hr, and the volume of suction air was 10 m³/min. The processing time per each preliminarily bonded body (each particle) was 3 seconds.

Example 26

A toner was produced in the same manner as in Example 24 except that the binder resin was changed to an acrylic resin (glass transition point Tg: 52° C., melting point Tm: 105° C.).

Example 27

A toner was produced in the same manner as in Example 24 except that the binder resin was changed to a polycarbonate resin (glass transition point Tg: 55° C., melting point Tm: 95° C.).

Comparative Example 9

A toner was produced in the same manner as in Example 24 except that the temperature of gas (air) injected from the gas injection portions during the ejection of the dispersion liquid was changed to 80° C., the temperature (the ambient temperature) in the housing during the ejection of the dispersion liquid was changed to 70 to 90° C., and the agglomerates collected in the collection portion were directly used as toner particles without carrying out the bonding step.

Comparative Example 10

A toner was produced in the same manner as in Comparative Example 9 except that the binder resin was changed to an acrylic resin (glass transition point Tg: 52° C., melting point Tm: 105° C.)

Comparative Example 11

First, 300 parts by weight of an acrylic resin (glass transition point Tg: 52° C., melting point Tm: 105° C.) as a binder resin, 15 parts by weight of a phthalocyanine pigment (phthalocyanine blue, manufactured by Dainichiseika Color & Chemicals Mfg. Co., Ltd.) as a coloring agent, 3 parts by weight of a chromium complex of salicylic acid (Bontron E-81, manufactured by Orient Chemical Industries, Ltd.) as a charge controlling agent, 9 parts by weight of carnauba wax as a wax, and 300 parts by weight of toluene (manufactured by Wako Pure Chemical Industries, Ltd.) as a solvent were prepared.

These components were mixed and stirred while being maintained at 85° C. to prepare a binder resin solution (a resin liquid). The viscosity of the binder resin solution at 25° C. was 12 mPa·s.

A toner was produced in the same manner as in Comparative Example 9 except that the thus obtained binder resin solution (resin liquid) was used as a dispersion liquid.

The surface of each of the toner particles obtained in Examples 24 to 27 and Comparative Examples 9 to 11 was observed using a scanning electron microscope (SEM). As a result, it was confirmed that the toner particles obtained in Examples 24 to 27 had no relatively large surface irregularities and had a substantially spherical shape. On the other hand, it was confirmed that the toner particles obtained in Comparative Examples 9 to 11 had relatively large surface irregularities and large variations in shape.

The toner production conditions of each of Examples 24 to 27 and Comparative Examples 9 to 11 are shown in the following Table 6. It is to be noted that in Table 6 the toner production conditions of Comparative Example 11 filled in the columns for the conditions of the dispersion medium removing step represent the conditions of the step of removing a solvent (the conditions inside the solidifying portion).

C: Irregularity was observed to some extent in the thin layer.

D: Irregularity was clearly observed as stripes in the thin layer.

(5.2) Transfer Efficiency

For each of the toners obtained in Examples 24 to 27 and Comparative Examples 9 to 11, transfer efficiency was evaluated. The transfer efficiency was evaluated using a

TABLE 6

|  | Ejecting liquid | | | Dispersion medium removing step | | First bonding step | | Second bonding step | |
| --- | --- | --- | --- | --- | --- | --- | --- | --- | --- |
|  | Kinds of resin components | Ave. PD of dispersoid Dm[μm] | Visco. at 25° C. [mPa·s] | Amount of EL [pl] | P-temp. [° C.] | P-time [sec.] | P-temp. [° C.] | P-time [sec.] | P-temp. [° C.] | P-time [sec.] |
| Ex. 24 | Epoxy resin | 0.4 | 2 | 3 | 35~40 | 12 | 60~65 | 3 | 70 | 3 |
| Ex. 25 | Epoxy resin | 0.4 | 2 | 3 | 35~40, 50 | 12 | 58 ± 2 | 3 | 70 | 3 |
| Ex. 26 | Acrylic resin | 0.5 | 3 | 3 | 35~40 | 12 | 60~65 | 3 | 70 | 3 |
| Ex. 27 | Polycarbonate resin | 0.5 | 4 | 3 | 35~40 | 12 | 60~65 | 3 | 70 | 3 |
| Com. Ex. 9 | Epoxy resin | 0.4 | 2 | 3 | 70~90 | 12 | — | — | — | — |
| Com. Ex. 10 | Acrylic resin | 0.5 | 3 | 3 | 70~90 | 12 | — | — | — | — |
| Com. Ex. 11 | Acrylic resin | — | 12 | 3 | 35~40 | 12 | — | — | — | — |

Ave. PD of dispersoid: average particle diameter of dispersoid
Visco.: Viscosity
Amount of EL: amount of ejecting liquid
P-temp.: processing temperature
P-time: processing time (5) Evaluation For each of the toners obtained in Examples 24 to 27 and Comparative Examples 9 to 11, durability and transfer efficiency were evaluated.

(5.1) Durability

The toner obtained in each of Examples 24 to 27 and Comparative Examples 9 to 11 was set in a developing device of a color laser printer (LP-2000C, manufactured by Seiko Epson Corporation). Then, the developing device was continuously rotated with nothing being printed out. After a lapse of 12 hours, the developing device was taken out of the printer to visually observe the evenness of a thin layer of the toner formed on the developing roller, and then the durability of the toner was evaluated according to the following four criteria.

A: No irregularity was observed in the thin layer.
B: Almost no irregularity was observed in the thin layer.

color laser printer (LP-2000C, manufactured by Seiko Epson Corporation) in a manner described below.

A toner on a photoreceptor was collected using a tape just after the developing step was completed (that is, prior to transfer), and the toner remaining on the photoreceptor was collected using another tape after transfer (that is, after printing). The weight of each of the collected toners was measured. The transfer efficiency was determined using the formula: $(W_b - W_a) \times 100/W_b$, where $W_b$ (g) represents the weight of a toner on a photoreceptor prior to transfer and $W_a$ (g) represents the weight of the toner remaining on the photoreceptor after transfer.

These evaluation results and the average roundness R, standard deviation of roundness, average particle diameter (volume basis) Dt, and standard deviation of particle diameter (volume basis) of the toner particles of each of the toners obtained in Examples 24 to 27 and Comparative Examples 9 to 11 are shown in the following Table 7.

TABLE 7

| | Shape of toner particles | | | | Evaluation | |
| --- | --- | --- | --- | --- | --- | --- |
| | Average roundness R | Standard deviation of roundness | Average particle Diameter Dt (volume basis) [μm] | Standard deviation of particle diameter [μm] | Transfer efficiency [%] | Durability |
| Ex. 24 | 0.983 | 0.015 | 6.3 | 0.7 | 98 | A |
| Ex. 25 | 0.984 | 0.018 | 6.4 | 0.8 | 97.5 | A |
| Ex. 26 | 0.981 | 0.017 | 6.6 | 0.7 | 97.0 | A |
| Ex. 27 | 0.983 | 0.013 | 6.3 | 0.8 | 97.5 | A |
| Com. Ex. 9 | 0.962 | 0.03 | 6.7 | 1.0 | 92 | D |

TABLE 7-continued

| | Shape of toner particles | | | | Evaluation | |
|---|---|---|---|---|---|---|
| | Average roundness R | Standard deviation of roundness | Average particle Diameter Dt (volume basis) [μm] | Standard deviation of particle diameter [μm] | Transfer efficiency [%] | Durability |
| Com. Ex. 10 | 0.951 | 0.03 | 6.5 | 1.1 | 92 | D |
| Com. Ex. 11 | 0.930 | 0.04 | 6.6 | 1.0 | 90 | D |

As is clear from Table 7, all the toners according to the present invention (Examples 24 to 27) had a high degree of roundness, a narrow particle size distribution, and small variations in particle shape (a small standard deviation of roundness).

On the other hand, in each of the toners of Comparative Examples 9 to 11, there were many toner particles having an especially low degree of roundness and a relatively large irregularities (projections). It is supposed that these facts result from the following reasons.

Specifically, according to Examples 24 to 27, since a raw material to be ejected from the head portions is a dispersion liquid (a suspension), the raw material is selectively cut somewhere in the dispersion medium having a low viscosity from a microscopic standpoint and is then ejected as a dispersion liquid from the head portions in the form of droplets. Further, since the aqueous dispersion medium has an appropriate surface tension, the dispersion liquid is immediately formed into a spherical shape (droplet) after it is ejected. Furthermore, according to Examples 24 to 27, since toner particles are obtained by carrying out dispersion medium removing treatment to form agglomerates, subjecting the agglomerates to the first bonding treatment to form preliminarily bonded bodies, and then subjecting the preliminarily bonded bodies to the second bonding treatment, agglomeration of the dispersoid uniformly occurs, and therefore the agglomerates and toner particles produced by way of the agglomerates have a high degree of roundness and small variations in shape.

On the other hand, according to Comparative Examples 9 and 10, since toner particles are not produced by way of agglomerates and preliminarily bonded bodies (that is, toner particles are produced without carrying out the dispersion medium removing step, the first bonding step, and the second bonding step), that is, since toner particles are directly produced, agglomeration of the dispersoid does not uniformly occur when the dispersion medium is removed from the ejected droplets of the dispersion liquid. Therefore, the obtained toner particles have a plurality of relatively large surface irregularities and large variations in size and shape. According to Comparative Example 11, since a raw material to be used for producing a toner has a uniform viscosity even when microscopically observed, the droplets of the raw material tend to have an elongated tail when ejected from the head portions. Further, according to Comparative Example 11, since a solution is used as a dispersion liquid, the droplets are solidified in such a shape as described above (that is, in a shape having an elongated tail) when the solvent is removed in the solidifying portion. For these reasons, the toner particles according to Comparative Examples have a relatively large irregularities (projections).

In addition, as is clear from Table 7, the toners according to the present invention had excellent transfer efficiency. On the other hand, the toners according to Comparative Examples 9 to 11 had poor transfer efficiency. It is supposed that these facts result from the following reasons. That is, the toners according to the present invention have sufficiently small variations in size, shape and properties among toner particles, while the toners according to Comparative Examples 9 to 11 have large variations in size, shape and properties among toner particles. Further, the toners according to the present invention had excellent durability, but the toners according to Comparative Examples 9 to 11 had poor durability.

Finally, it is to be understood that many changes and additions may be made to the embodiments described above without departing from the scope and spirit of the invention as defined in the following claims.

Further, it is also to be understood that the present disclosure relates to subject matters contained in Japanese Patent Applications No. 2003-413849 filed on Dec. 12, 2003 and No. 2004-214966 filed on Jul. 22, 2004 which are expressly incorporated herein by reference in their entireties.

What is claimed is:

1. A method for producing resin particles mainly made of a resin material using a dispersion liquid in which a dispersoid containing the resin material is finely dispersed in a dispersion medium, the method comprising:
   a dispersion medium removing step which comprises ejecting the dispersion liquid from a head portion in the form of droplets into a solidifying portion, conveying the droplets in the solidifying portion to remove the dispersion medium, and obtaining agglomerates each of which is composed of two ore more fine particles derived from the dispersoid; and
   a bonding step for welding and bonding the fine particles which constitute each of the agglomerates.

2. The method of producing resin particles as claimed in claim 1, wherein the dispersion medium removing step is carried out at a processing temperature which is equal to or lower than a glass transition point of the resin material constituting the dispersoid, and the bonding step is carried out at a processing temperature which is equal to or higher than the glass transition point of the resin material.

3. The method of producing resin particles as claimed in claim 2, wherein the temperature of the dispersion liquid to be ejected from the head portion is substantially equal to or lower than the processing temperature of the dispersion medium removing step.

4. The method of producing resin particles as claimed in claim 2, wherein the bonding step is carried out at a temperature which is equal to or higher than the glass transition point of the resin material and equal to or lower than a melting point of the resin material.

5. The method of producing resin particles as claimed in claim 1, wherein the dispersion liquid is intermittently ejected from the head portion by means of a piezoelectric pulse.

6. The method of producing resin particles as claimed in claim 1, wherein the head portion includes a dispersion liquid storage portion for storing the dispersion liquid, a piezoelectric device for applying a piezoelectric pulse to the dispersion liquid stored in the dispersion liquid storage portion, and an ejecting portion for ejecting the dispersion liquid by the piezoelectric pulse.

7. The method of producing resin particles as claimed in claim 6, wherein the ejecting portion is formed into a substantially circular opening having a diameter of 5 to 500 µm.

8. The method of producing resin particles as claimed in claim 5, wherein the frequency of the piezoelectric pulse is in the range of 1 kHz to 500 kHz.

9. The method of producing resin particles as claimed in claim 1, wherein a processing temperature in the bonding step is higher than a processing temperature in the dispersion medium removing step.

10. The method of producing resin particles as claimed in claim 9, wherein when the processing temperature of the dispersion medium removing step is defined as $T_1$ (° C.) and the processing temperature of the bonding step is defined as $T_2$ (° C.), $T_1$ and $T_2$ satisfy the relation of $0 \leq T_2 - T_1 \leq 200$.

11. The method of producing resin particles as claimed in claim 2, wherein when the processing temperature of the dispersion medium removing step is defined as $T_1$ (° C.), and the glass transition point of the resin material constituting the dispersoid 61 is defined as Tg (° C.), $T_1$ and Tg satisfy the relation of $0 \leq Tg - T_1 \leq 70$.

12. The method of producing resin particles as claimed in claim 4, wherein when the processing temperature of the bonding step is defined as $T_2$ (° C.) and the melting point of the resin material constituting the resin particles is defined as $T_m$ (° C.), $T_2$ and $T_m$ satisfy the relation of $-100 \leq T_2 - T_m \leq 110$.

13. The method of producing resin particles as claimed in claim 2, wherein the bonding step comprises a first bonding step for welding and preliminarily bonding two or more fine particles constituting each of the agglomerates to obtain a preliminarily bonded body; and a second bonding step for subjecting the preliminarily boded body to heat treatment to promote the welding and bonding of the fine particles.

14. The method of producing resin particles as claimed in claim 13, wherein when the processing temperature of the dispersion medium removing step is defined as $T_1$ (° C.) and the processing temperature of the first bonding step is defined as $T_2'$ (° C.), $T_1$ and $T_2'$ satisfy the relation of $0 \leq T_2' - T_1 \leq 70$.

15. The method of producing resin particles as claimed in claim 13, wherein a processing temperature of the second bonding step is higher than a processing temperature of the first bonding step.

16. The method of producing resin particles as claimed in claim 15, wherein when the processing temperature of the first bonding step is defined as $T_2'$ (° C.) and the processing temperature of the second bonding step is defied as $T_2''$ (° C.), $T_2'$ and $T_2''$ satisfy the relation of $0 \leq T_2'' - T_2' \leq 150$.

17. The method of producing resin particles as claimed in claim 13, wherein when a processing temperature of the second bonding step is defined as $T_2''$ (° C.) and a melting point of the resin material constituting the resin particles is defined as $T_m$ (° C.), $T_2''$ and $T_m$ satisfy the relation of $-100 \leq T_2'' - T_m \leq 110$.

18. The method of producing resin particles as claimed in claim 1, wherein the dispersion liquid used in the dispersion medium removing step has been subjected to deaeration treatment.

19. The method of producing resin particles as claimed in claim 18, wherein the deaeration treatment is carried out by placing the dispersion liquid in an atmosphere of 80 kPa or less.

20. The method of producing resin particles as claimed in claim 1, wherein the dispersion medium is mainly composed of water and/or a liquid having good compatibility with water.

21. The method of producing resin particles as claimed in claim 1, wherein the dispersion liquid is in the form of suspension.

22. The method of producing resin particles as claimed in claim 1, wherein the dispersion liquid is prepared by adding a material containing the resin material into a liquid containing at least water.

23. The method of producing resin particles as claimed in claim 1, wherein the dispersion liquid is prepared through a mixing process in which a resin liquid which contains at least the resin material and a solvent which dissolves at least a part of the resin material is mixed with an aqueous solution containing at least water.

24. The method of producing resin particles as claimed in claim 23, wherein the mixture of the resin liquid and the aqueous solution is carried out by adding the resin liquid into the aqueous solution drop by drop.

25. The method of producing resin particles as claimed in claim 23, wherein the dispersion liquid is prepared by removing at least a part of the solvent after the mixing process.

26. The method of producing resin particles as claimed in claim 25, wherein the solvent is removed by heating the dispersion liquid.

27. The method of producing resin particles as claimed in claim 1, wherein the average particle diameter of the dispersoid in the dispersion liquid is in the range of 0.05 to 1.0 µm.

28. The method of producing resin particles as claimed in claim 23, wherein when the average particle diameter of the dispersoid contained in the dispersion liquid is defined as Dm (µm) and the average particle diameter of the toner particles is defined as Dt (µm), Dm and Dt satisfy the relation of $0.005 \leq Dm/Dt \leq 0.5$.

29. The method of producing resin particles as claimed in claim 1, wherein an amount of the dispersoid contained in the dispersion liquid is in the range of 1 to 99 wt %.

30. The method of producing resin particles as claimed in claim 1, wherein an ejected amount of one droplet of the dispersion liquid which is ejected from the head portion is in the range of 0.05 to 500 pl.

31. The method of producing resin particles as claimed in claim 1, wherein when the average diameter of the ejected droplets of the dispersion liquid is defined as Dd (µm), and the average particle diameter of the dispersoid contained in the dispersion liquid is defined as Dm (µm), Dd and Dm satisfy the relation of $Dm/Dd \leq 0.5$.

32. The method of producing resin particles as claimed in claim 1, wherein when the average diameter of the ejected droplets of the dispersion liquid is defined as Dd (µm), and the average particle diameter of toner particles to be produced from the resin particles is defined as Dt (µm), Dd and Dt satisfy the relation of $0.05 \leq Dt/Dd \leq 1.0$.

33. The method of producing resin particles as claimed in claim 1, wherein the dispersion liquid ejected from the head portion is directed into a gas stream flowing in substantially one direction.

34. The method of producing resin particles as claimed in claim 33, wherein the head portion includes a plurality of head portions, and the dispersion liquid is ejected from the plurality of head portions.

35. The method of producing resin particles as claimed in claim 34, wherein the dispersion liquid is ejected from the head portions while the gas is injected from a portion between the adjacent head portions.

36. The method of producing resin particles as claimed in claim 35, wherein the humidity of gas injected from the adjacent head portions is 50% RH or less.

37. The method of producing resin particles as claimed in claim 36, wherein the timing of ejection of the dispersion liquid is different in the at least two adjacent head portions.

38. The method of producing resin particles as claimed in claim 1, wherein the dispersion liquid is ejected in a state that a voltage having a polarity which is the same as that of the dispersion liquid is applied to the solidifying portion.

39. The method of producing resin particles as claimed in claim 1, wherein the initial velocity of the dispersion liquid ejected from the head portion is in the range of 0.1 to 10 m/sec.

40. The method of producing resin particles as claimed in claim 1, wherein the viscosity of the dispersion liquid inside the head portion is in the range of 0.5 to 200 (mPa·s).

41. The method of producing resin particles as claimed in claim 1, wherein the pressure inside the solidifying portion is 150 kPa or less.

42. The method of producing resin particles as claimed in claim 1, wherein the dispersion liquid is ejected with being heated.

43. The method of producing resin particles as claimed in claim 1, wherein the dispersion liquid ejected from the head portion is heated in the solidifying portion.

44. The method of producing resin particles as claimed in claim 1, wherein the resin particles are toner particles or are used for producing toner particles.

* * * * *